US011223384B2

(12) United States Patent
Cook et al.

(10) Patent No.: US 11,223,384 B2
(45) **Date of Patent: *Jan. 11, 2022**

(54) LOW NOISE SIGNAL CHAIN ARCHITECTURE

(71) Applicant: Wilson Electronics, LLC, St. George, UT (US)

(72) Inventors: Patrick Lee Cook, Cedar City, UT (US); Christopher K. Ashworth, Toquerville, UT (US); Michael James Mouser, Wylie, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,988

(22) Filed: Jul. 20, 2020

(65) Prior Publication Data

US 2021/0013923 A1 Jan. 14, 2021

Related U.S. Application Data

(63) Continuation of application No. 16/284,957, filed on Feb. 25, 2019, now Pat. No. 10,862,529, which is a (Continued)

(51) Int. Cl.
*H04B 1/52* (2015.01)
*H04B 7/155* (2006.01)
(Continued)

(52) U.S. Cl.
CPC ............ *H04B 1/52* (2013.01); *H04B 1/0057* (2013.01); *H04B 1/0064* (2013.01); (Continued)

(58) Field of Classification Search
CPC .. H04B 1/0057; H04B 1/0064; H04B 1/3877; H04B 1/52; H04B 7/15528; H04B 7/15535; H04B 7/15542; H04W 16/26
See application file for complete search history.

(56) References Cited

U.S. PATENT DOCUMENTS 4,041,389 A 8/1977 Oades
4,776,032 A 10/1988 Odate et al.
(Continued)

FOREIGN PATENT DOCUMENTS

EP 1525678 B1 7/2008
KR 101488743 B1 2/2015
WO WO 2005025078 A2 3/2005

OTHER PUBLICATIONS

ADL5513; "1 MHz to 4 GHz, 80 dB Logarithmic Detector / Controller;" Data Sheet; (2008); 25 pages.
(Continued)

*Primary Examiner* — David Bilodeau
(74) *Attorney, Agent, or Firm* — Thorpe North & Western, LLP.

(57) ABSTRACT

Technology for a low-noise signal chain is disclosed. The low-noise signal chain can include a signal path configured to carry a signal. The low-noise signal chain can include a bypassable amplifier communicatively coupled to the signal path. The low-noise signal chain can include a switchable band pass filter communicatively coupled to the signal path. The low-noise signal chain can include an amplifier bypass path communicatively coupled to the signal path. The signal can be configured to be directed to the amplifier bypass path to bypass the bypassable amplifier. The low-noise signal chain can include a band pass filter bypass path communicatively coupled to the signal path. The signal can be configured to be directed to the band pass filter bypass path to bypass the switchable band pass filter.

27 Claims, 34 Drawing Sheets

Related U.S. Application Data continuation-in-part of application No. 15/240,674, filed on Aug. 18, 2016, now Pat. No. 10,251,127.

(60) Provisional application No. 62/206,423, filed on Aug. 18, 2015.

(51) Int. Cl.
*H04W 16/26* (2009.01)
*H04B 1/00* (2006.01)
*H04B 1/3877* (2015.01)

(52) U.S. Cl.
CPC ....... *H04B 1/3877* (2013.01); *H04B 7/15528* (2013.01); *H04B 7/15535* (2013.01); *H04B 7/15542* (2013.01); *H04W 16/26* (2013.01)

(56) References Cited

U.S. PATENT DOCUMENTS 5,303,395 A 4/1994 Dayani
5,737,687 A 4/1998 Martin et al.
5,777,530 A 7/1998 Nakatuka
5,835,848 A 11/1998 Bi et al.
5,937,332 A 8/1999 Karabinis
6,005,884 A 12/1999 Cook et al.
6,374,119 B1 4/2002 Jun et al.
6,671,502 B1 12/2003 Ogawa
6,711,388 B1 3/2004 Neitiniemi
6,745,003 B1 6/2004 Maca et al.
6,889,033 B2 5/2005 Bongfeldt
6,990,313 B1 1/2006 Yarkosky
6,993,287 B2 1/2006 O'Neill
7,035,587 B1 4/2006 Yarkosky
7,221,967 B2 5/2007 Van Buren et al.
7,408,898 B1 8/2008 Brown
7,684,838 B2 3/2010 Wilson
7,974,573 B2 7/2011 Dean
8,559,869 B2 10/2013 Ash, Jr. et al.
8,583,033 B2 11/2013 Ashworth et al.
8,867,572 B1 10/2014 Zhan
9,048,940 B2 6/2015 Wilhite
9,832,295 B2 11/2017 Ash, Jr. et al.
2002/0044594 A1 4/2002 Bongfeldt
2002/0072339 A1 6/2002 Hamalainen
2003/0081694 A1 5/2003 Wieck
2003/0123401 A1 7/2003 Dean
2003/0236067 A1 12/2003 Hasarchi et al.
2004/0087334 A1 5/2004 Nishiyama
2004/0137854 A1 7/2004 Ge
2004/0146013 A1 7/2004 Song et al.
2004/0157551 A1 8/2004 Gainey et al.
2004/0166802 A1 8/2004 McKay, Sr. et al.
2004/0204105 A1 10/2004 Liang et al.
2004/0219876 A1 11/2004 Baker et al.
2004/0235417 A1 11/2004 Dean
2005/0085267 A1 4/2005 Lemson et al.
2005/0118949 A1 6/2005 Allen et al.
2005/0215204 A1 9/2005 Wallace et al.
2005/0227619 A1 10/2005 Lee et al.
2006/0014494 A1 1/2006 Cleveland
2006/0019603 A1 1/2006 Pergal
2006/0058029 A1 3/2006 Lee et al.
2006/0084379 A1 4/2006 O'Neill
2006/0148401 A1 7/2006 Roper et al.
2006/0205342 A1 9/2006 McKay et al.
2006/0205344 A1 9/2006 Roper et al.
2007/0071128 A1 3/2007 Meir et al.
2007/0188235 A1 8/2007 Dean
2007/0197207 A1 8/2007 Carstens et al.
2007/0247376 A1 10/2007 Kim et al.
2007/0291668 A1 12/2007 Duan
2008/0081555 A1 4/2008 Kong et al.
2008/0096483 A1 4/2008 Van Buren et al.
2008/0161076 A1 7/2008 Min et al.
2008/0278237 A1 11/2008 Blin
2008/0299896 A1 12/2008 Mohebbi
2009/0027117 A1 1/2009 Andersen et al.
2009/0131131 A1 5/2009 Wilson
2009/0181735 A1 7/2009 Griffin, Jr. et al.
2009/0207776 A1 8/2009 Baik et al.
2009/0270027 A1 10/2009 O'Neill
2010/0234071 A1 9/2010 Shabtay et al.
2010/0321114 A1 12/2010 Okada et al.
2011/0151775 A1 6/2011 Kang et al.
2011/0176635 A1 7/2011 Hochwald et al.
2011/0292863 A1 12/2011 Braz et al.
2011/0312269 A1 12/2011 Judd et al.
2012/0013296 A1 1/2012 Heydari et al.
2012/0027054 A1 2/2012 Palanki et al.
2012/0128038 A1 5/2012 Crilly, Jr.
2012/0188919 A1 7/2012 Subasic et al.
2012/0309293 A1 12/2012 Kummetz et al.
2013/0121505 A1 5/2013 Duraiswami et al.
2013/0149957 A1 6/2013 Desclos et al.
2013/0157720 A1 6/2013 Schiff
2013/0183895 A1 7/2013 Gore et al.
2013/0195467 A1 8/2013 Schmid et al.
2014/0015642 A1 1/2014 White
2014/0065949 A1 3/2014 Wilhite
2014/0176635 A1 6/2014 Portela Mata et al.
2014/0266424 A1 9/2014 Ashworth et al.
2014/0273816 A1 9/2014 Ashworth et al.
2015/0009889 A1 1/2015 Zhan
2015/0011157 A1 1/2015 Terry
2015/0180685 A1 6/2015 Noest et al.
2015/0214904 A1 7/2015 Lozhkin
2015/0220665 A1 8/2015 Turner et al.
2016/0141908 A1 5/2016 Jakl et al.
2016/0181984 A1 6/2016 Petrucelli et al.
2016/0198347 A1 7/2016 Zhan
2016/0308276 A1 10/2016 Chang et al.
2016/0315653 A1 10/2016 Saji et al.
2017/0055215 A1 2/2017 Cook et al.
2017/0055231 A1 2/2017 Cook et al.
2017/0077592 A1 3/2017 Tsai et al.
2017/0093374 A1 3/2017 Yatsenko et al.
2017/0094608 A1 3/2017 Langer et al.
2018/0041234 A1 2/2018 Klopfer et al.
2018/0294866 A1 10/2018 Ashworth
2018/0294868 A1 10/2018 Ashworth
2018/0323860 A1 11/2018 Bohls et al.
2019/0222258 A1 7/2019 Bohls et al.
2019/0260460 A1 8/2019 Ashworth et al.

OTHER PUBLICATIONS

HMC713LP3E; "54 dB, Logarithmic Detector / Controller, 50-8000 MHz;" Data Sheet; (2010); 12 pages.

HMC909LP4E; "RMS Power Detector Single-Ended, DC—5.8 GHz;" Data Sheet; (2010); 21 pages.

PIC16F873; "28/40-Pin 8-Bit CMOS Flash Microcontrollers;" Data Sheet; (2001); 218 pages.

3GPP2 C.S0011-B; "Recommended Minimum Performance Standards for cdma2000® Spread Spectrum Mobile Stations;" TIA-98-E; (Dec. 13, 2002); 448 pages; Release B, Version 1, Revision E.

Integrated UL Node Antenna
Bypass PAs to save power (could bypass filters as well)
Second Diplexer
B4
B25
B12
B13
B5
HB
First Diplexer
LB
UL
Splitter
DL
Integrated Device Antenna
Integrated DL Node Antenna
Third Diplexer
B4
B25
B12/13
B5
Always on DL path
Fourth Diplexer
Optional

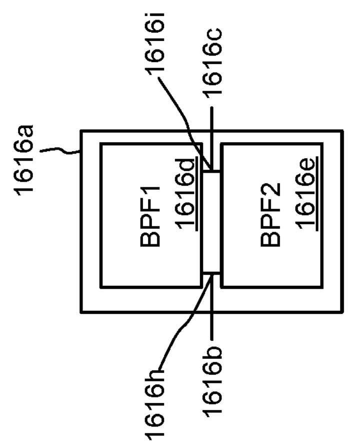
FIG. 16f
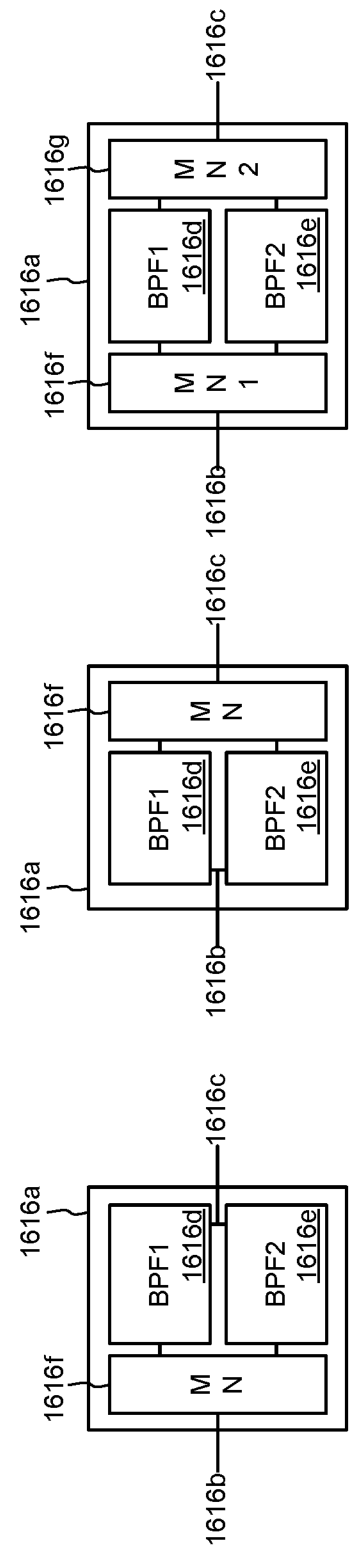
FIG. 16i
FIG. 16h
FIG. 16g

LOW NOISE SIGNAL CHAIN ARCHITECTURE

RELATED APPLICATIONS

The present application is a continuation of U.S. patent application Ser. No. 16/284,957, filed Feb. 25, 2019, which is a continuation-in-part of U.S. patent application Ser. No. 15/240,674, filed Aug. 18, 2016, which claims the benefit of U.S. Provisional Patent Application No. 62/206,423, filed Aug. 18, 2015, the entire specifications of which are each hereby incorporated by reference in their entirety for all purposes.

BACKGROUND

Signal boosters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 16*f* to 16*i* illustrate multi-filter packages in accordance with an example;

FIG. 16*l* illustrates a multiband repeater with a receive diversity antenna port in accordance with an example;

Figure 1:
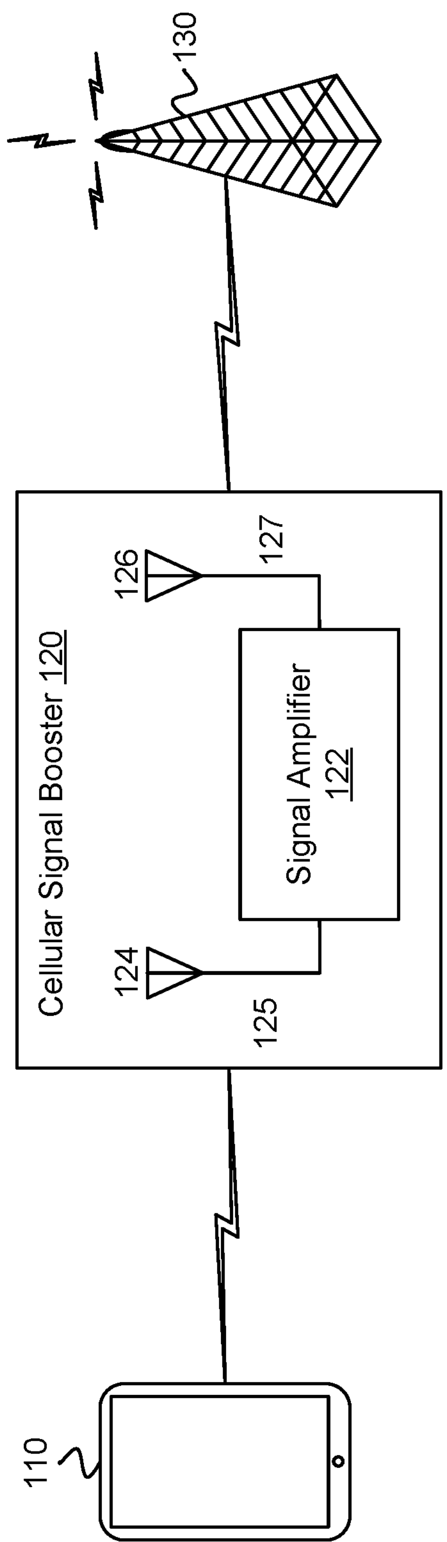
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater or signal amplifier. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the signal booster 120 can amplify uplink signals, and then send amplified uplink signals to the node. Alternatively, the uplink signals can be passed without amplification or filtering. For example, the uplink signals can be communicated from the wireless device 110 to the node (e.g., eNodeB) while bypassing the signal booster 120.

In one configuration, the signal booster 120 used to amplify the uplink and/or a downlink signal is a handheld booster. The handheld booster can be implemented in a sleeve (or case) of the wireless device 110. The wireless device sleeve may be attached to the wireless device 110, but may be removed as needed. In this configuration, the signal booster 120 can automatically power down or cease amplification when the wireless device 110 approaches a particular base station. In other words, the signal booster 120 may determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21. It should be noted that these FCC regulations apply to FCC-compatible consumer repeaters and may not be applicable to a user equipment (UE) in communication with an FCC-compatible consumer repeater. While a repeater that is compatible with FCC regulations is provided as an example, it is not intended to be limiting. The repeater can be configured to be compatible with other governmental regulations based on the location where the repeater is configured to operate.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the signal booster 120 can boost signals for 3GPP LTE Release 16.0.0 (January 2019) or other desired releases. The signal booster 120 can boost signals from the 3GPP Technical Specification 36.101 (Release 16 Jan. 2019) bands or LTE frequency bands. For example, the signal booster 120 can boost signals from the LTE frequency bands: 2, 4, 5, 12, 13, 17, 25, 26, and 71. The signal booster 120 can boost selected frequency bands based on the country or region in which the signal booster is used, including any of 3GPP LTE frequency bands 1 through 85, 3GPP 5G frequency bands 1 through 86, 3GPP 5G frequency bands 257 through 261, or other frequency bands, as disclosed in 3GPP TS 36.104 V16.0.0 (January 2019) or 3GPP TS 38.104 v15.4.0 (January 2019). In addition, the signal booster 120 can boost time division duplexing (TDD) and/or frequency division duplexing (FDD) signals.

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can wireless communicate with one or more antennas in the wireless device 110. In another example, the integrated device antenna 124 can be coupled to one or more antennas in the wireless device 110. In addition, the integrated device antenna 124 can communicate with the wireless device 110 using near field communication, or alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, when the signal booster 120 is a handheld booster, a phone-specific case of the handheld booster can be configured for a specific type or model of wireless device. The phone-specific case can be configured with the integrated device antenna 124 located at a desired location to enable communication with an antenna of the specific wireless device. In addition, amplification and filtering of the uplink and downlink signals can be provided to optimize the operation of the specific wireless device. In one example, the handheld booster can be configured to communicate with a wide range of wireless devices. In another example, the handheld booster can be adjustable to be configured for multiple wireless devices.

In one configuration, when the signal booster 120 is a handheld booster, the handheld booster can be configured to identify when the wireless device 110 receives a relatively strong downlink signal. An example of a strong downlink signal can be a downlink signal with a signal strength greater than approximately −80 dBm. The handheld booster can be configured to automatically turn off selected features, such as amplification, to conserve battery life. When the handheld booster senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the handheld booster can be designed, certified and produced in view of a specific absorption rate (SAR). Many countries have SAR limits which can limit the amount of RF radiation that can be transmitted by a wireless device. This can protect users from harmful amounts of radiation being absorbed in their hand, body, or head. In one example, when allowable SAR values are exceeded, a telescoping integrated node antenna may help to remove the radiation from the immediate area of the user. In another example, the handheld booster can be certified to be used away from a user, such as in use with Bluetooth headsets, wired headsets, and speaker-phones to allow the SAR rates to be higher than if the handheld booster were used in a location adjacent a user's head. Additionally, Wi-Fi communications can be disabled to reduce SAR values when the SAR limit is exceeded.

In one example, mobile devices are often already at a SAR limit, and the handheld booster can potentially increase the SAR. Therefore, in order to reduce the SAR, the mobile device antenna can be blocked from increasing the SAR. For example, a portion of the mobile device can be wrapped in a defined type of metal (e.g., aluminum) or radio frequency (RF) absorbent can be placed between the mobile device and the metal. These techniques can reduce reflections and increase stability, thereby reducing the SAR.

In one example, mobile devices can be designed from a limited space/weight perspective, such that mobile device antennas can be compromised. Therefore, the handheld booster can provide an improved integrated node antenna (for communication with a base station). The integrated node antenna can be in a computer chip, printed circuit board (PCB), array, beam-forming array or a telescoping form-factor.

In one example, the handheld booster can also include one or more of: a waterproof casing, a shock absorbent casing, a flip-cover, a wallet, or extra memory storage for the wireless device. In one example, extra memory storage can be achieved with a direct connection between the handheld booster and the wireless device 110. In another example, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the handheld booster with the wireless device 110 to enable data from the wireless device 110 to be communicated to and stored in the extra memory storage that is integrated in the handheld booster. Alternatively, a connector can be used to connect the wireless device 110 to the extra memory storage.

In one example, the handheld booster can include photovoltaic cells or solar panels as a technique of charging the integrated battery and/or a battery of the wireless device 110. In another example, the handheld booster can be configured to communicate directly with other wireless devices with handheld boosters. In one example, the integrated node antenna 126 can communicate over Very High Frequency (VHF) communications directly with integrated node antennas of other handheld boosters. The handheld booster can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, 5.9 GHz, or 6.1 GHz. This configuration can allow data to pass at high rates between multiple wireless devices with handheld boosters. This configuration can also allow users to send text messages, initiate phone calls, and engage in video communications between wireless devices with handheld boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other handheld boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. In another example, the handheld booster can be configured to determine the SAR value. The handheld booster can be configured to disable cellular communications or Wi-Fi communications when a SAR limit is exceeded.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, 5.9 GHz, or 6.1 GHz.

Figure 2:
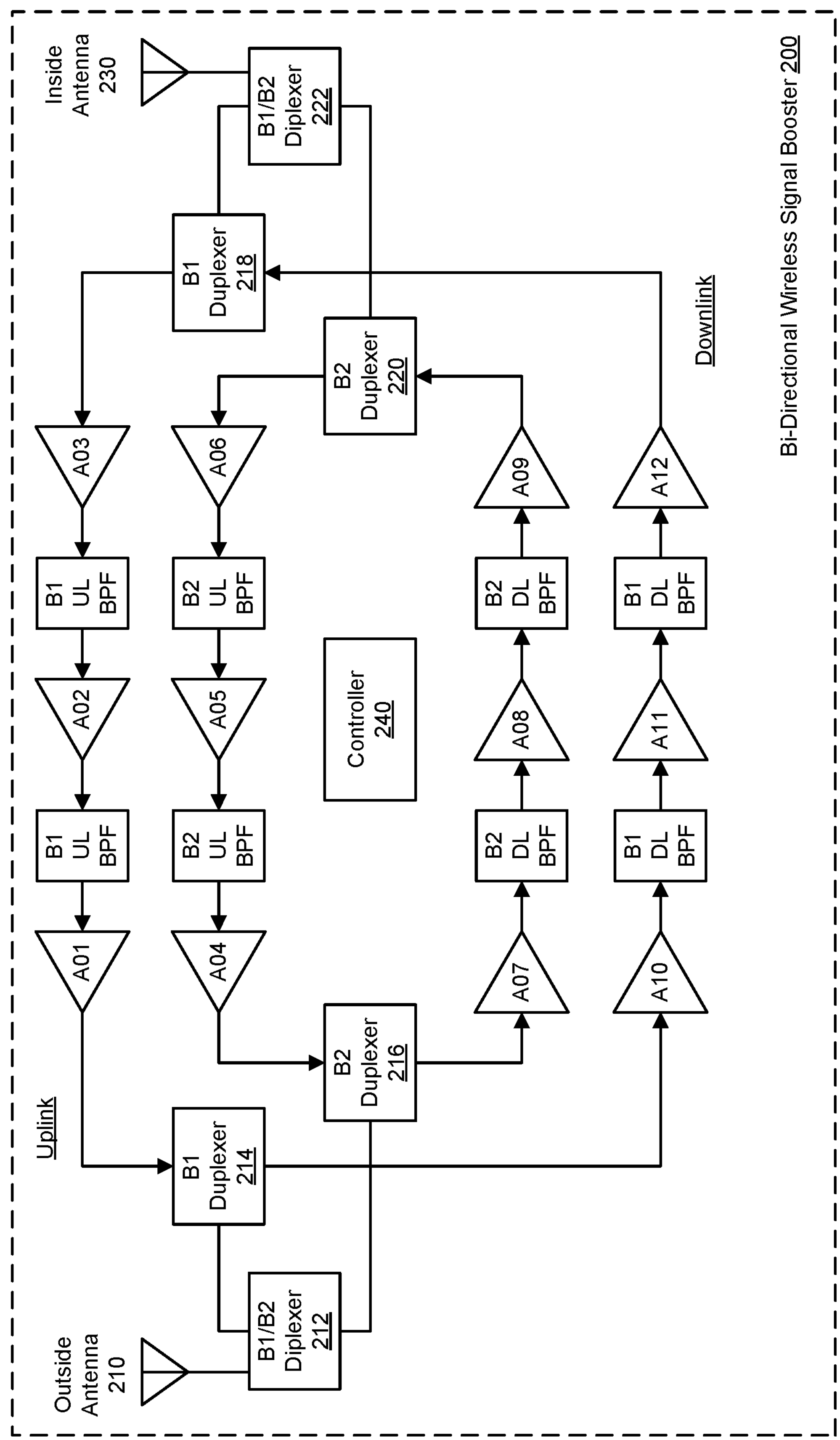
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 212. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

Figure 3:
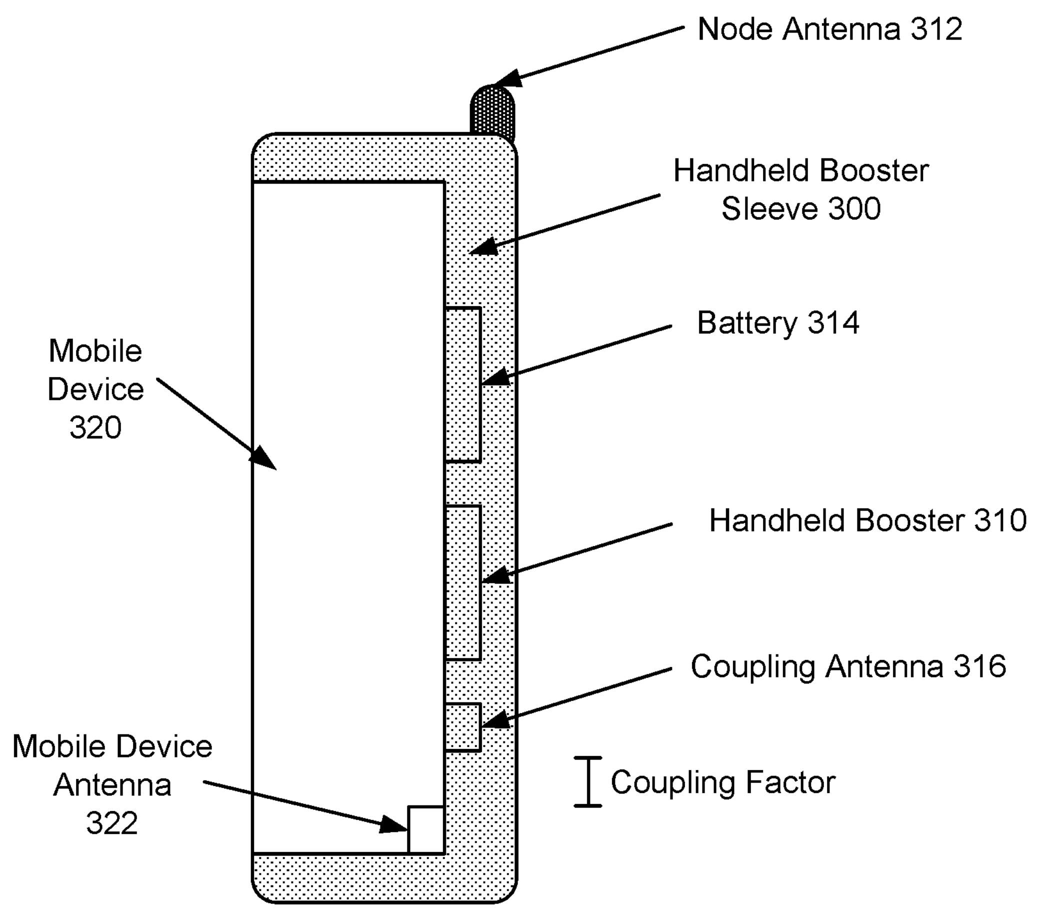
FIG. 3 illustrates a handheld booster implemented in a handheld booster sleeve in accordance with an example.

FIG. 3 illustrates an exemplary configuration of a handheld booster 310 implemented in a handheld booster sleeve 300. The handheld booster sleeve 300 may hold the handheld booster 310, as well as a mobile device 320 with a mobile device antenna 322. The handheld booster sleeve 300 can be removable, such that the mobile device 320 can be inserted and removed from the handheld booster sleeve 300. The handheld booster 310 can incorporate a node antenna 312 and a coupling antenna 316 (also referred to as an integrated device antenna). The handheld booster sleeve 300 an incorporate the handheld booster 310, the node antenna 312 and the coupling antenna 316 in a single form-factor. The handheld booster sleeve 300 can protect the mobile device 320 and the handheld booster 310.

The handheld booster 310 may amplify signals received from the mobile device 320 and/or signals transmitted to the mobile device 320. For example, the handheld booster 300 can receive downlink signals from a base station (not shown) via the node antenna 312, and the downlink signals can be amplified and then provided to the mobile device 320 via the coupling antenna 316. As another example, the handheld booster 300 can receive uplink signals from the mobile device 320 via the coupling antenna 316, and the uplink signals can be amplified and then provided to the base station via the node antenna 312. In one example, the handheld booster 310 can provide up to a 6 decibel (dB) improvement to the cellular signal.

In one example, the handheld booster sleeve 310 can include a battery 314. The battery 314 in the handheld booster sleeve 300 can provide power the booster active components. The battery 314 can also power the mobile device 320 (i.e. phone or tablet). Alternatively, the handheld booster 310 can receive power from the mobile device 320.

In one example, in order to minimize power loss between the coupling antenna 316 of the handheld booster 310 and the mobile device antenna 322, the coupling antenna 316 can be substantially aligned with the mobile device antenna 322. However, aligning the coupling antenna 316 in the handheld booster 310 with the mobile device antenna 322 can cause the mobile device antenna 322 to be dependent on the coupling antenna 316. In other words, the antenna in the mobile device 320 may not be used independently since it is covered by the coupling antenna 316. Therefore, in one example, the position of the coupling antenna 316 can be offset from the mobile device antenna 322 by a coupling distance. The coupling distance, or distance between the mobile device antenna 322 and the coupling antenna 316, can form a simultaneous bypass path. A selected distance between the mobile device antenna 322 and the coupling antenna 316 can act as a bypass for non-amplified signals to be transmitted and/or received via the mobile device antenna 322 without entering the handheld booster 310, which can allow for significant power savings by not amplifying all mobile device UL and DL signals.

In one example, increasing the spacing between the coupling antenna 316 and the mobile device antenna 322 can increase coupling loss and reduce interference for the simultaneous bypass path. However, increasing the gain of the handheld booster 310 can overcome the increased coupling loss while maintaining the bypass for non-amplified signals.

In one example, the coupling antenna 316 can be coupled with a primary antenna of the mobile device 320. The mobile device 320 can include a secondary antenna. The coupling antenna 316 can be coupled with the primary antenna of the mobile device 320 at a predetermined distance, such that the primary antenna can be considered blocked by the mobile device 320. When the mobile device 320 considers the primary antenna blocked, the secondary antenna can be used to transmit and receive UL or DL signals. In one example, the handheld booster 310 can amplify DL signals, and the coupling antenna 316 can transmit the amplified DL signals to the primary antenna of the mobile device 320. Thus, the secondary antenna of the mobile device 320 can be used directly for UL communications with the base station.

In previous solutions, mobile device sleeves fail to incorporate an integrated signal booster, and particularly not a Federal Communications Commission (FCC)-compatible consumer signal booster. In contrast, as shown, the handheld booster sleeve 300 can incorporate the handheld booster 310, and the handheld booster 310 can be an FCC-compatible consumer signal booster.

In one example, the handheld booster 310 can detect and mitigate unintended oscillations in uplink and downlink bands. The handheld booster 310 can be configured to automatically power down or cease amplification as the mobile device 320 approaches an affected base station.

In one example, the handheld booster 310 can enable a cellular connection, increase data rates and/or increase performance in otherwise poor-connection areas. The handheld booster 310 can be used in series with a standard signal booster to improve performance.

Typically, mobile devices can have an increased noise figure (e.g., 5-6 dB) when the mobile devices do not use low-noise amplifiers (LNAs) on their radio frequency (RF) front-end receiving paths. However, the handheld booster 300 can lower the noise figure (e.g., to approximately 1-2 dB) by using one or more LNAs.

In one configuration, a separate sleeve-to-sleeve node antenna can be configured to communicate directly with separate sleeve-to-sleeve node antennas of other handheld boosters. This configuration can allow the node antenna 312 to be used for simultaneous cellular communications. The separate sleeve-to-sleeve node antenna can communicate with the mobile device 320 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one example, the handheld booster 310 can determine the SAR value. The handheld booster can be configured to disable cellular communications or Wi-Fi communications when a SAR limit is exceeded.

Figure 4:
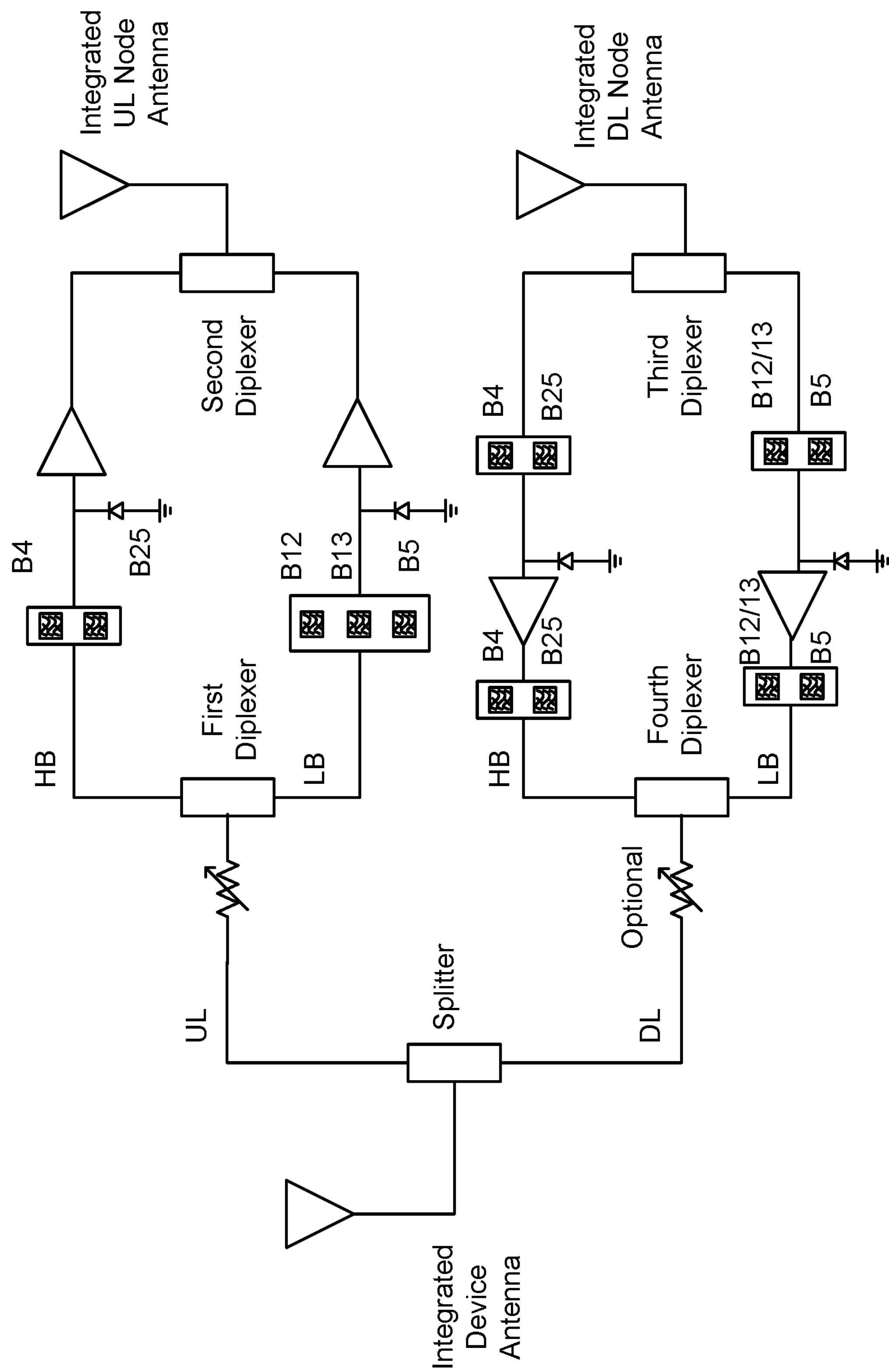
FIG. 4 illustrates a cellular signal amplifier configured to amplify uplink (UL) and downlink (DL) signals in accordance with an example.

FIG. 4 illustrates an exemplary cellular signal amplifier configured to amplify uplink (UL) and downlink (DL) signals. The cellular signal amplifier can include an integrated device antenna, an integrated UL node antenna and an integrated DL node antenna. In one example, the amplification of UL and DL signals can be limited to a gain of less than or equal to 23 dB. A separate cellular signal amplifier or separate antenna for UL and DL communications can increase the UL or DL signal output power by eliminating the need for filtering on a power amplifier output.

In one example, the integrated device antenna can receive an UL signal from a wireless device. The UL signal can be directed to a splitter, and then the UL signal can be directed to first diplexer. The first diplexer can direct the UL signal to an UL high band signal path or a UL low band signal path (depending on whether the UL signal is a high band signal or a low band signal). The UL high band signal path and the UL low band signal path can each include a single input single output (SISO) bandpass filter. For the UL high band signal path, the SISO bandpass filter can filter signals in LTE frequency bands 4 and 25. For the UL low band signal path, the SISO bandpass filter can filter signals in LTE frequency bands 5, 12 and 13. The first diplexer can appropriately direct the UL signal to the high band signal path or the low band signal path, in which the UL signal can be filtered and amplified using a low-noise amplifier (LNA). The filtered and amplified UL signal can be passed to a second diplexer, and then to the integrated UL node antenna, which can transmit the UL signal to a base station.

In one example, the integrated DL node antenna can receive a DL signal from the base station. The DL signal can be directed to a third diplexer, which can direct the DL signal to a DL high band signal path or a DL low band signal path. The DL high band signal path and the DL low band signal path can each include a single input single output (SISO) bandpass filter. For the DL high band signal path, the SISO bandpass filter can filter signals in LTE frequency bands 4 and 25. For the DL low band signal path, the SISO bandpass filter can filter signals in LTE frequency bands 5, 12 and 13. The DL signal can be filtered and amplified in either the DL high band signal path or the DL low band signal path, and then the DL signal can be passed to a fourth diplexer. The fourth diplexer can direct the DL signal to the splitter, and then to the integrated device antenna, which can transmit the DL signal to the wireless device. In one example, an attenuator can be positioned between the integrated device antenna and the splitter to reduce reflections.

In one configuration, separate UL and DL integrated device antennas can be used to avoid splitter or duplexer (front-end) losses. By using separate UL and DL integrated device antennas, UL output power and DL sensitivity can be increased.

Figure 5:
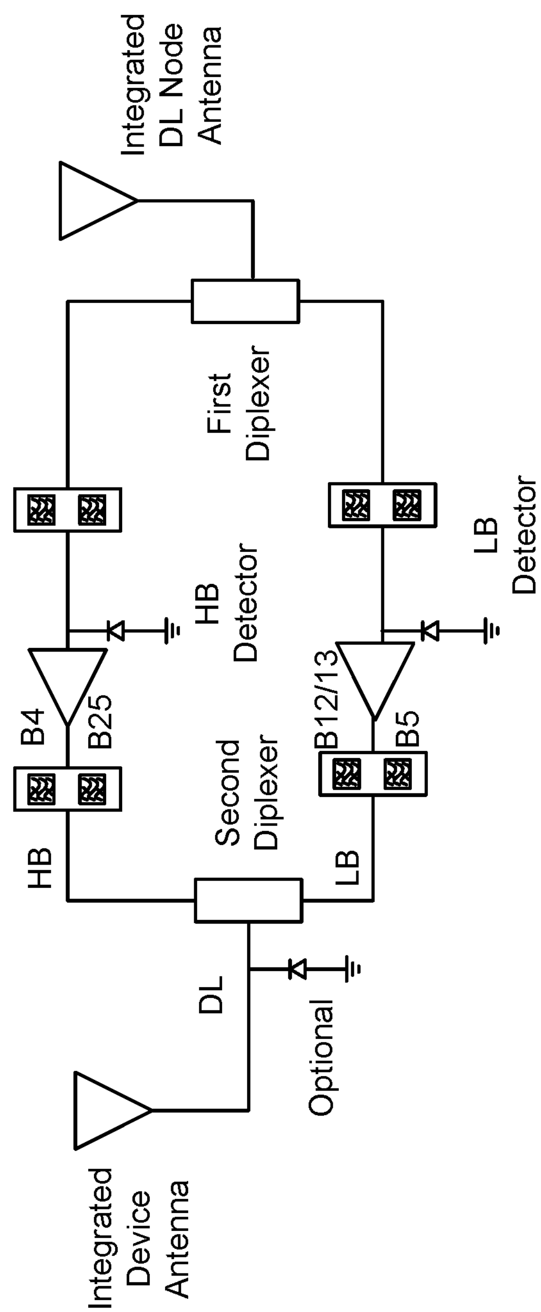
FIG. 5 illustrates a cellular signal amplifier configured to amplify DL signals in accordance with an example.

FIG. 5 illustrates an exemplary cellular signal amplifier configured to amplify downlink (DL) signals. An integrated DL node antenna can receive a DL signal from a base station. The DL signal can be directed to a first diplexer, which can direct the DL signal to a DL high band (HB) signal path or a DL low band (LB) signal path. The DL high band signal path and the DL low band signal path can each include one or more single input single output (SISO) bandpass filters and one or more amplifiers. For the DL high band signal path, the SISO bandpass filter(s) can filter signals in LTE frequency bands 4 and 25. For the DL low band signal path, the SISO bandpass filter(s) can filter signals in LTE frequency bands 5, 12 and 13. The DL signal can be filtered and amplified in either the DL high band signal path or the DL low band signal path. The amplification of the DL signals can be limited to a gain of less than or equal to 9 dB. Then, the DL signal can be passed to a second diplexer. The second diplexer can direct the DL signal to an integrated device antenna, which can transmit the DL signal to a wireless device.

In one example, the DL high band signal path can include a HB detector. The HB detector can be a diode. The HB detector can detect a DL signal received from the integrated DL node antenna via the first diplexer. The HB detector can detect a power level of the DL signal, and when the power level of the DL signal is greater than a selected threshold, the cellular signal amplifier can be turned off. In other words, the DL signal may not need to be amplified, so the cellular signal amplifier can be turned off to conserve power. When the HB detector detects that the power level of the DL signal is less than a selected threshold, the cellular signal amplifier can be turned on. Therefore, the cellular signal amplifier can be engaged or disengaged depending on the power level of the DL signal.

Similarly, the DL low band signal path can include a LB detector. The LB detector can be a diode. The LB detector can detect a DL signal received from the integrated DL node antenna via the first diplexer. The LB detector can detect a power level of the DL signal, and when the power level of the DL signal is greater than a selected threshold, the cellular signal amplifier can be turned off. When the LB detector detects that the power level of the DL signal is less than a selected threshold, the cellular signal amplifier can be turned on.

In one configuration, the mobile device can include a primary antenna and a secondary antenna. For example, the mobile device can use the secondary antenna when the primary antenna is not working. In addition, when the primary antenna is used for a DL-only signal amplification and filtering path (as shown in FIG. 5), the mobile device can use the secondary antenna to transmit UL signals. In other words, the primary antenna can be used for DL signals, and the secondary antenna can be used for UL signals. In this configuration, the UL signal transmitted from the mobile device may not be amplified by the cellular signal amplifier.

In one example, the lack of UL amplification can lead to a less than 9 dB system gain. In another example, the cellular signal amplifier can include a detector that can detect an UL signal, and then determine whether to turn the DL amplification path on or off.

Figure 6:
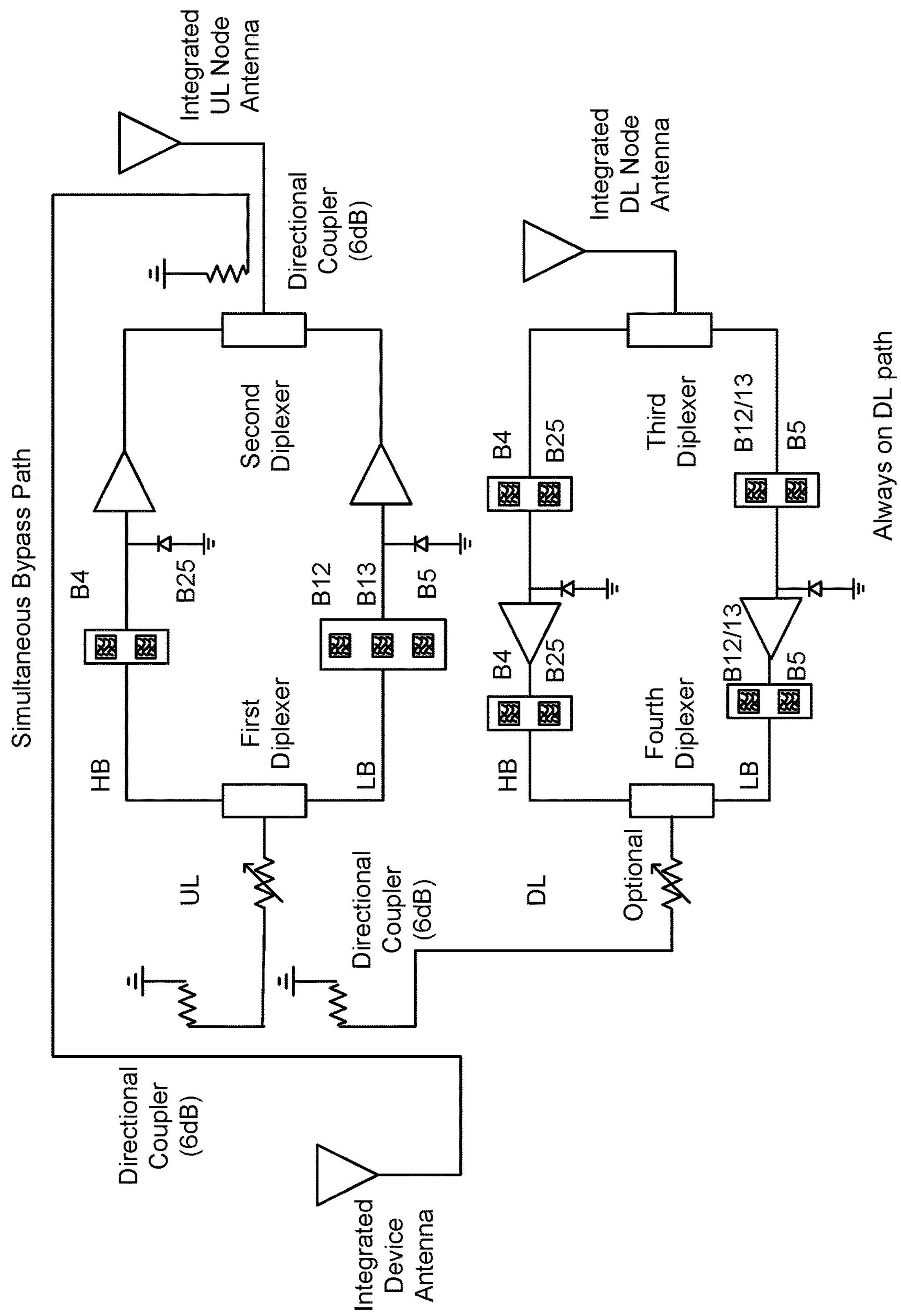
FIG. 6 illustrates a cellular signal amplifier configured with a simultaneous bypass path in accordance with an example.

FIG. 6 illustrates an exemplary cellular signal amplifier configured with a simultaneous bypass path. The cellular signal amplifier can amplify downlink (DL) and uplink (UL) signals. However, the cellular signal amplifier can amplify either DL or UL signals at a given time and allow UL non-amplified signals to simultaneously bypass amplification. In other words, the cellular signal amplifier can detect a power level of an UL signal. The power level of the UL signal can be detected using a detector (e.g., a diode). Based on a signal power level in relation to a defined threshold, the cellular signal amplifier can determine that the UL signal does not need amplification and can bypass either a high band or low band uplink signal amplification path. For example, when the signal power level is above the defined threshold, the UL signal can bypass the high band or low band uplink signal amplification path. On the other hand, when the signal power level is below the defined threshold, the UL signal can be directed to one of the high band or low band uplink signal amplification path. In one example, DL signals can always be directed to a high band or low band downlink signal amplification path of the cellular signal amplifier.

In one example, when the UL signal is not amplified, the integrated device antenna can be directly coupled to the integrated UL node antenna. In other words, the UL signal can be directed sent from the integrated device antenna to the integrated UL node antenna. The direct coupling between the integrated device antenna and the integrated UL node antenna can be achieved using a directional coupler.

Alternatively, the integrated device antenna can be coupled with the integrated UL node antenna using a splitter, a circulator, a triplexer, a quadplexer, a multiplexer, or a duplexer.

In one example, the integrated device antenna can receive an UL signal from a wireless device. Signal detectors can detect a power level of the UL signal. When the power level is above the defined threshold, one or more directional couplers can be configured such that the UL signal passes directly to the integrated UL node antenna via the simultaneous bypass path. As a result, the UL signal can avoid passing through the high band UL signal amplification path or the low band UL signal amplification path. The integrated UL node antenna can transmit the unamplified UL signal to a base station.

On the other hand, when the signal detectors detect that the power level of the UL signal is less than the defined threshold, the one or more directional couplers can be configured such that the UL signal is directed to a first diplexer. The first diplexer can direct the UL signal to either the high band UL signal amplification path or the low band UL signal amplification path, which causes the UL signal to be filtered and amplified. The UL signal can pass through a second diplexer, and then to the integrated UL node antenna for transmission to the base station. In this example, based on the power level of the UL signal, the UL signal does not travel through the simultaneous bypass path.

In one example, a DL signal can be received via the integrated DL node antenna. The DL signal can be directed to a third diplexer. The DL signal can be directed to a high band DL signal amplification path or a low band DL signal amplification path, and then to a fourth diplexer. The DL signal can travel from the fourth diplexer to the integrated device antenna for transmission to the wireless device.

In one example, the simultaneous bypass path can increase battery life of the cellular signal amplifier by allowing UL amplification to be turned off. Further, the simultaneous bypass path can increase reliability, in the event the cellular signal amplifier malfunctions. In one example, the simultaneous bypass path can be always active. The simultaneous bypass path can operate independently of whether or not the cellular signal amplifier has failed. The simultaneous bypass path can operate independent of relays or switches to bypass the cellular signal amplifier. Additionally, because wireless propagation paths of signals from multiple antennas can constantly vary, fading margins can exceed 15 dB. Therefore, by using multiple antennas, the reliability of the cellular signal amplifier can be increased.

Figure 7:
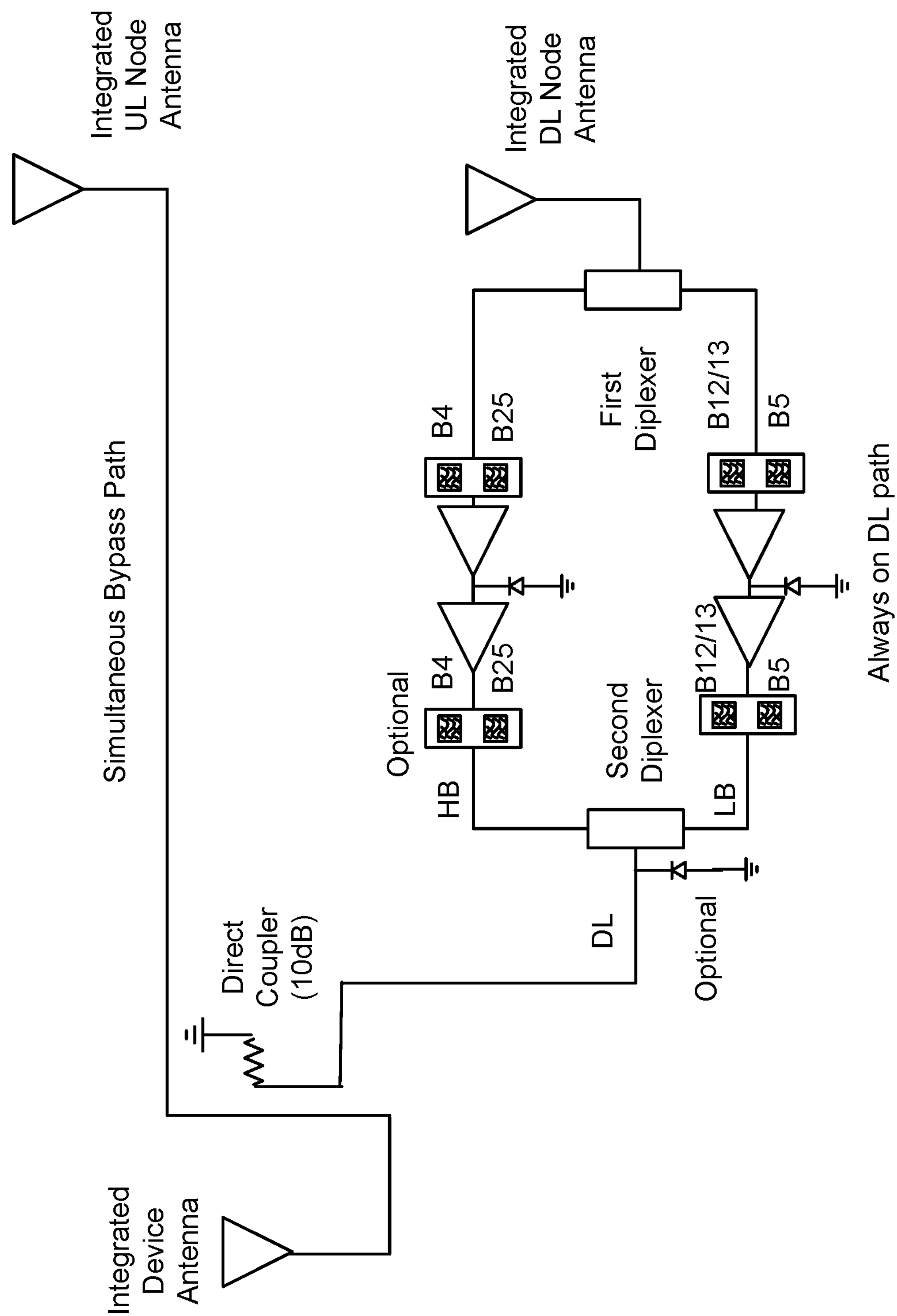
FIG. 7 illustrates a cellular signal amplifier configured with a simultaneous bypass path in accordance with an example.

FIG. 7 illustrates an exemplary cellular signal amplifier configured with a simultaneous bypass path. The cellular signal amplifier can only amplify downlink (DL) signals. The cellular signal amplifier can direct an uplink (UL) signal on a simultaneous bypass path, which enables the UL signal to travel directly from an integrated device antenna to an integrated UL node antenna. In other words, the UL signal can avoid a filtering and amplification path. In this case, when the UL signal is not amplified, the integrated device antenna can be directly coupled to the integrated UL node antenna. The direct coupling between the integrated device antenna and the integrated UL node antenna can be achieved using a directional coupler. The amplification of the UL signal can account for signal loss due to the directional coupler. In addition, by not amplifying the UL signal, a lower specific absorption rate (SAR) level can be achieved.

In one example, a DL signal can be received via an integrated DL node antenna. The DL signal can be directed to a first diplexer. The DL signal can be directed to a high band DL signal amplification path or a low band DL signal amplification path, and then to a second diplexer. The DL signal can travel from the second diplexer to the integrated device antenna for transmission to a wireless device.

In one configuration, the cellular signal amplifier can receive DL signals and transmit UL signals with a single integrated node antenna. In other words, the integrated UL node antenna and the integrated DL node antenna can be combined to form the single integrated node antenna.

In one configuration, the cellular signal amplifier can include the integrated device antenna and an integrated UL/DL node antenna. The integrated device antenna and the integrated UL/DL node antenna can be connected via a simultaneous bypass path, which bypasses the amplification and signaling paths. As an example, an UL signal from the integrated device antenna can be passed to the integrated UL/DL node antenna via the simultaneous bypass path. As another example, a DL signal from the integrated UL/DL node antenna can be passed to the integrated device antenna via the simultaneous bypass path.

In one example, the FCC can limit the cellular signal amplifier to a less than 9 dB system gain because the cellular signal amplifier does not perform UL amplification. In another example, the cellular signal amplifier can include a detector that can detect an UL signal, and then determine whether to turn the DL amplification path on or off. In yet another example, the cellular signal amplifier can include an additional low noise amplifier (LNA) to reduce the noise figure.

Figure 8:
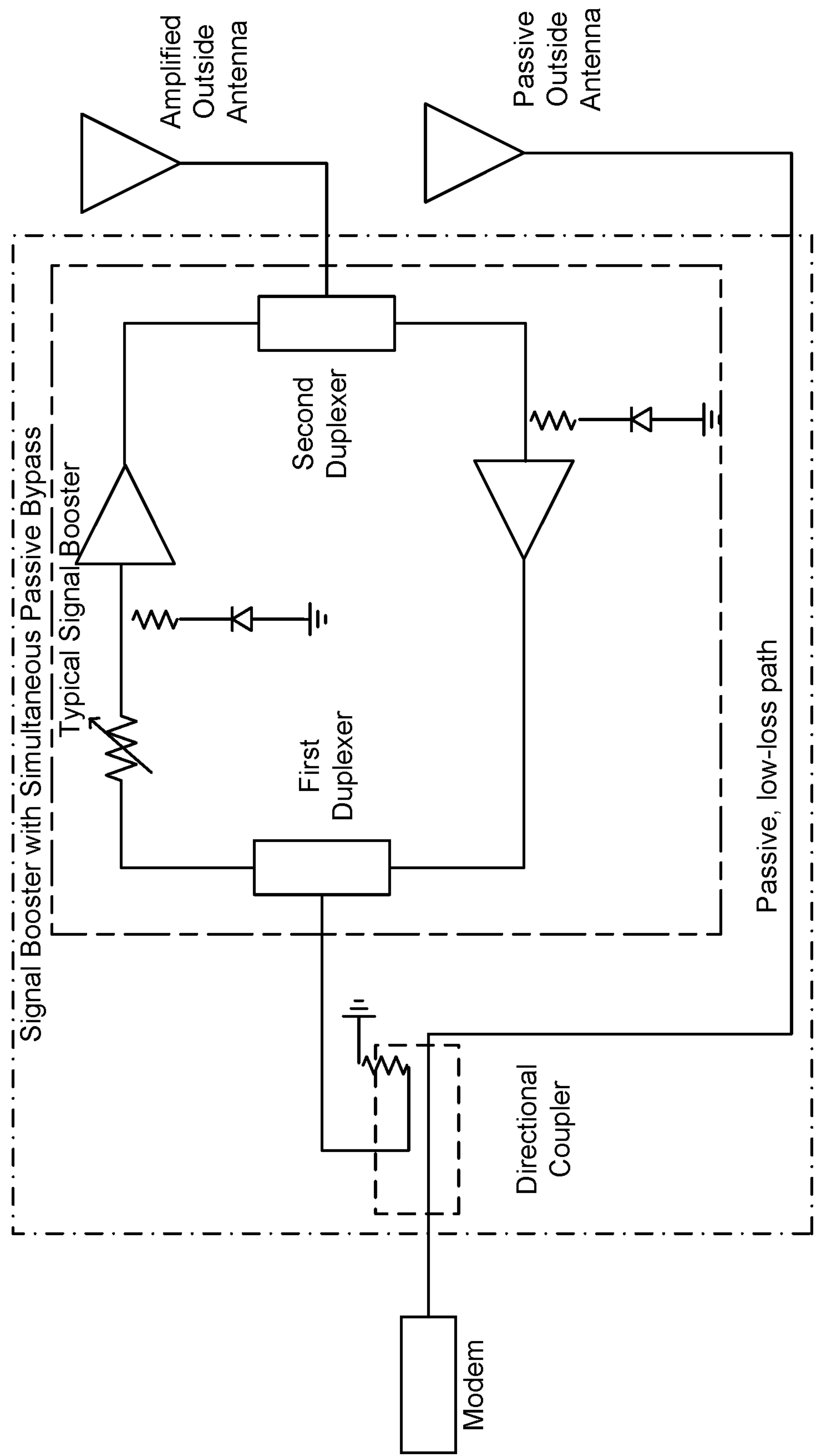
FIG. 8 illustrates a cellular signal amplifier with an amplified outside antenna and a simultaneous bypass path to a passive outside antenna in accordance with an example.

FIG. 8 illustrates an exemplary cellular signal amplifier with an amplified outside antenna and a simultaneous bypass path to a passive outside antenna. A modem (or inside antenna) can be coupled to the cellular signal amplifier for communication of amplified signals through the amplified outside antenna. The cellular signal amplifier can improve modem sensitivity, improve UL output power of the modem and improve overall performance of the modem. The modem can be coupled to the cellular signal amplifier when a power level of uplink (UL) or downlink (DL) signals is below a defined threshold. In addition, the modem can be coupled to the passive antenna for communication of non-amplified signals. These different signal paths can provide the cellular signal amplifier with signal diversity. In one example, the modem (or inside antenna) can be coupled to the cellular signal amplifier using a directional coupler.

In one example, the modem can direct an UL signal to the passive outside antenna via a passive, low-loss path, and the UL signal can be transmitted using the passive outside antenna. The directional coupler can enable the UL signal to travel to the passive, low-loss path. The modem can directly send the UL signal to the passive outside antenna when a power level of the UL signal is above a defined threshold (i.e., the UL signal does not need amplification). Alternatively, the modem can direct the UL signal to a first duplexer. The modem can direct the UL signal to the first duplexer when the power level of the UL signal is below the defined threshold (i.e., the UL signal needs to be amplified). The first duplexer can direct to the UL signal through an amplifier and then to a second duplexer, which can direct the UL signal to the amplified outside antenna.

In one example, the amplified outside antenna can receive a DL signal. The DL signal can be directed to the second duplexer, which can direct the DL signal to an amplifier and then to the first duplexer. The first duplexer can direct the DL signal to the modem (or inside antenna).

In one configuration, the cellular signal amplifier can include circulators, triplexers, quadplexers, duplexers, or splitters instead of the multiplexers.

In one example, the directional coupler can cause a 6 dB gain loss in the signals transmitted across the directional coupler. However, the gain loss can be compensated with an increased gain from the cellular signal amplifier. In addition, the directional coupler can add some loss to the passive, low-loss path, but the loss can be minimized by an increased coupling factor.

Figure 9:
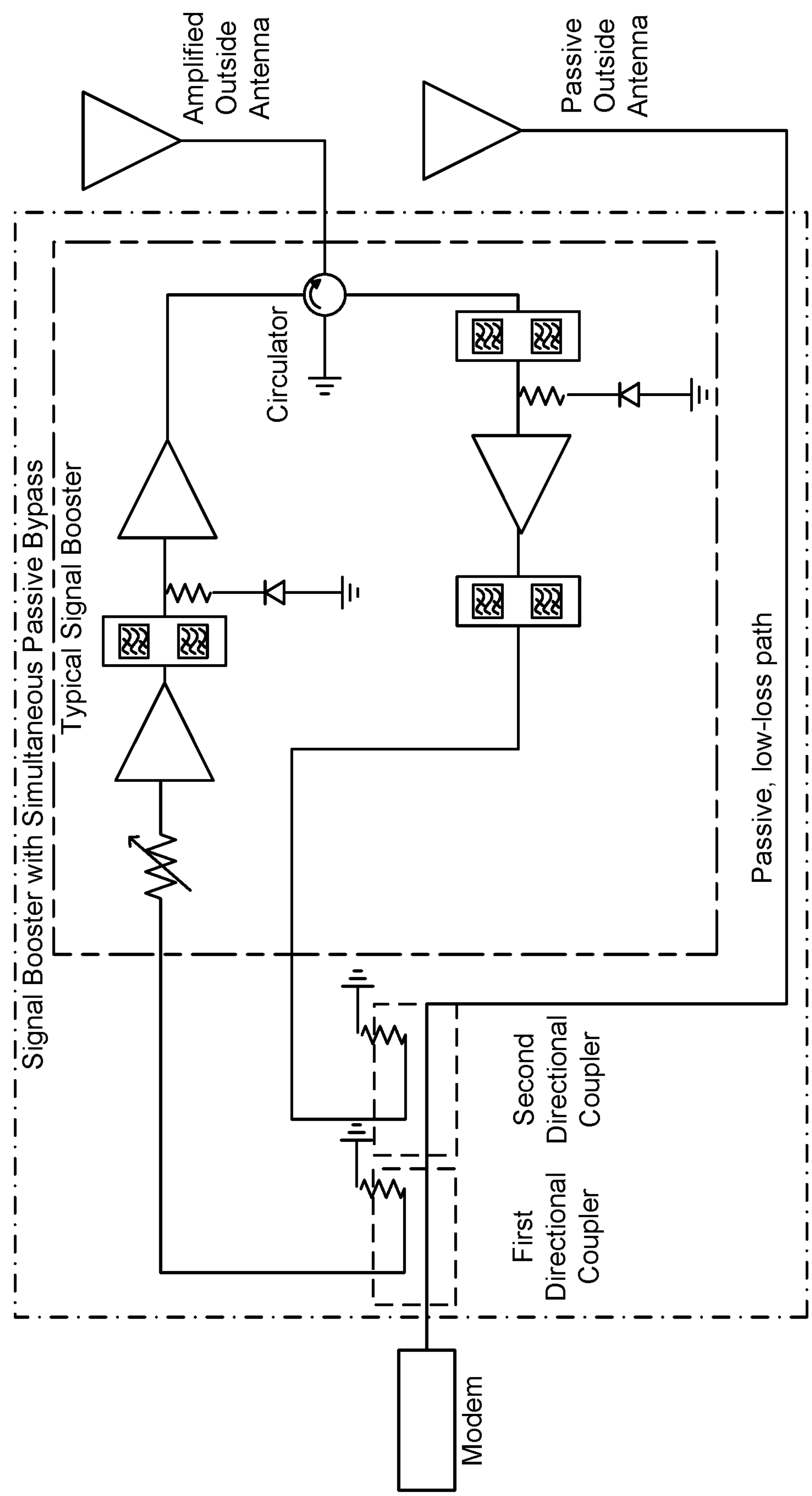
FIG. 9 illustrates a cellular signal amplifier with a simultaneous bypass path with independent coupling for each of an amplified outside antenna and a passive outside antenna in accordance with an example.

FIG. 9 illustrates an exemplary cellular signal amplifier with a simultaneous bypass path with independent coupling for each of an amplified outside antenna and a passive outside antenna. The independent coupling can be achieved with a separate directional coupler for each antenna. In other words, a first directional coupler can be used with the amplified outside antenna, and a second directional coupler can be used with the passive outside antenna. The separate directional couplers can yield higher uplink (UL) to downlink (DL) signal isolation as compared to using splitters.

In one example, a modem (or inside antenna) can direct an UL signal to the passive outside antenna via a passive, low-loss path, and the UL signal can be transmitted using the passive outside antenna. The first directional coupler can enable the UL signal to travel to the passive, low-loss path. The modem can directly send the UL signal to the passive outside antenna when a power level of the UL signal is above a defined threshold (i.e., the UL signal does not need amplification). Alternatively, the modem can direct the UL signal to an UL amplification and filtering path. The modem can direct the UL signal to the UL amplification and filtering path duplexer when the power level of the UL signal is below the defined threshold (i.e., the UL signal needs to be amplified). The first coupler can enable the UL signal to travel to the UL amplification and filtering path. The UL signal can be directed via a circulator to the amplified outside antenna, which can direct the UL signal to a base station.

In one example, the amplified outside antenna can receive a DL signal. The DL signal can be directed to the circulator, which can direct the DL signal to a DL amplification and filtering path. Then, the DL signal can be directed to the modem via the second directional coupler.

In one example, the amplified and non-amplified signals can be broadcast via a single antenna. In other words, a single antenna can be used in place of the amplified outside antenna and the passive outside antenna. In another example, separate antennas can be used for UL and DL on the front end to avoid duplexer or front end losses, which can increase UL output power and DL sensitivity. However, with this example, there can be potential for collisions/interference due to simultaneous signals on the same frequency on the UL and/or DL paths. However, the collisions/interference can be mitigated by signal level adjustments or delays. These adjustments can be detected and controlled using, for example, the modem.

Figure 10:
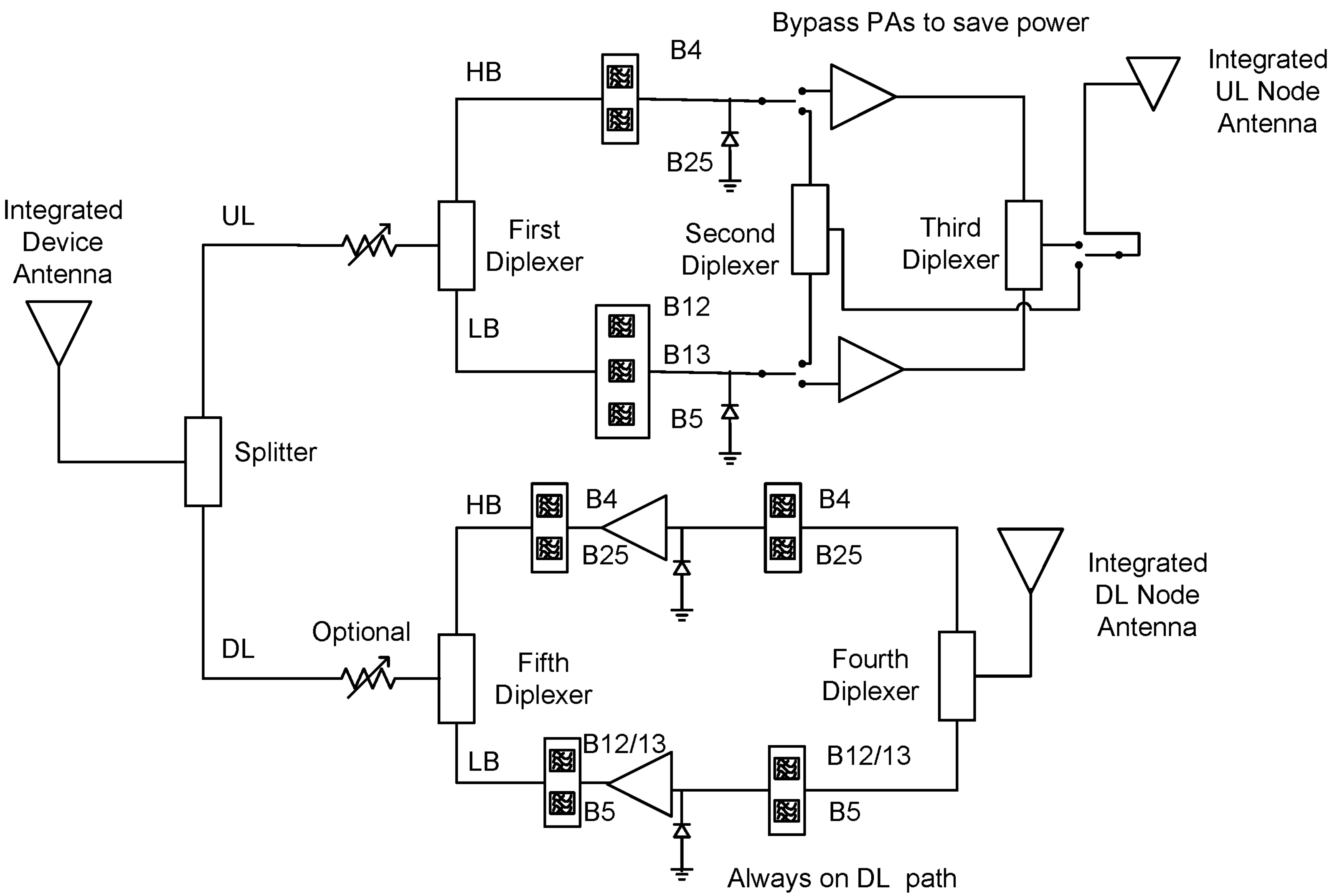
FIG. 10 illustrates a cellular signal amplifier with bypassable power amplifiers in accordance with an example.

FIG. 10 illustrates an exemplary cellular signal amplifier with bypassable power amplifiers. An integrated device antenna can receive an uplink (UL) signal, which can be directed to a splitter, and then to a first diplexer. The first diplexer can direct the UL signal to a high band UL path or a low band UL path. The high band UL path and the low band UL path can each include a bypassable power amplifier. In one example, when the bypassable power amplifiers are switched off (e.g., to save power), the UL signal from the high band UL path or the low band UL path can travel to a second diplexer, then to a third diplexer, and then to an integrated UL node antenna. In this example, the UL signal is not amplified to save power. In addition, the high band UL path and the low band UL path can each include a signal detector, which can detect a power level of the UL signal. When the power level of the UL signal is above a defined threshold, the UL signal may not be amplified.

In another example, when the bypassable power amplifiers are switched on, the UL signal from the high band UL path or the low band UL path can be directed to a respective power amplifier, and then to the third diplexer. The UL signal can travel from the third diplexer to the integrated UL node antenna. In this example, the UL signal can be amplified prior to transmission from the integrated UL node antenna.

In one example, an integrated DL node antenna can direct a DL signal to a fourth diplexer. The fourth diplexer can direct the DL signal to a high band DL signal amplification and filtering path, or to a low band DL signal amplification and filtering path. A fifth diplexer can direct the DL signal to the splitter, which can direct the signal to the integrated device antenna.

Figure 11:
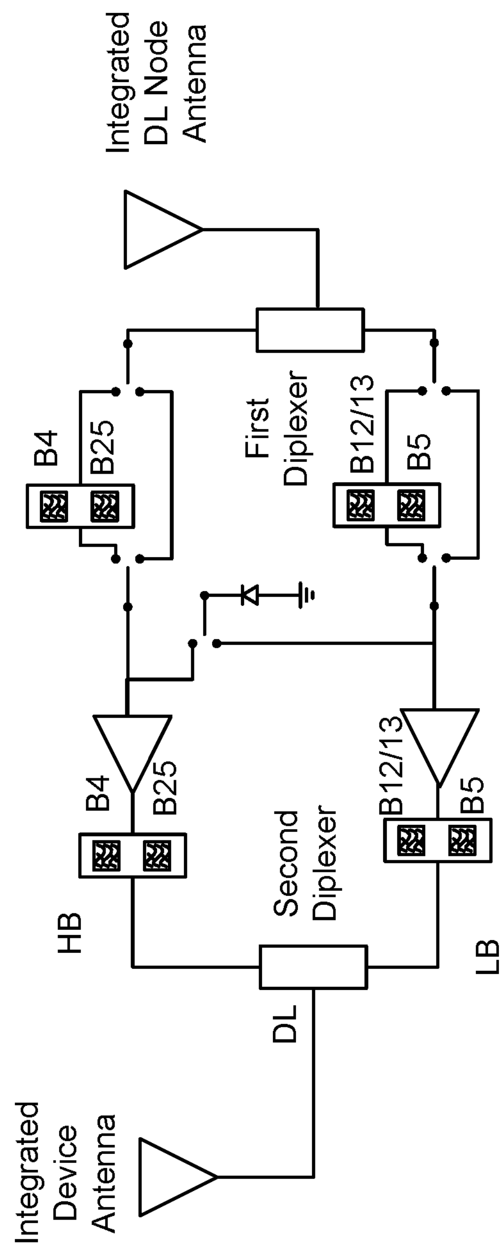
FIG. 11 illustrates a cellular signal amplifier configured with switchable band pass filters (BPFs) in accordance with an example.

FIG. 11 illustrates an exemplary cellular signal amplifier configured with switchable band pass filters (BPFs). Front end BPFs can be switched in when a weak downlink (DL) DL signal is detected or switched out when a strong DL signal is detected. An example of a weak DL signal can be a signal with a signal strength less than −80 dBm while a strong DL signal can be a signal with a signal strength greater than −80 dBm. The minimization of noise figure can be critical in weak signal areas, and the noise figure can be reduced and the coverage extended when the front-end BPFs are switched off. In addition, the switchable BPFs can function to extend a receive sensitivity of the cellular signal amplifier.

In one example, an integrated DL node antenna can receive a DL signal, and the DL signal can be provided to a first diplexer. The first diplexer can direct the DL signal to a high band signal amplification and filtering path, or the DL signal can be directed to a low band signal amplification and filtering path. The high band path and the low band path can each include switchable BPFs, which enable the DL signal to avoid passing through at least some of the BPFs. The DL signal can be directed to a second diplexer, and then to an integrated device antenna.

Figure 12:
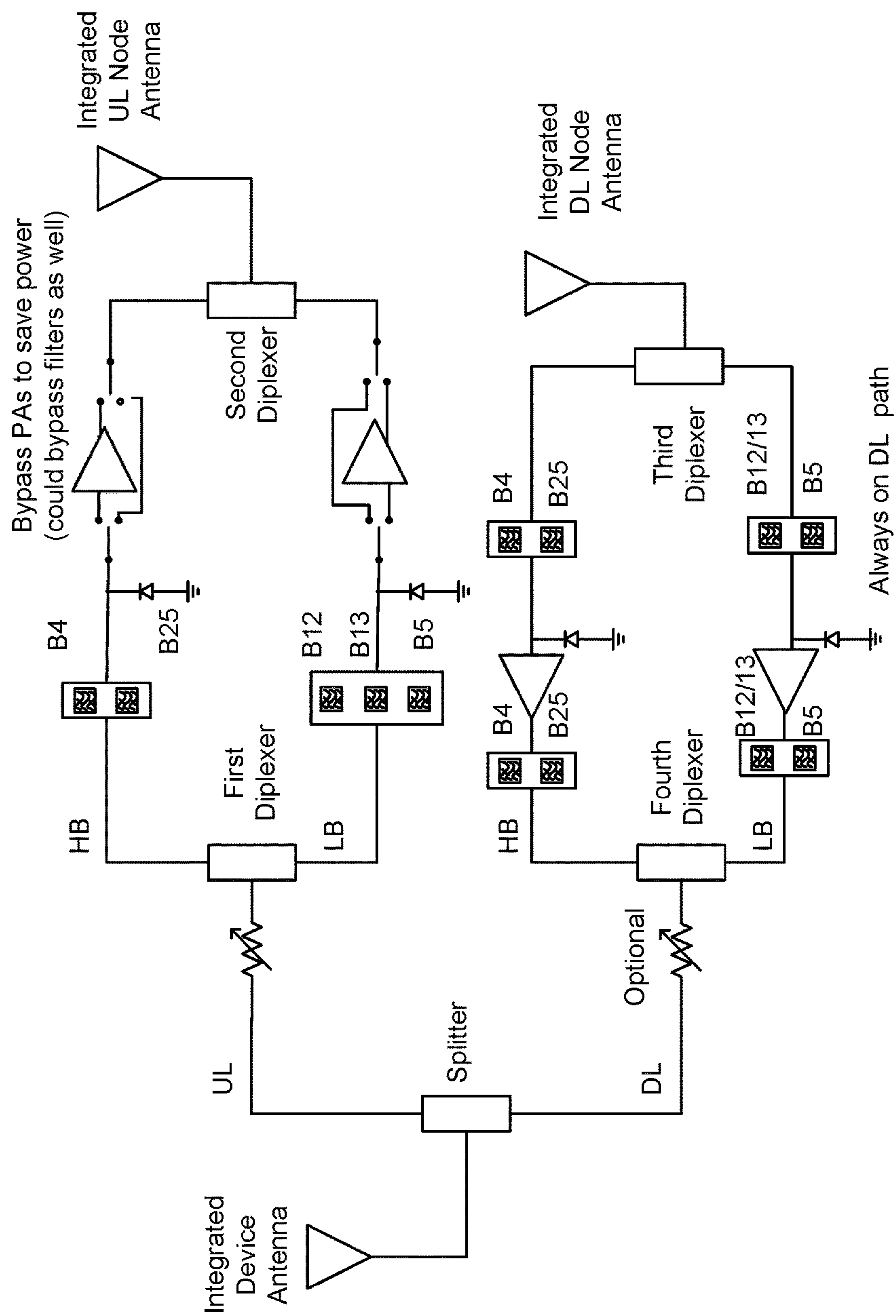
FIG. 12 illustrates a cellular signal amplifier with bypassable power amplifiers in accordance with an example.

FIG. 12 illustrates an exemplary cellular signal amplifier with bypassable power amplifiers. The power amplifiers can be switched on when an uplink (UL) signal needs to be amplified to reach a base station or switched off and bypassed when a UL signal does not need to be amplified to reach a base station. In one example, the power amplifiers can be switched on when a power level of the UL signal is below a defined threshold, and the power amplifiers can be switched off when the power level of the UL signal is above the defined threshold.

In one example, an integrated device antenna can receive an UL signal. The UL signal can be directed to a splitter, and then to a first diplexer. The first diplexer can direct the UL signal to a high band signal amplification and filtering path or a low band signal amplification and filtering path. Each of the high band and low band paths can include a switchable power amplifier. Depending on the power level of the UL signal in relation to the defined threshold, the UL signal can be provided to the power amplifier or bypass the power amplifier to save power. The UL signal can be provided to a second diplexer, and then to an integrated UL node antenna.

In one example, an integrated DL node antenna can direct a DL signal to a third diplexer. The third diplexer can direct the DL signal to a high band DL signal amplification and filtering path, or to a low band DL signal amplification and filtering path. A fourth diplexer can direct the DL signal to the splitter, which can direct the signal to the integrated device antenna.

Figure 13:
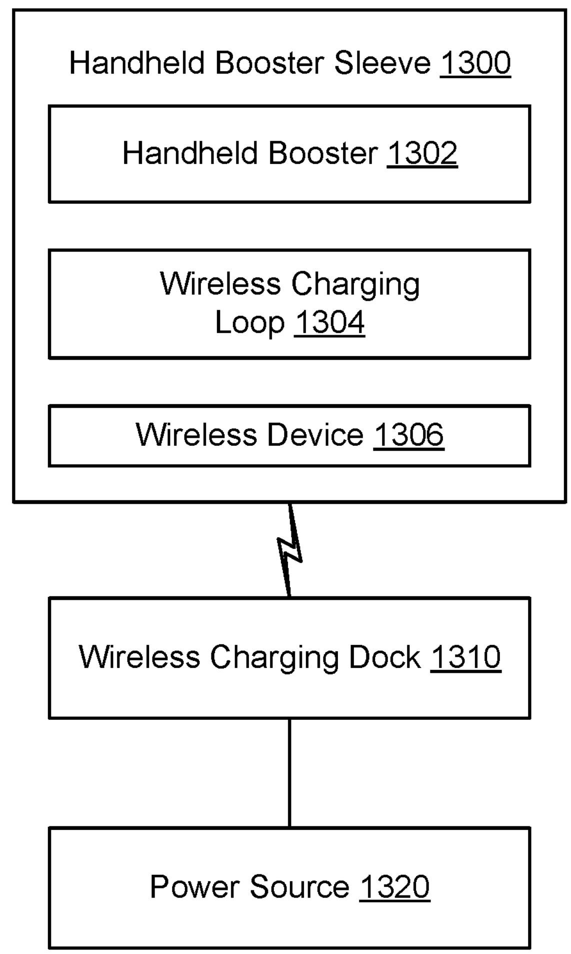
FIG. 13 illustrates a handheld booster sleeve configured to wirelessly charge a wireless device located within the handheld booster sleeve in accordance with an example.

FIG. 13 illustrates an example of a handheld booster sleeve 1300 configured to wirelessly charge a wireless device 1306 located within the handheld booster sleeve 1300. The handheld booster sleeve 1300 can hold a handheld booster 1302. The handheld booster sleeve 1300 can include a wireless charging loop 1304 and integrated circuitry to enable wireless charging in the handheld booster sleeve 1300. Alternatively, the wireless charging loop 1304 can be integrated with the handheld booster 1302. By placing the wireless device 1306 with the handheld booster 1302 within the handheld booster sleeve 1300, and placing the handheld booster sleeve 1300 in proximity to a wireless charging dock 1310, the wireless device 1306 (and battery) can wirelessly charge. The wireless charging dock 1310 can be connected to a power source 1320, such as a wall outlet. This feature can enable wireless devices that are not configured for wireless charging to be wireless charged.

In one example, a cellular signal booster can be configured for wireless charging. For example, a cellular signal booster can be configured with a wireless charging dock, such that a wireless charging-enabled wireless device can be charged. Examples of the cellular signal boosters that can perform wireless charging include signal boosters found in homes, offices, and in vehicles.

Figure 14:
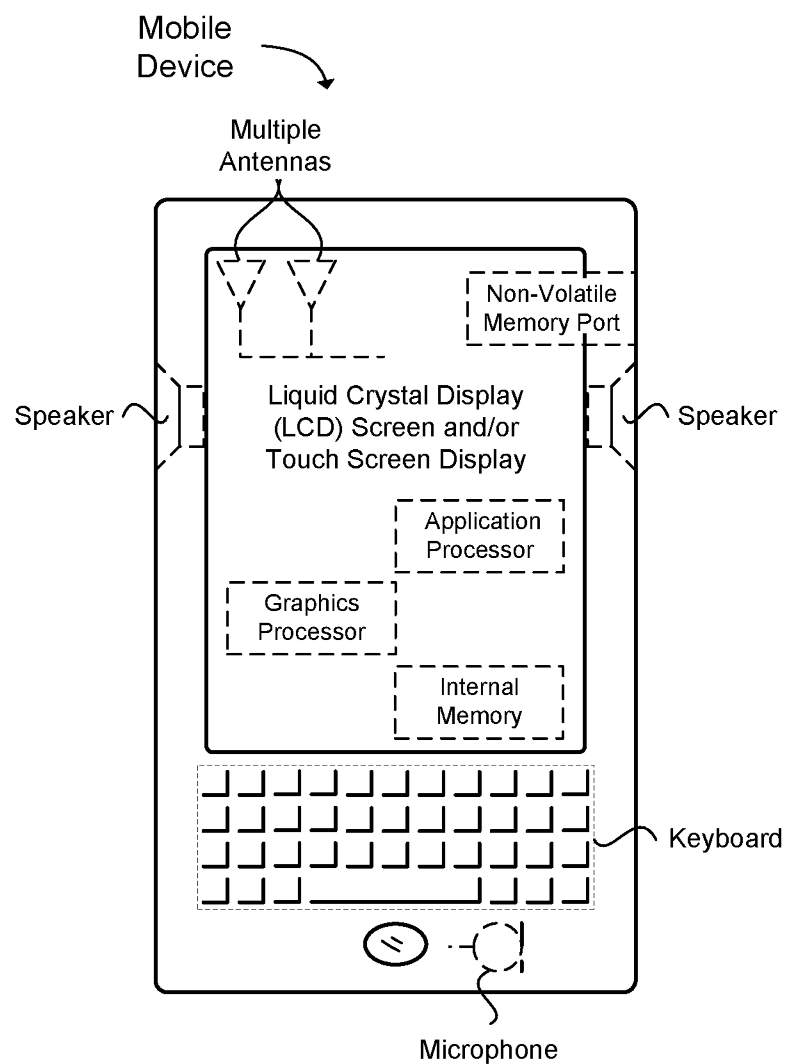
FIG. 14 illustrates a wireless device in accordance with an example.

FIG. 14 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

Figure 15A:
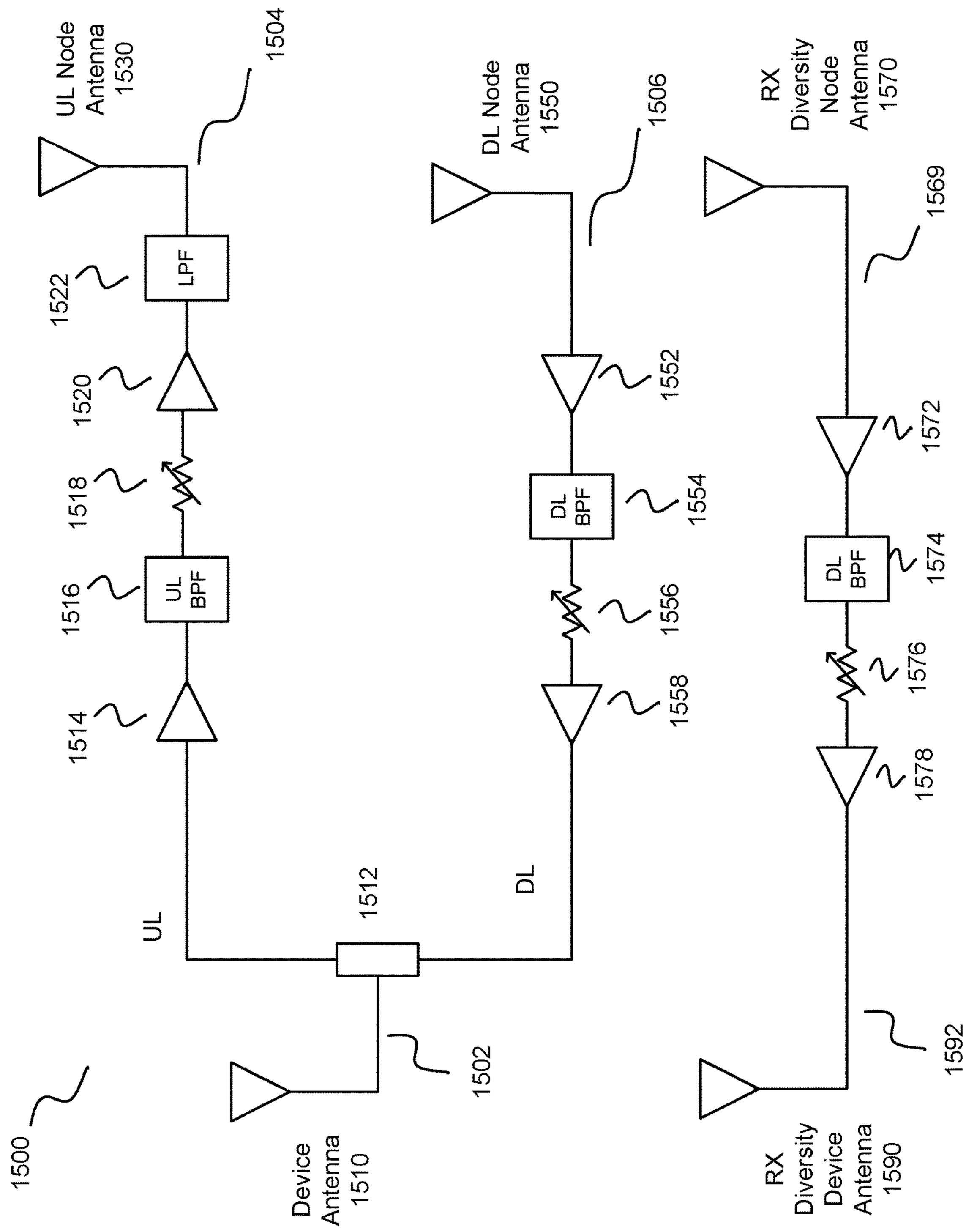
FIG. 15*a* illustrates a repeater with a receive diversity antenna port in accordance with an example.

In another example, as illustrated in FIG. 15*a*, a repeater can comprise a separate uplink node port and a downlink node port. The uplink node port can be configured to be coupled to an uplink node port. Similarly, the downlink node port can be configured to be coupled to a downlink node antenna. The use of two separate node ports can eliminate or reduce loss that typically occurs in a diplexer, duplexer, and/or multiplexer that is used to couple an uplink path with a downlink path at a single node. In addition, a receive diversity antenna port can be coupled to a receive diversity amplification and filtering path to enable the repeater 1500 to be configured to be coupled to a receive diversity device antenna 1590 and a receive diversity node antenna 1570. The receive diversity amplification and filtering path can allow a downlink signal to be amplified from the receive diversity node antenna to optimize reception of a downlink signal transmitted from a base station to a user device having a diversity antenna to allow the user device to use spatial diversity in receiving the downlink signal.

In another example, the use of a separate UL node antenna, DL node antenna, and RX diversity node antenna can optimize the output power over the band because the antenna load impedance can change less frequently due to a lower quality (Q) factor. In one example, impedance matching can be difficult with filters, especially over wide bandwidths, because of the high Q factor that varies over frequency more frequently. As such, the output of a power amplifier can be optimized when coupled to common output impedance (e.g., separate antennas) instead of a varying output impedance (e.g., filters).

In another example, coupling a filter to the output of the power amplifier can increase the chances of a filter breaking. In one example, surface acoustic wave (SAW) filters or bulk acoustic wave (BAW) filters can only have a maximum input power of about 28-32 decibel-milliwatts (dBm) before breaking. In one example, ceramic filters can only have a maximum input power of about 36 dBm before breaking. Removing the filter from the output of the power amplifier by using separate antennas can reduce the chances of filter breakage and allow the use of higher-power PAs.

In the example of FIG. 15*a*, a bi-directional inside antenna port 1502 or bi-directional device antenna port 1502 can be configured to be coupled to an integrated device antenna 1510 or a bi-directional inside antenna 1510. The integrated device antenna 1510 can receive an UL signal from a UE. The bi-directional inside antenna port 1502 can be configured to be coupled to a duplexer 1512. The duplexer 1512 can split into an UL path and a DL path. While a duplexer is illustrated in FIG. 15*a*, it is not intended to be limiting. A duplexer, as used in FIGS. 15*a*-*d*, and 15*f*, can be a duplexer, a diplexer, a multiplexer, a circulator, or a splitter.

In another example, the UL path can comprise one or more of a low-noise amplifier 1514, an UL band-pass filter (BPF) 1516, a variable attenuator 1518, a power amplifier (PA) 1520, or a low-pass filter (LPF) 1522. The low-noise amplifier 1514 can be an UL low-noise amplifier, the variable attenuator 1518 can be an UL variable attenuator, the power amplifier 1520 can be an UL power amplifier, and the low-pass filter 1522 can be an UL low-pass filter or low-order filtering. In another example, the power amplifier 1520 can comprise a variable gain power amplifier, a fixed-gain power amplifier, or a gain block. In another example, the LPF 1522 can be configured to be coupled between the power amplifier 1520 and an UL outside antenna port 1504 or UL node antenna port 1504 to filter harmonics emitted by the power amplifier 1520. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1520.

In another example, the power amplifier 1520 can be configured to be coupled directly to the UL outside antenna port 1504 without filtering between the power amplifier 1520 and the UL outside antenna port. In another example, the UL BPF 1516 can be an FDD UL BPF configured to pass one or more of 3GPP FDD frequency bands 2, 4, 5, 12, 13, 17, 25, 26, or 71. In another example, the UL BPF 1516 can be an FDD UL BPF configured to pass one or more of 3GPP LTE FDD frequency bands 1-28, 30, 31, 65, 66, 68, 70-74, or 85. In another example, the UL BPF 1516 can be an LTE or 5G FDD UL BPF configured to pass a selected channel within an LTE or 5G 3GPP FDD band. In another example, the UL BPF 1516 can be an LTE or 5G FDD UL BPF configured to pass a selected frequency range within an LTE or 5G 3GPP FDD band.

In another example, after traveling on the UL path, the UL signal can be amplified and filtered in accordance with the type of amplifiers and BPFs included on the UL path. The UL signal can be directed to an UL node antenna port 1504. The UL signal can be directed from the UL node antenna port 1504 to an integrated UL node antenna 1530 or an UL outside antenna 1530. The UL node antenna 1530 can be an omnidirectional antenna or a directional antenna. The UL outside antenna 1530 can communicate the amplified and/or filtered UL signal to a base station.

In another example, an integrated DL node antenna port 1506 or DL outside antenna port 1506 can be configured to be coupled to an integrated DL node antenna 1550 or a DL outside antenna 1550. The integrated DL node antenna 1550 can be an omnidirectional antenna or directional antenna. The integrated DL node antenna 1550 can receive a DL signal from a base station. The DL outside antenna port 1506 can be configured to be coupled to a low-noise amplifier 1552.

In another example, the DL path can comprise one or more of the low-noise amplifier 1552, a DL band-pass filter (BPF) 1554, a variable attenuator 1556, or a power amplifier (PA) 1558. The low-noise amplifier 1552 can be a DL low-noise amplifier, the variable attenuator 1556 can be a DL variable attenuator, and the power amplifier 1558 can be a DL power amplifier. In another example, the power amplifier 1558 can comprise a variable gain power amplifier, a fixed-gain power amplifier, or a gain block. In another example, the low-noise amplifier 1552 can be configured to be coupled directly to a DL outside antenna port 1506 without filtering between the low-noise amplifier 1552 and the DL outside antenna port. In another example, the DL BPF 1554 can be an FDD DL BPF configured to pass one or more of 3GPP FDD frequency bands 2, 4, 5, 12, 13, 17, 25, 26, or 71. In another example, the DL BPF 1554 can be an FDD DL BPF configured to pass one or more of 3GPP FDD frequency bands 1-28, 30, 31, 65, 66, 68, 70-74, or 85. In another example, the DL BPF 1554 can be an FDD DL BPF configured to pass a selected channel within a 3GPP FDD band. In another example, the DL BPF 1554 can be an FDD DL BPF configured to pass a selected frequency range within a 3GPP FDD band.

In another example, after traveling on the DL path, the DL signal can be amplified and filtered in accordance with the type of amplifiers and BPFs included on the DL path. The DL signal can be directed from the power amplifier 1558 to a duplexer 1512. The DL signal can be directed from the duplexer 1512 to an integrated device antenna 1510 or a bi-directional inside antenna 1510. The integrated device antenna 1510 can communicate the amplified and/or filtered DL signal to a UE.

In another example, a receive diversity DL outside antenna port 1569 or receive diversity DL node antenna port 1569 or receive diversity DL donor antenna port 1569 can be configured to be coupled to a receive diversity DL outside antenna 1570 or receive diversity DL node antenna 1570 or receive diversity DL donor antenna 1570. The receive diversity DL node antenna 1570 can be an omnidirectional antenna or directional antenna. The receive diversity DL node antenna 1570 can receive a DL signal from a base station. The receive diversity DL outside antenna port 1569 can be configured to be coupled to a low-noise amplifier 1572.

In another example, the receive diversity DL path can comprise one or more of the low-noise amplifier 1572, a DL band-pass filter (BPF) 1574, a variable attenuator 1576, or a power amplifier (PA) 1578. The low-noise amplifier 1572 can be a DL low-noise amplifier, the variable attenuator 1576 can be a DL variable attenuator, and the power amplifier 1578 can be a DL power amplifier. In another example, the power amplifier 1578 can comprise a variable gain power amplifier, a fixed-gain power amplifier, or a gain block. In another example, the low-noise amplifier 1572 can be configured to be coupled directly to a receive diversity DL outside antenna port 1569 without filtering between the low-noise amplifier 1572 and the receive diversity DL outside antenna port 1569. In another example, the DL BPF 1574 can be an FDD DL BPF configured to pass one or more of 3GPP FDD frequency bands 2, 4, 5, 12, 13, 17, 25, 26, or 71. In another example, the DL BPF 1574 can be an FDD DL BPF configured to pass one or more of 3GPP FDD frequency bands 1-28, 30, 31, 65, 66, 68, 70-74, or 85. In another example, the DL BPF 1574 can be an FDD DL BPF configured to pass a selected channel within a 3GPP FDD band. In another example, the DL BPF 1574 can be an FDD DL BPF configured to pass a selected frequency range within a 3GPP FDD band. In another example, in an alternative, the receive diversity DL path can comprise the receive diversity DL outside antenna port 1569 coupled to a bypass path coupled between the receive diversity DL inside antenna port 1592 and the receive diversity DL outside antenna port 1569. The bypass path can be configured to not amplify or filter signals traveling on the bypass path.

In another example, after traveling on the receive diversity DL path, the receive diversity signal can be amplified and filtered in accordance with the type of amplifiers and BPFs included on the receive diversity DL path. In another example, in an alternative, the receive diversity signal can travel on a bypass path coupled between the receive diversity DL inside antenna port 1592 and the receive diversity DL outside antenna port 1569, wherein the bypass path does not amplify or filter the receive diversity signal. The receive diversity signal can be directed from the power amplifier 1578 to a receive diversity device antenna port 1592 or a receive diversity downlink inside antenna port 1592. The receive diversity device antenna port 1592 or a receive diversity downlink inside antenna port 1592 can be configured to be coupled to receive diversity device antenna 1590 or a receive diversity downlink inside antenna 1590. The receive diversity device antenna 1590 can communicate the amplified and/or filtered or bypassed receive diversity signal to a UE.

Figure 15B:
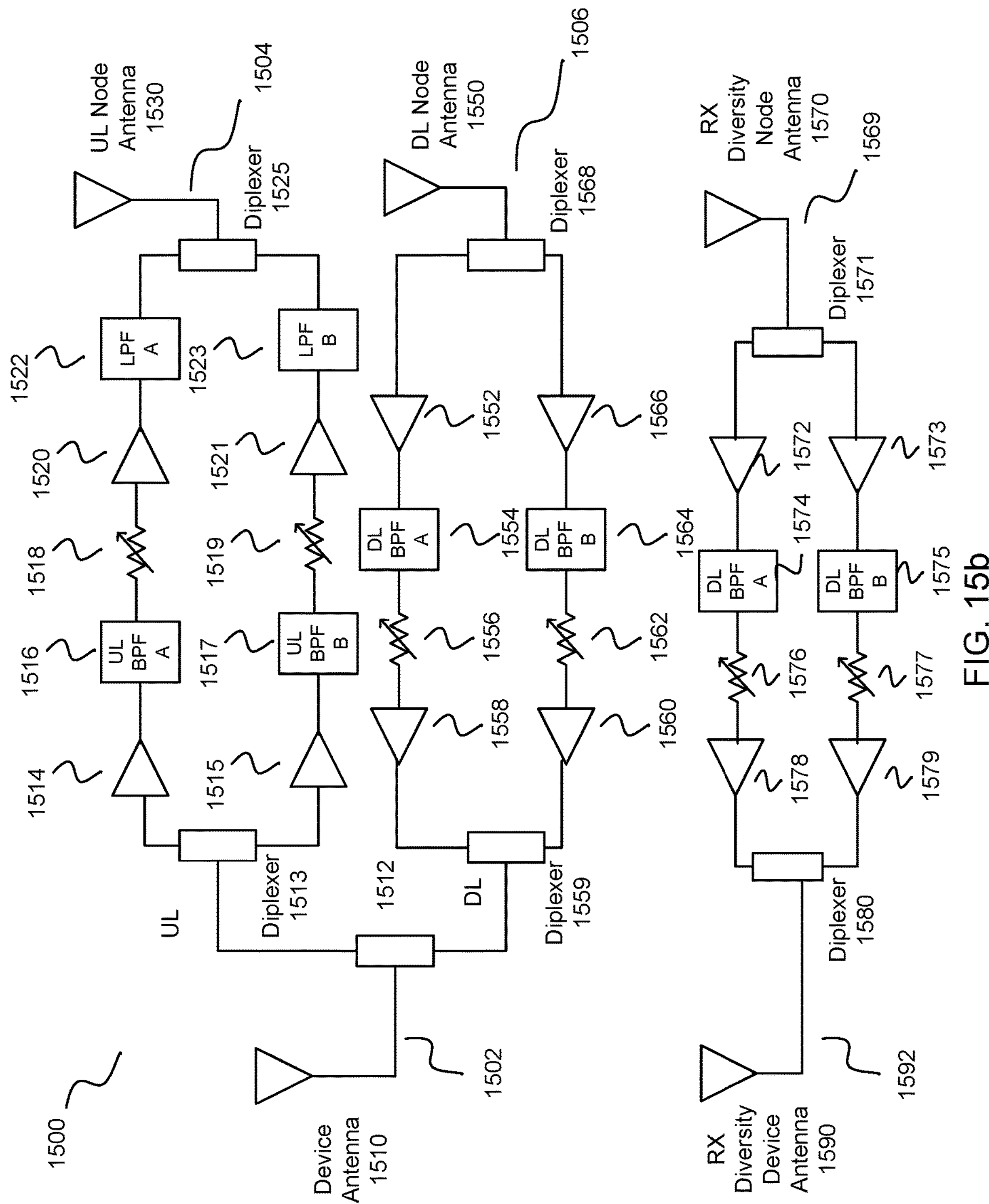
FIG. 15*b* illustrates a multiband repeater with a receive diversity antenna port in accordance with an example.

In another example, as illustrated in FIG. 15*b*, a multiband repeater can comprise a receive diversity antenna port. In this example, a bi-directional inside antenna port 1502 or bi-directional device antenna port 1502 can be configured to be coupled to an integrated device antenna 1510 or a bi-directional inside antenna 1510. The integrated device antenna 1510 can receive an UL signal from a UE. The bi-directional inside antenna port 1502 can be configured to be coupled to a duplexer 1512. The duplexer 1512 can split into an UL path and a DL path. In another example, the UL path can further comprise a first UL path and a second UL path. A diplexer 1513 can direct an UL signal to the first UL path or the second UL path. The diplexer 1513 can be a duplexer, a common direction duplexer, a diplexer, a multiplexer, a circulator, or a splitter.

In another example, a first UL path can comprise one or more of a low-noise amplifier 1514, an UL band-pass filter (BPF) 1516, a variable attenuator 1518, a power amplifier (PA) 1520, or a low-pass filter (LPF) 1522. The low-noise amplifier 1514 can be an UL low-noise amplifier, the variable attenuator 1518 can be an UL variable attenuator, the power amplifier 1520 can be a UL power amplifier, and the low-pass filter 1522 can be an UL low-pass filter or low-order filtering. In another example, the power amplifier 1520 can comprise a variable gain power amplifier, a fixed-gain power amplifier, or a gain block. In another example, the LPF can be configured to be coupled between the power amplifier 1520 and an UL outside antenna port 1504 or UL node antenna port 1504 to filter harmonics emitted by the power amplifier 1520. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1520. In another example, the power amplifier 1520 can be configured to be coupled directly to the UL outside antenna port 1504 without filtering between the power amplifier 1520 and the UL outside antenna port. In another example, the UL BPF 1516 can be an FDD UL BPF configured to pass one or more of 3GPP FDD frequency bands 2, 4, 5, 12, 13, 17, 25, 26, or 71. In another example, the UL BPF 1516 can be an FDD UL BPF configured to pass one or more of 3GPP FDD frequency bands 1-28, 30, 31, 65, 66, 68, 70-74, or 85. In another example, the UL BPF 1516 can be an FDD UL BPF configured to pass a selected channel within a 3GPP FDD band. In another example, the UL BPF 1516 can be an FDD UL BPF configured to pass a selected frequency range within a 3GPP FDD band.

In another example, a second UL path can comprise one or more of a low-noise amplifier 1515, an UL band-pass filter (BPF) 1517, a variable attenuator 1519, a power amplifier (PA) 1521, or a low-pass filter (LPF) 1523. The low-noise amplifier 1515 can be an UL low-noise amplifier, the variable attenuator 1519 can be an UL variable attenuator, the power amplifier 1521 can be a UL power amplifier, and the low-pass filter 1523 can be an UL low-pass filter or low-order filtering. In another example, the power amplifier 1521 can comprise a variable gain power amplifier, a fixed-gain power amplifier, or a gain block.

In another example, the LPF 1523 can be configured to be coupled between the power amplifier 1521 and an UL outside antenna port 1504 or UL node antenna port 1504 to filter harmonics emitted by the power amplifier 1521. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1521. In another example, the power amplifier 1521 can be configured to be coupled to the UL outside antenna port 1504 without filtering between the power amplifier 1521 and the UL outside antenna port 1504. In another example, the UL BPF 1517 can be an FDD UL BPF configured to pass one or more of 3GPP FDD frequency bands 2, 4, 5, 12, 13, 17, 25, 26, or 71, wherein the one or more 3GPP frequency bands passed on the second UL path can be different from the 3GPP frequency bands passed on the first UL path. In another example, the UL BPF 1517 can be an FDD UL BPF configured to pass one or more of 3GPP FDD frequency bands 1-28, 30, 31, 65, 66, 68, 70-74, or 85, wherein the one or more 3GPP frequency bands passed on the second UL path can be different from the 3GPP frequency bands passed on the first UL path.

In another example, the UL BPF 1517 can be an FDD UL BPF configured to pass a selected channel within a 3GPP FDD band, wherein the selected channel passed on the second UL path can be different from the selected channel passed on the first UL path. In another example, the UL BPF 1517 can be an FDD UL BPF configured to pass a selected frequency range within a 3GPP FDD band, wherein the selected frequency range passed on the second UL path can be different from the selected frequency range passed on the first UL path.

In another example, after traveling on the first or second UL paths, the UL signal on the first UL path and the UL signal on the second UL path can be amplified and filtered in accordance with the type of amplifiers and BPFs included on the first UL path or the second UL path. The signal from the first UL path and the signal from the second UL path can be directed to a diplexer 1525. The diplexer 1525 can be a duplexer, a common direction duplexer, a diplexer, a multiplexer, a circulator, or a splitter. From the diplexer 1525, the combined UL signal can be directed to an UL node antenna port 1504. The UL signal can be directed from the UL node antenna port 1504 to an integrated UL node antenna 1530 or an UL outside antenna 1530. The UL node antenna 1530 can be an omnidirectional antenna or a directional antenna. The UL outside antenna 1530 can communicate the amplified and/or filtered UL signal to a base station.

In another example, an integrated DL node antenna port 1506 or DL outside antenna port 1506 can be configured to be coupled to an integrated DL node antenna 1550 or a DL outside antenna 1550. The integrated DL node antenna 1550 can be an omnidirectional antenna or directional antenna. The integrated DL node antenna 1550 can receive a DL signal from a base station. The DL outside antenna port 1506 can be configured to be coupled to a diplexer 1568 that can be configured to direct a DL signal on a first DL path or a second DL path. The diplexer 1568 can be a duplexer, a common direction duplexer, a diplexer, a multiplexer, a circulator, or a splitter.

In another example, the first DL path can comprise one or more of a low-noise amplifier 1552, a DL band-pass filter (BPF) 1554, a variable attenuator 1556, or a power amplifier (PA) 1558. The low-noise amplifier 1551 can be a DL low-noise amplifier, the variable attenuator 1556 can be a DL variable attenuator, and the power amplifier 1558 can be a DL power amplifier. In another example, the power amplifier 1558 can comprise a variable gain power amplifier, a fixed-gain power amplifier, or a gain block. In another example, the low-noise amplifier 1552 can be configured to be coupled to a DL outside antenna port 1506 without filtering between the low-noise amplifier 1552 and the DL outside antenna port. In another example, the DL BPF 1554 can be an FDD DL BPF configured to pass one or more of 3GPP FDD frequency bands 2, 4, 5, 12, 13, 17, 25, 26, or 71. In another example, the DL BPF 1554 can be an FDD DL BPF configured to pass one or more of 3GPP FDD frequency bands 1-28, 30, 31, 65, 66, 68, 70-74, or 85. In another example, the DL BPF 1554 can be an FDD DL BPF configured to pass a selected channel within a 3GPP FDD band. In another example, the DL BPF 1554 can be an FDD DL BPF configured to pass a selected frequency range within a 3GPP FDD band.

In another example, the second DL path can comprise one or more of a low-noise amplifier 1566, a DL band-pass filter (BPF) 1564, a variable attenuator 1562, or a power amplifier (PA) 1560. The low-noise amplifier 1566 can be a DL low-noise amplifier, the variable attenuator 1562 can be a DL variable attenuator, and the power amplifier 1560 can be a DL power amplifier. In another example, the power amplifier 1560 can comprise a variable gain power amplifier, a fixed-gain power amplifier, or a gain block. In another example, the low-noise amplifier 1566 can be configured to be coupled to a DL outside antenna port 1506 without filtering between the low-noise amplifier 1566 and the DL outside antenna port 1506. In another example, the DL BPF 1564 can be an FDD DL BPF configured to pass one or more of 3GPP FDD frequency bands 2, 4, 5, 12, 13, 17, 25, 26, or 71, wherein the one or more 3GPP frequency bands passed on the second DL path can be different from the 3GPP frequency bands passed on the first DL path. In another example, the DL BPF 1564 can be an FDD DL BPF configured to pass one or more of 3GPP FDD frequency bands 1-28, 30, 31, 65, 66, 68, 70-74, or 85, wherein the one or more 3GPP frequency bands passed on the second DL path can be different from the 3GPP frequency bands passed on the first DL path. In another example, the DL BPF 1564 can be an FDD DL BPF configured to pass a selected channel within a 3GPP FDD band, wherein the selected channel passed on the second DL path can be different from the selected channel passed on the first DL path. In another example, the DL BPF 1564 can be an FDD DL BPF configured to pass a selected frequency range within a 3GPP FDD band, wherein the selected frequency range passed on the second DL path can be different from the selected frequency range passed on the first DL path.

In another example, after traveling on the first DL path or the second DL path, the DL signal on the first DL path and the DL signal on the second DL path can be amplified and filtered in accordance with the type of amplifiers and BPFs included on the first DL path and the second DL path. The signal from the first DL path and the signal from the second DL path can be directed to a diplexer 1559. The diplexer 1559 can be a duplexer, a common direction duplexer, a diplexer, a multiplexer, a circulator, or a splitter. From the diplexer 1559, the combined DL signal can be directed to a duplexer 1512. The DL signal can be directed from the duplexer 1512 to an integrated device antenna 1510 or a bi-directional inside antenna 1510. The integrated device antenna 1510 can communicate the amplified and/or filtered DL signal to a UE.

In another example, a receive diversity DL outside antenna port 1569 or receive diversity DL node antenna port 1569 or receive diversity DL donor antenna port 1569 can be configured to be coupled to a receive diversity DL outside antenna 1570 or receive diversity DL node antenna 1570 or receive diversity DL donor antenna 1570. The receive diversity DL node antenna 1570 can be an omnidirectional antenna or directional antenna. The receive diversity DL node antenna 1570 can receive a DL signal from a base station. The receive diversity DL outside antenna port 1569 can be configured to be coupled to a diplexer 1571 that can be configured to direct a DL signal on a first receive diversity DL path or a second received diversity DL path. The diplexer 1571 can be a duplexer, a common direction duplexer, a diplexer, a multiplexer, a circulator, or a splitter.

In another example, the first receive diversity DL path can comprise one or more of a low-noise amplifier 1572, a DL band-pass filter (BPF) 1574, a variable attenuator 1576, or a power amplifier (PA) 1578. The low-noise amplifier 1572 can be a DL low-noise amplifier, the variable attenuator 1576 can be a DL variable attenuator, and the power amplifier 1578 can be a DL power amplifier. In another example, the power amplifier 1578 can comprise a variable gain power amplifier, a fixed-gain power amplifier, or a gain block. In another example, the low-noise amplifier 1572 can be configured to be coupled directly to a receive diversity DL outside antenna port 1569 without filtering between the low-noise amplifier 1572 and the receive diversity DL outside antenna port 1569. In another example, the DL BPF 1574 can be an FDD DL BPF configured to pass one or more of 3GPP FDD frequency bands 2, 4, 5, 12, 13, 17, 25, 26, or 71. In another example, the DL BPF 1574 can be an FDD DL BPF configured to pass one or more of 3GPP FDD frequency bands 1-28, 30, 31, 65, 66, 68, 70-74, or 85. In another example, the DL BPF 1574 can be an FDD DL BPF configured to pass a selected channel within a 3GPP FDD band. In another example, the DL BPF 1574 can be an FDD DL BPF configured to pass a selected frequency range within a 3GPP FDD band. In another example, in an alternative, the receive diversity DL path can comprise the receive diversity DL outside antenna port 1569 coupled to a bypass path coupled between the receive diversity DL inside antenna port 1592 and the receive diversity DL outside antenna port 1569. The bypass path can be configured to not amplify or filter signals traveling on the bypass path.

In another example, the second receive diversity DL path can comprise one or more of a low-noise amplifier 1573, a DL band-pass filter (BPF) 1575, a variable attenuator 1577, or a power amplifier (PA) 1579. The low-noise amplifier 1573 can be a DL low-noise amplifier, the variable attenuator 1577 can be a DL variable attenuator, and the power amplifier 1579 can be a DL power amplifier. In another example, the power amplifier 1579 can comprise a variable gain power amplifier, a fixed-gain power amplifier, or a gain block. In another example, the low-noise amplifier 1573 can be configured to be coupled directly to a receive diversity DL outside antenna port 1569 without filtering between the low-noise amplifier 1573 and the receive diversity DL outside antenna port 1569. In another example, the DL BPF 1575 can be an FDD DL BPF configured to pass one or more of 3GPP FDD frequency bands 2, 4, 5, 12, 13, 17, 25, 26, or 71, wherein the one or more 3GPP frequency bands passed on the second receive diversity DL path can be different from the 3GPP frequency bands passed on the first receive diversity DL path. In another example, the DL BPF 1575 can be an FDD DL BPF configured to pass one or more of 3GPP FDD frequency bands 1-28, 30, 31, 65, 66, 68, 70-74, or 85, wherein the one or more 3GPP frequency bands passed on the second receive diversity DL path can be different from the 3GPP frequency bands passed on the first receive diversity DL path. In another example, the DL BPF 1575 can be an FDD DL BPF configured to pass a selected channel within a 3GPP FDD band, wherein the selected channel passed on the second receive diversity DL path can be different from the selected channel passed on the first receive diversity DL path. In another example, the DL BPF 1575 can be an FDD DL BPF configured to pass a selected frequency range within a 3GPP FDD band, wherein the selected frequency range passed on the second receive diversity DL path can be different from the selected frequency range passed on the first receive diversity DL path. In another example, in an alternative, the receive diversity DL path can comprise the receive diversity DL outside antenna port 1569 coupled to a bypass path coupled between the receive diversity DL inside antenna port 1592 and the receive diversity DL outside antenna port 1569. The bypass path can be configured to not amplify or filter signals traveling on the bypass path.

In another example, after traveling on the first receive diversity DL path or the second receive diversity DL path, the receive diversity signal on the first receive diversity DL path and the DL signal on the second receive diversity DL path can be amplified and filtered in accordance with the type of amplifiers and BPFs included on the first receive diversity DL path and the second receive diversity DL path. The signal from the first receive diversity DL path and the signal from the second receive diversity DL path can be directed to a diplexer 1580. The diplexer 1580 can be a duplexer, a common direction duplexer, a diplexer, a multiplexer, a circulator, or a splitter. From the diplexer 1580, the combined receive diversity DL signal can be directed to a receive diversity device antenna port 1592 or a receive diversity downlink inside antenna port 1592. In another example, in an alternative, the receive diversity signal can travel on a bypass path coupled between the receive diversity DL inside antenna port 1592 and the receive diversity DL outside antenna port 1569, wherein the bypass path does not amplify or filter the receive diversity signal. The receive diversity device antenna port 1592 or a receive diversity downlink inside antenna port 1592 can be configured to be coupled to a receive diversity device antenna 1590 or a receive diversity downlink inside antenna 1590. The receive diversity device antenna 1590 can communicate the amplified and/or filtered or bypassed receive diversity DL signal to a UE.

Figure 15C:
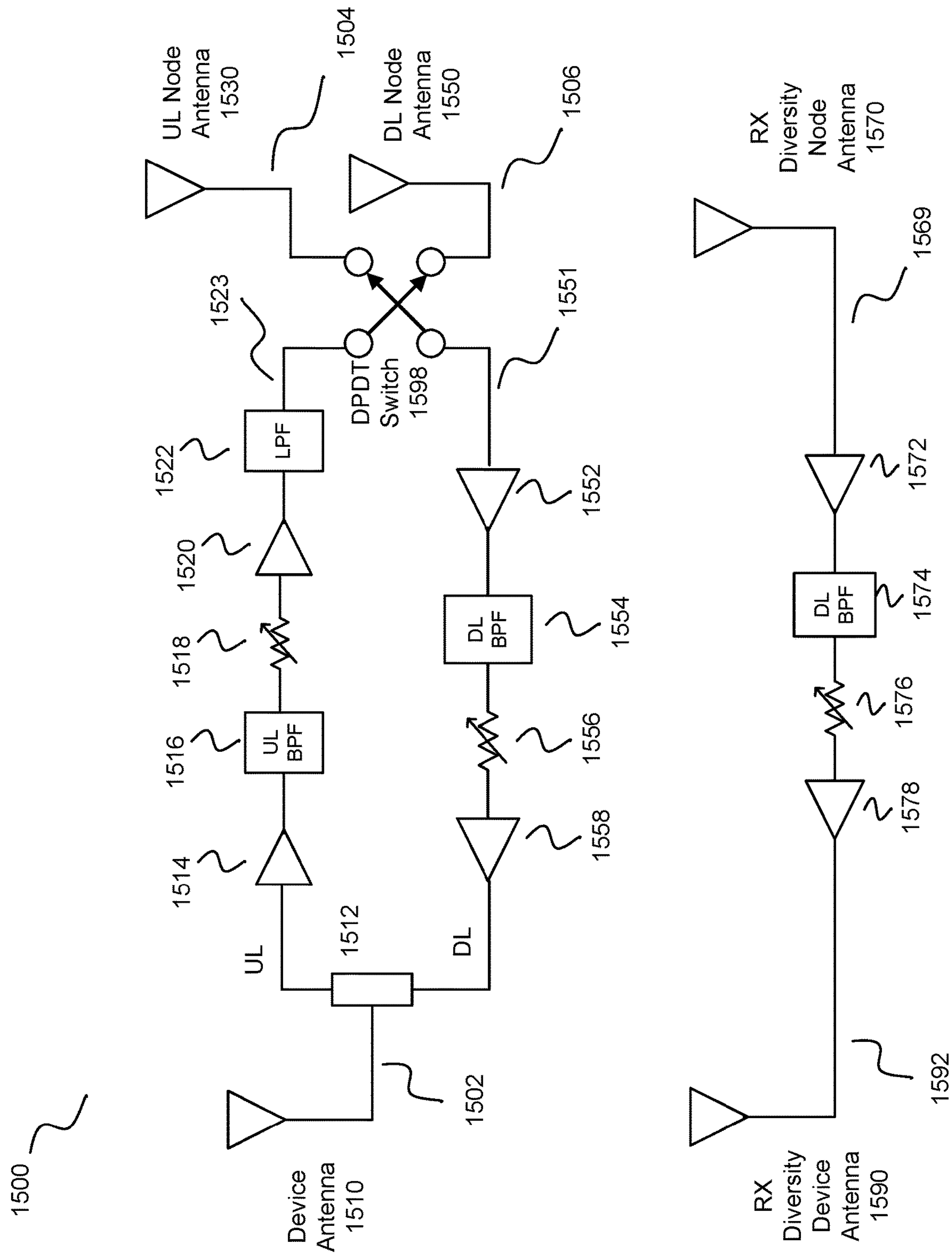
FIG. 15*c* illustrates a repeater with a receive diversity antenna port in accordance with an example.

In another example, as illustrated in FIG. 15*c*, a repeater can comprise a double-pole double-throw (DPDT) switch 1598. The output 1523 of the UL path can be configured to be coupled to the DPDT switch 1598. The DPDT switch 1598 can be configured to be coupled to an UL node antenna port 1504. The DL node antenna port 1506 can be configured to be coupled to the DPDT switch 1598. The DPDT switch 1598 can be configured to be coupled to an input 1551 of the DL path.

In another example, the DPDT switch 1598 can be configured to: allow the UL node antenna port 1504 to be coupled to the input 1551 of the DL path, and allow the DL node antenna port 1506 to be coupled to the output 1523 of the UL path. The UL node antenna port 1504 and the DL node antenna port can be switched based on whether the repeater is UL-limited or DL-limited. A repeater can be UL-limited when there is an insufficient power from the repeater to the base station. A repeater can be DL-limited when there is insufficient power from the base station to the repeater.

In one example, switching from the UL node antenna port 1504 to the DL node antenna port 1506 can allow the uplink amplification and filtering path to use the DL node antenna port 1506 when the repeater is UL-limited. In one example, switching from the DL node antenna port 1506 to the UL node antenna port 1504 can allow the downlink amplification and filtering path to use the UL node antenna port 1504 when the repeater is DL-limited. In one example, this kind of switching can increase the level of power from the repeater to the base station (when the repeater is UL-limited) and increase the level of power from the base station to the repeater (when the repeater is DL-limited) by using spatial diversity or polarization diversity.

Figure 15D:
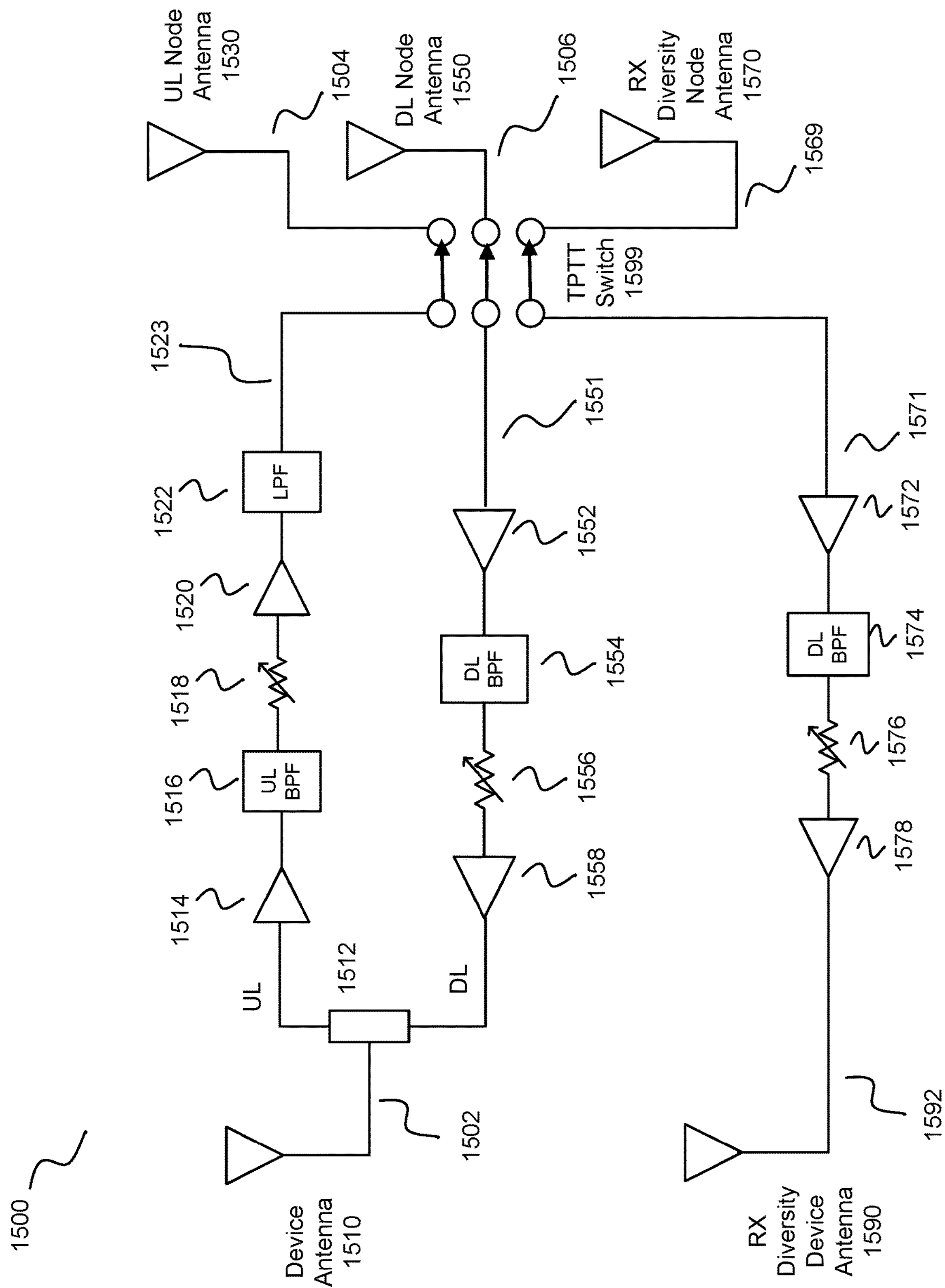
FIG. 15*d* illustrates a repeater with a receive diversity antenna port in accordance with an example.

In another example, as illustrated in FIG. 15*d*, a repeater can comprise a triple-pole triple-throw (TPTT) switch 1599. The output 1523 of the UL path can be configured to be coupled to the TPTT switch 1599. The TPTT switch 1599 can be configured to be coupled to an UL node antenna port 1504. The DL node antenna port 1506 can be configured to be coupled to the TPTT switch 1599. The TPTT switch 1599 can be configured to be coupled to an input 1551 of the DL path. The receive diversity node antenna port 1569 can be configured to be coupled to the TPTT switch 1599. The TPTT switch 1599 can be configured to be coupled to an input 1571 of the receive diversity DL path.

In another example, the TPTT switch 1599 can be configured to: allow the UL node antenna port 1504 to be coupled to the input 1551 of the DL path; allow the UL node antenna port 1504 to be coupled to the input 1571 of the receive diversity DL path. In another example, the TPTT switch 1599 can be configured to: allow the DL node antenna port 1506 to be coupled to the output 1523 of the UL path; allow the DL node antenna port 1506 to be coupled to the input 1571 of the receive diversity DL path. In another example, the TPTT switch 1599 can be configured to: allow the receive diversity node antenna port 1569 to be coupled to the input 1551 of the DL path; allow the receive diversity node antenna port 1569 to be coupled to the output 1523 of the UL path.

In one example, the UL node antenna port 1504, the DL node antenna port, and the receive diversity node antenna port 1569 can be switched based on whether the repeater is UL-limited or DL-limited. A repeater can be UL-limited when there is a low level of power from the repeater to the base station. A repeater can be DL-limited when there is a low level of power from the base station to the repeater. As previously discussed, antenna port switching can increase the level of power from the repeater to the base station (when the repeater is UL-limited) and increase the level of power from the base station to the repeater (when the repeater is DL-limited) by using spatial diversity or polarization diversity.

Figure 15E:
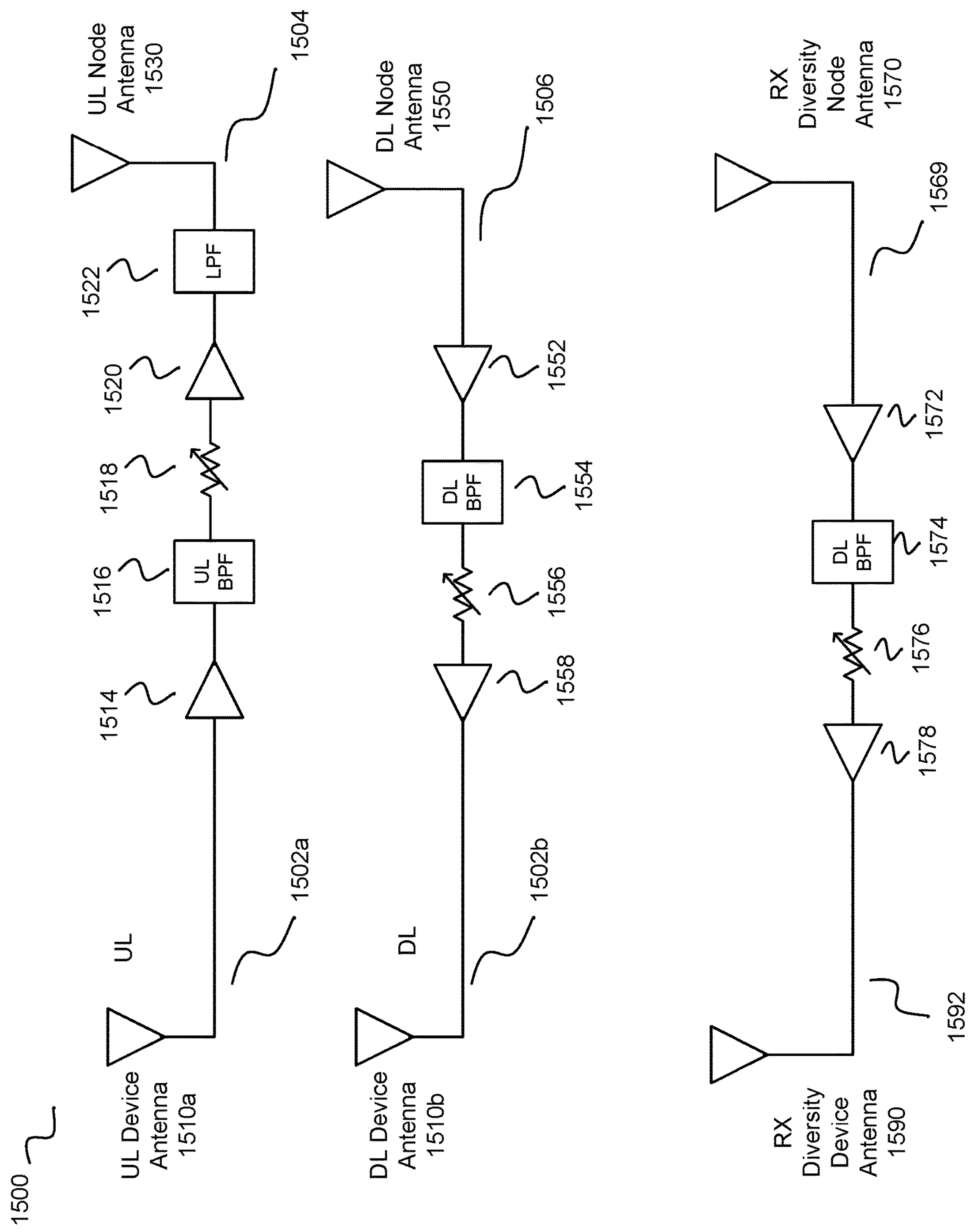
FIG. 15*e* illustrates a repeater with a receive diversity antenna port in accordance with an example.
Figure 15F:
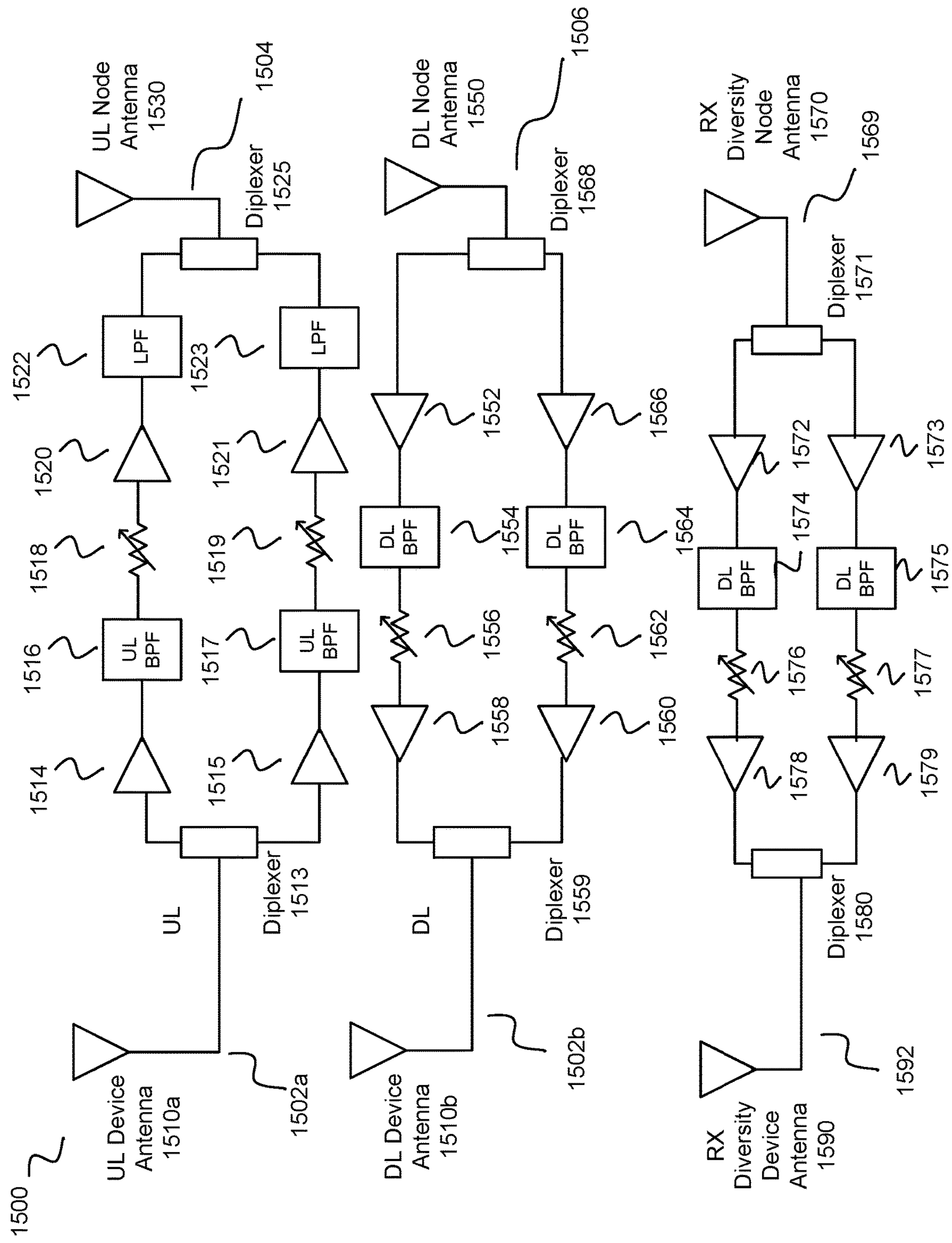
FIG. 15*f* illustrates a multiband repeater with a receive diversity antenna port in accordance with an example.
Figure 15G:
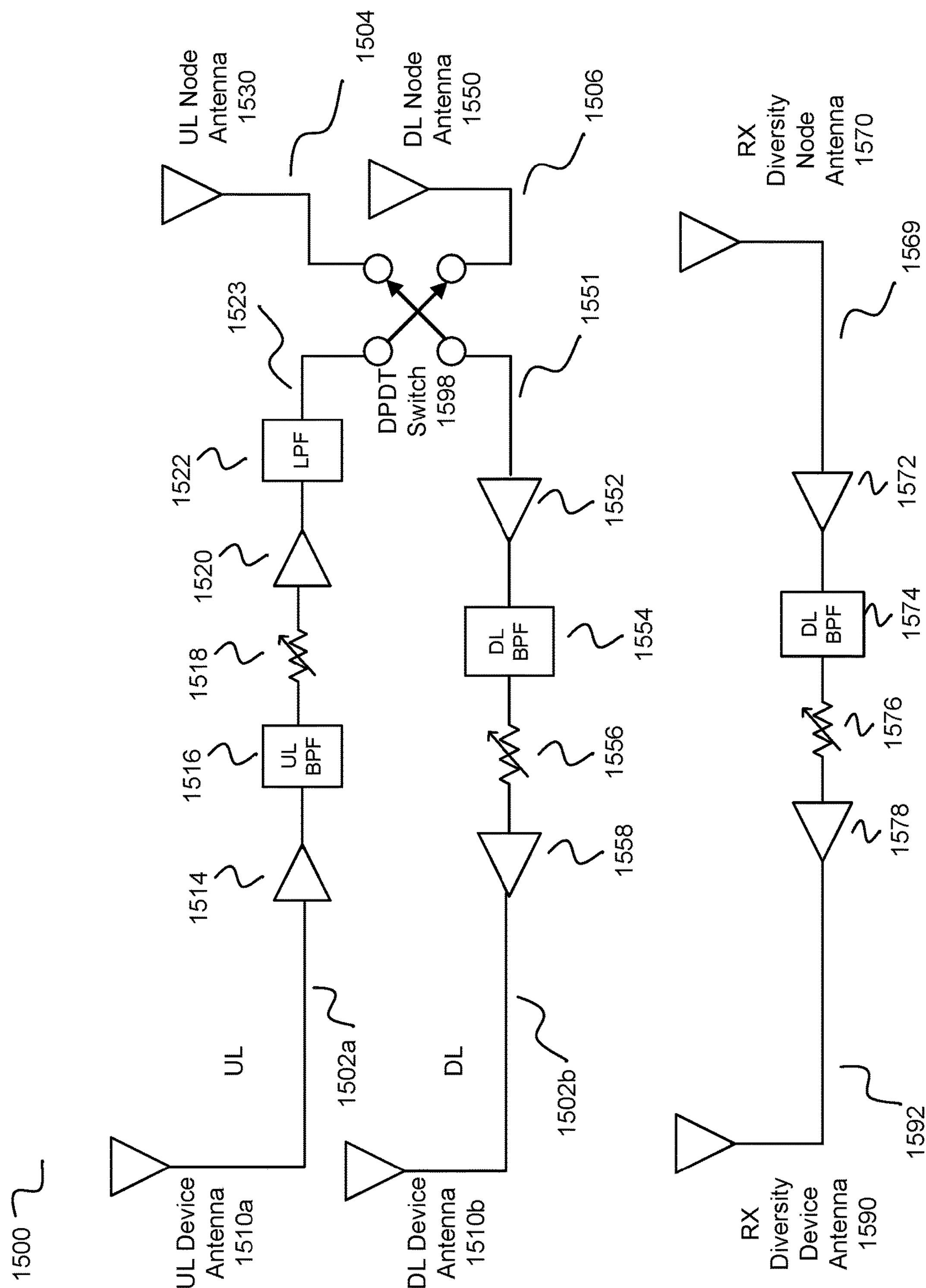
FIG. 15*g* illustrates a repeater with a receive diversity antenna port in accordance with an example.
Figure 15H:
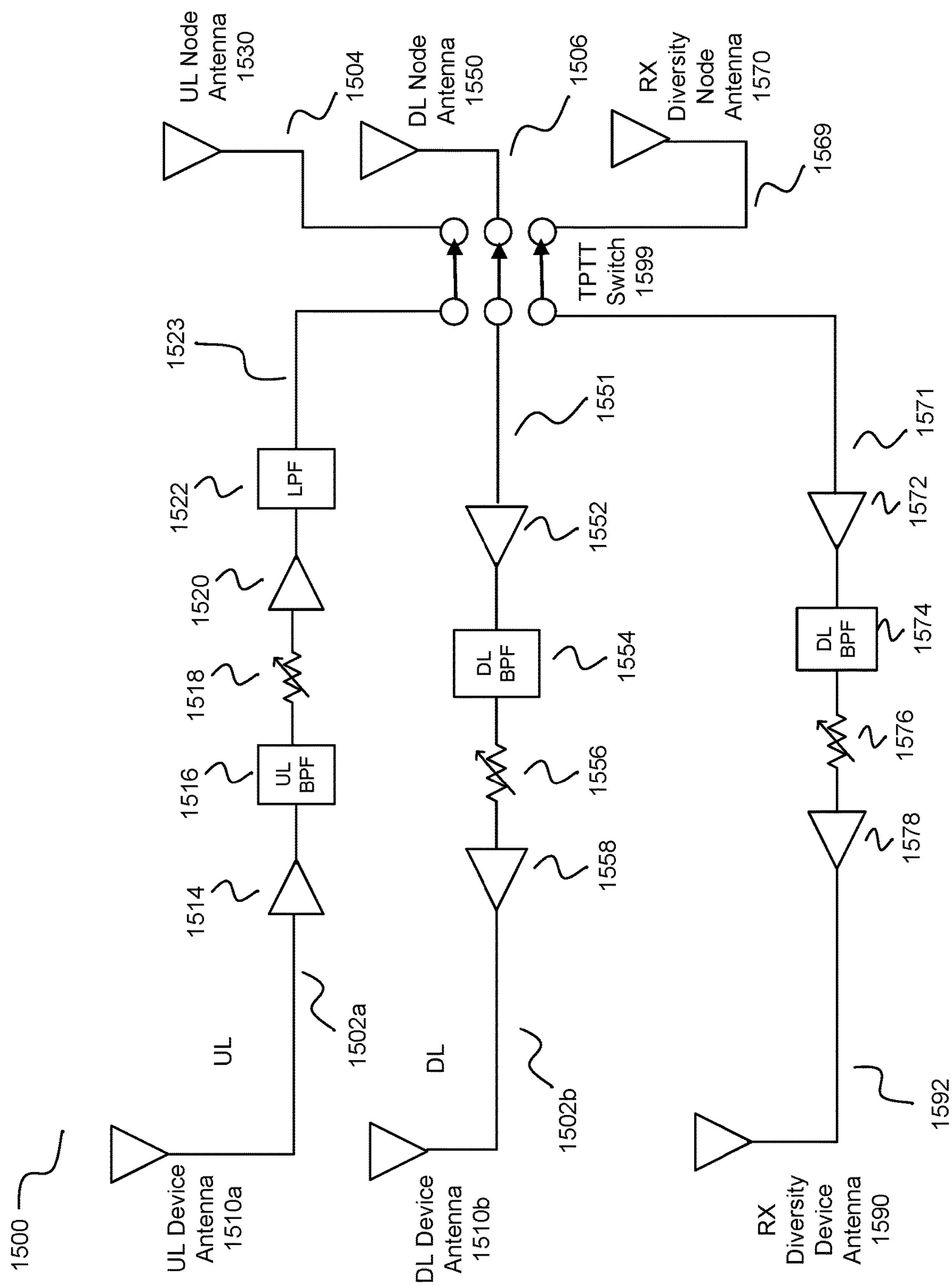
FIG. 15*h* illustrates a repeater with a receive diversity antenna port in accordance with an example.

In another example, as illustrated in FIG. 15*e*, FIG. 15*g*, and FIG. 15*h*, a repeater can comprise an integrated UL device antenna port 1502*a* or an integrated UL inside antenna port 1502*a*. The integrated UL device antenna port 1502*a* can be configured to be coupled to an integrated UL device antenna 1510*a* or an integrated UL inside antenna 1510*a*. The integrated UL device antenna port 1502*a* can be configured to be coupled to an input of a low-noise amplifier 1514.

In another example, a repeater can comprise an integrated DL device antenna port 1502*b* or an integrated DL inside antenna port 1502*b*. The integrated DL device antenna port 1502*b* can be configured to be coupled to an integrated DL device antenna 1510*b* or an integrated DL inside antenna 1510*b*. The integrated DL device antenna port 1502*b* can be configured to be coupled to an output of a power amplifier 1558.

In another example, as illustrated in FIG. 15*f*, a multiband repeater can comprise an integrated UL device antenna port 1502*a* or an integrated UL inside antenna port 1502*a*. The integrated UL device antenna port 1502*a* can be configured to be coupled to an integrated UL device antenna 1510*a* or an integrated UL inside antenna 1510*a*. The integrated UL device antenna port 1502*a* can be configured to be coupled to an input of a diplexer 1513.

In another example, a repeater can comprise an integrated DL device antenna port 1502*b* or an integrated DL inside antenna port 1502*b*. The integrated DL device antenna port 1502*b* can be configured to be coupled to an integrated DL device antenna 1510*b* or an integrated DL inside antenna 1510*b*. The integrated DL device antenna port 1502*b* can be configured to be coupled to an output of a diplexer 1559.

In one configuration, two or more BPFs can be stacked together or connected to form a multi-filter package (e.g., a SISO filter package). The multi-filter package can also be referred to as a dual-common port multi-bandpass filter. The dual-common port multi-bandpass filter can also include a dual-common port multi-low pass filter (LPF) or a dual-common port multi-high pass filter (HPF). Each of the BPFs within the multi-filter package can be configured to pass a selected frequency, such as an uplink band of a selected frequency band, or a downlink band of the selected frequency band. The multi-filter package can have a first common port and a second common port (e.g., on a left and right side of the multi-filter package, respectively). In an example in which the multi-filter package includes two BPFs that are stacked together in a single package, a first common port can have a first signal trace that connects the first common port to an input of a first BPF and an input of a second BPF. Similarly, a second signal trace can connect a second common port to an output of the first BPF and an output of the second BPF. In this example, the two BPFs can be positioned close to each other (e.g., less than 1 millimeter (mm) from each other for SAW/BAW filters or less than 10 mm for ceramic filters), and the two BPFs can be designed such that one of the BPFs can have a lower return loss in a selected frequency band (i.e. passband), while the other BPF can have a higher return loss (or poor return loss) on that same frequency band (i.e., stopband).

Thus, when an input signal enters the multi-filter package, the input signal can effectively "see" both of the BPFs. The signal can effectively travel towards a first BPF and a second BPF in the multi-filter package. However, the signal will take the path with the lower return loss or lower resistance between the available paths. In other words, when a passband signal enters the multi-filter package, the signal will effectively "see a wall" on one side of the multi-filter package (which corresponds to the path with higher return loss or higher resistance) and an open path on the other side of the multi-filter package (which corresponds to a path with a lower return loss or lower resistance).

While the term "input" and "output" are used with respect to a BPF, the terms are not intended to be limiting. A BPF may be configured to have a signal enter the input of the BPF and exit the output. Alternatively, a signal may enter the output of the BPF and exit the input. Thus, the terms "input" and "output" may be used interchangeably.

In one example, the BPFs in the multi-filter package can include SAW filters, BAW filters, ceramic filters, high pass filters (HPF), low pass filters (LPF), and/or discrete filters (e.g., composed of capacitors and inductors).

In one example, an input signal can have a signal associated with a selected frequency band. For example, a band 2 uplink (UL) signal can include a signal within the 3GPP LTE band 2 UL frequency range. A multi-filter package can include a band 2 UL bandpass filter, configured to pass signals within a frequency range of the band 2 UL range, and reject signals outside of this band. The multi-filter package can also include a band 4 UL bandpass filter, configured to pass signals within a frequency range of the 3GPP LTE band 4 UL frequency range, and reject signals outside of this band.

As an example, the multi-filter package can include a B1 UL BPF and a B2 UL BPF. If the signal that enters the multi-filter package is a B1 UL signal, the signal can pass through the B1 UL BPF in the multi-filter package due to the lower return loss that is designed in the B1 UL BPF for the frequency range of the B1 UL signal. Similarly, if the signal that enters the multi-filter package is a B2 UL signal, the signal can pass through the B2 UL BPF in the multi-filter package due to the lower return loss that is designed in the B2 UL BPF for the frequency range of the B2 UL signal. In addition, if the B1 UL signal or the B2 UL signal were to go to the B2 UL BPF or the B1 UL BPF, respectively, the UL signal would get reflected back and would then pass through the appropriate UL BPF.

In one example, the multi-filter package can include electrically short wires or signal traces that connect the first common port and the second common port to the first and second BPFs. In other words, the path from the first common port to the input of the first and second BPFs, and the path from the second common port to the output of the first and second BPFs can be electrically short. In one example, if the wires or signal traces were to become electrically long, the wires or signal traces can create phase and reflection problems. Thus, by keeping the wires or signal traces electrically short, these problems can be avoided and the signal can only travel on an incorrect path for a reduced period of time.

In one example, the electrically short wires or signal traces in the multi-filter package can be shorter than $1/10^{th}$ or $1/20^{th}$ or $1/100^{th}$ of a wavelength of the signal the electrically short wires are carrying. In one example, a 1 GHz wavelength is 300 mm, and the electrically short wires or signal traces can be shorter than 3 mm. Since the wires or signal traces are considerably shorter than the wavelength, an incoming signal can effectively see multiple paths at the same time, and the incoming signal can travel on a path with lower return loss or lower resistance.

In one example, the multi-filter package can include multiple separate bandpass filters, with each bandpass filter configured for a separate frequency band. Each separate frequency band can have a guard band between the frequency band (i.e. the frequency bands are non-adjacent). Each of the bandpass filters can be designed to have an input that is impedance matched to a first common port, and an output that is impedance matched to a second common port.

In another example, it can be difficult for multiple different bandpass filters, each with different passbands, to each be impedance matched to a common port. To overcome that limitation, the multi-filter package can include one or more matching networks. For example, a matching network can be coupled to inputs of two or more BPFs in the multi-filter package. A separate matching network can be coupled to the outputs of two or more BPFs in the multi-filter package. The matching network(s) can each be a separate module that is external to the BPFs, but within the multi-filter package. The matching network(s) can include series inductors and/or shunt capacitors, which can function to impedance match the inputs of the BPFs in the multi-filter package to the first common port and/or impedance match the outputs of the BPFs in the multi-filter package to the second common port.

The impedance matching can be between a common port and each individual BPF port. In other words, each BPF can be matched to a common port, and not to other BPFs. The impedance matching provided by the matching network(s) can enable a signal to travel through a BPF on a lower return loss path in the multi-filter package and bypass a BPF on a higher return loss path of the multi-filter package. Depending on the combination of BPFs in the multi-filter package, the matching implementation can be designed accordingly.

As used herein, the term "connected" typically refers to two devices that are directly electrically connected. The term "communicatively coupled" or "coupled" refers to two devices that are electrically connected, with additional electrical components located between the two devices. However, the terms are meant to be descriptive and are not intended to be limiting. The terms "coupled", "communicatively coupled", and "connected" may be used interchangeably.

In one configuration, two or more sets of BPFs can be packaged together or connected to form a multi-common port multi-filter package (e.g., a DISO filter package). For example, a first set of BPFs consisting of two or more BPFs can be connected to a second set of BPFs consisting of one or more BPFs. The first set of BPFs can include DL BPFs and the second set of BPFs can include UL BPFs, or vice versa. The multi-filter package can include a first common port that connects to the first and second set of BPFs, a second common port that connects to the first set of BPFs and a third common port that connects to the second set of BPFs. The wires or signal traces that connect the first, second, and third common ports to each BPF in the first and second sets of BPFs, respectively, can be electrically short. In addition, the multi-filter package can include a matching network that is coupled to the first set of BPFs in the multi-filter package and/or a matching network that is coupled to the second set of BPFs in the multi-filter package.

As an example, the multi-filter package can include a first set of BPFs that includes a B2 UL BPF and a B4 UL BPF, as well as a second set of BPFs that includes a B12 DL BPF and a B13 DL BPF. Due to the matching network(s) and the electrically short wires or signal traces, a signal that enters the multi-filter package can pass through an appropriate BPF and bypass the other BPFs in the multi-filter package. For example, an UL signal will pass through one of the UL BPFs with a passband within the signal's band, and bypass the DL BPFs. Similarly, a DL signal will pass through one of the DL BPFs associated with the signal's band, and bypass the UL BPFs. Furthermore, due to the use of matching network(s) and the electrically short wires or signal traces, an UL signal can pass through an appropriate UL BPF and bypass other UL BPFs in the multi-filter package, and similarly, a DL signal can pass through an appropriate DL BPF and bypass other DL BPFs in other frequency bands in the multi-filter package.

Figure 16A:
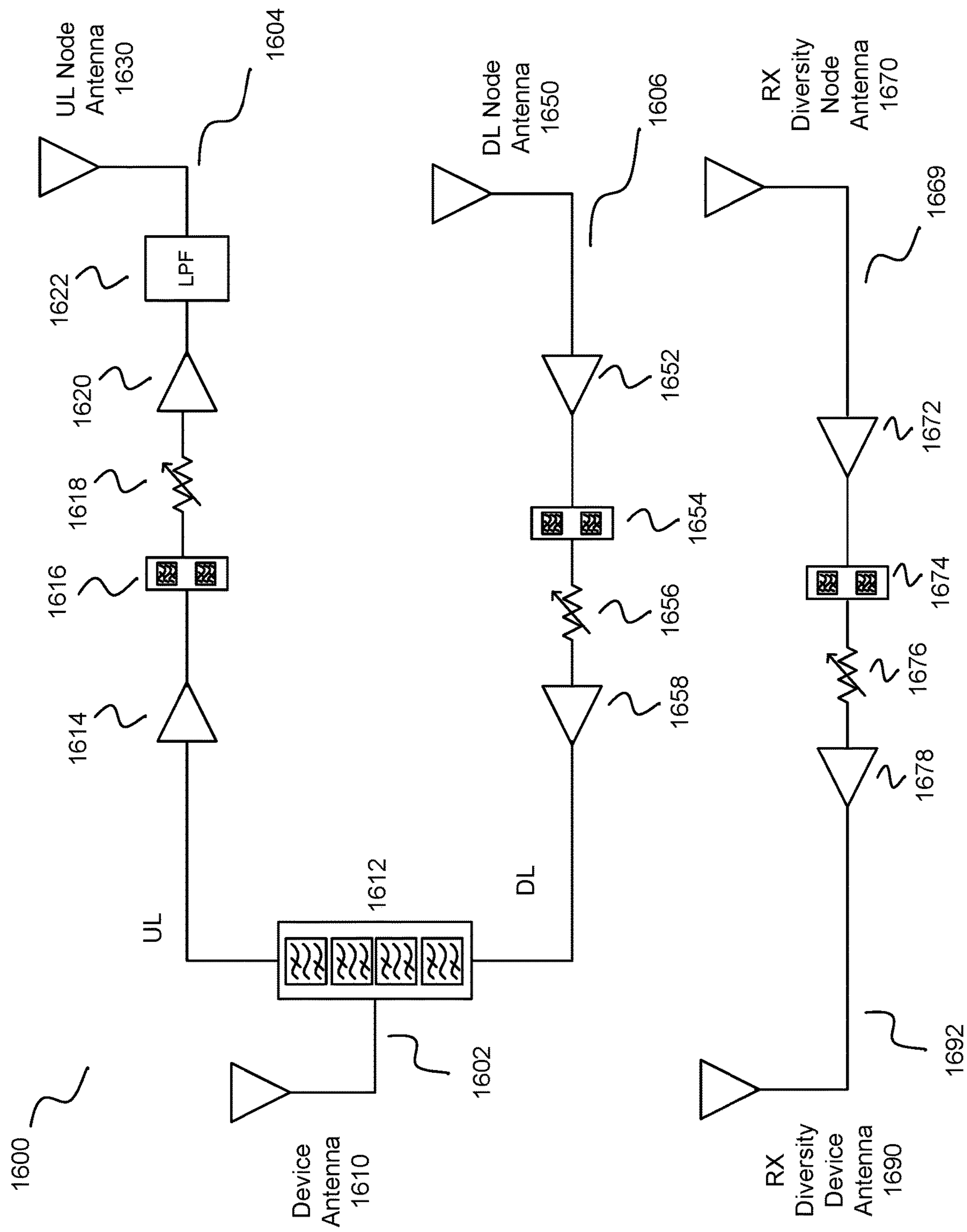
FIG. 16*a* illustrates a multiband repeater with a receive diversity antenna port in accordance with an example.

In another example, as illustrated in FIG. 16*a*, a multiband repeater can comprise a receive diversity antenna port. In this example, a bi-directional inside antenna port 1602 or bi-directional device antenna port 1602 can be configured to be coupled to an integrated device antenna 1610 or a bi-directional inside antenna 1610. In another example, in an alternative, the bi-directional inside antenna port 1602 can be replaced by an UL inside antenna port and a DL inside antenna port, wherein the UL inside antenna port is separate from the DL inside antenna port, and the UL inside antenna port can be further configured to be coupled to an UL inside antenna and the DL inside antenna port can be further configured to be coupled to a DL inside antenna.

The integrated device antenna 1610 can receive an UL signal from a UE. The bi-directional inside antenna port 1602 can be configured to be coupled to a multi-common port multi-filter package 1612. In another example, in an alternative, the bi-directional inside antenna port 1602 can be configured to be coupled to a splitter. The multi-common port multi-filter package 1612 can direct a signal into an UL path or from a DL path. In one example, the multi-common port multi-filter package 1612 can be used to separate the UL and DL paths. The separation of the UL and DL paths using the multi-common port multi-filter package 1612 can be used to separate the UL and DL paths with lower loss and higher UL to DL isolation than using a splitter. In addition, in this example, the multi-common port multi-filter package 1612 can be modified to have fewer outputs for a multiband repeater. For example, in a repeater having two uplink bands and two downlink bands, the multi-common port multi-filter package 1612 can have two outputs, rather than four outputs that would be typical when using a multiplexer. The signals in the UL and DL can be combined into common UL ports and DL ports, respectively. The combining can be achieved through impedance matching at the filter outputs in the multi-common port multi-filter package.

Figure 16B:
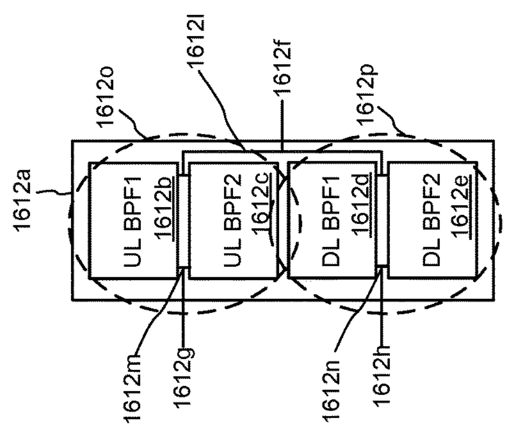
FIGS. 16*b* to 16*e* illustrate multi-filter packages in accordance with an example.

FIGS. 16*b* to 16*e* illustrate examples of multi-common port multi-filter packages. One or more multi-filter package(s) 1612*a* can be included in a repeater (i.e. signal booster or bidirectional amplifier). The multi-filter package 1612*a* can be communicatively coupled to a first interface port of the repeater. As shown in FIG. 16*b*, the multi-filter package 1612*a* can include a first common port 1612*f*, a second common port 1612*g*, and a third common port 1612*h*. The first common port 1612*f* can be communicatively coupled to the first interface port of the repeater. The first common port 1612*f* can also be communicatively coupled to a first set of filters 1612*o* in the multi-filter package 1612*a*, such as a first UL BPF (UL BPF1) 1612*b* and a second UL BPF (UL BPF2) 1612*c*, as well as to a second set of filters 1612*p* in the multi-filter package 1612*a*, such as a first DL BPF (DL BPF1) 1612*d* and a second DL BPF (DL BPF2) 1612*e*. Furthermore, the second common port 1612*g* can be communicatively coupled to a second interface port of the repeater and the first set of filters 1612*o* in the multi-filter package 1612*a*. The third common port 1612*h* can be communicatively coupled to the second interface port of the repeater and the second set of filters 1612*p* in the multi-filter package 1612*a*.

In one example, as shown in FIG. 16*b*, the multi-filter package 1612*a* can include a first signal trace 16121, a second signal trace 1612*m* and a third signal trace 1612*n*. The first signal trace 16121 can be coupled between the first common port 1612*f*, and each filter in the first set of filters 1612*o* and each filter in the second set of filters 1612*p* in the multi-filter package 1612*a*. The second signal trace 1612*m* can be coupled between the second common port 1612*g*, and each filter in the first set of filters 1612*o* in the multi-filter package 1612*a*. The third signal trace 1612*n* can be coupled between the third common port 1612*h*, and each filter in the second set of filters 1612*p* in the multi-filter package 1612*a*.

In one example, a length of the first signal trace 16121 from the first common port 1612*f* to each filter in the first set of filters 1612*o* and the second set of filters 1612*p* in the multi-filter package 1612*a* can have a substantially equal length (e.g., less than 10 mm+/−0.5 mm or less than 5 mm+/−0.25 mm). In another example, a length of the second signal trace 1612*m* from the second common port 1612*g* to each filter in the first set of filters 1612*o* in the multi-filter package 1612*a* can have a substantially equal length (e.g., less than 5 mm+/−0.25 mm). In yet another example, a length of the third signal trace 1612*n* from the third common port 1612*h* to each filter in the second set of filters 1612*p* in the multi-filter package 1612*a* can have a substantially equal length (e.g., less than 5 mm+/−0.25 mm). In a further example, a length of each of the first signal trace 16121, the second signal trace 1612*m* and the third signal trace 1612*n* can be less than 10 mm+/−0.5 mm or less than 5 mm+/−0.25 mm.

Figure 16C:
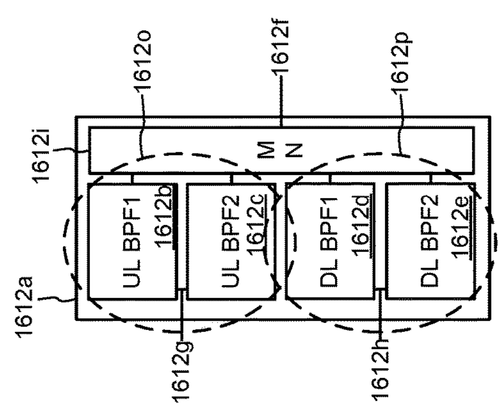

In one example, as shown in FIG. 16*c*, the first common port 1612*f* can be coupled to a matching network 1612*i*. The matching network 1612*i* can be coupled to the first set of filters 1612*o* in the multi-filter package 1612*a*, such as the first UL BPF (UL BPF1) 1612*b* and the second UL BPF (UL BPF2) 1612*c*, as well as the second set of filters 1612*p* in the multi-filter package 1612*a*, such as the first DL BPF (DL BPF1) 1612*d* and the second DL BPF (DL BPF2) 1612*e*. Each BPF in the multi-filter package 1612*a* can be configured to filter one or more bands in one or more signals. Each of the bands can be non-spectrally adjacent, as previously discussed. The matching network 1612*i* can be configured to provide impedance matching for the inputs/outputs of the first set of filters 1612*o* and the second set of filters 1612*p* in the multi-filter package 1612*a* with the first common port 1612*f*. Furthermore, in this example, the second common port 1612*g* and the third common port 1612*h* may not be coupled to matching networks. Accordingly, the input/outputs of the first set of BPFs 1612*o* can be impedance matched to the common port 1612*i*. The input/outputs of the second set of BPFs 1612*p* can be impedance matched to the third common port 1612*h*.

Figure 16D:
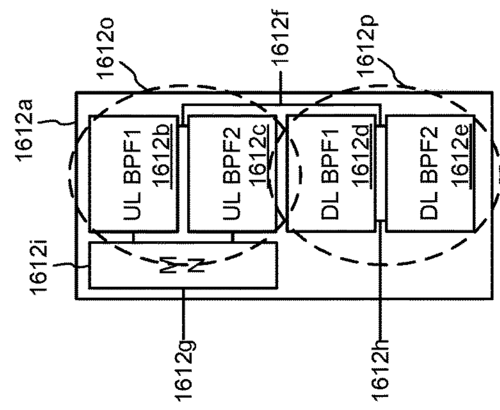

In one example, as shown in FIG. 16*d*, the second common port 1612*g* can be coupled to a matching network 1612*i*. In this example, the matching network 1612*i* can be coupled to and impedance matched with the inputs/outputs of the first set of filters 1612*o* in the multi-filter package 1612*a*, such as the first UL BPF (UL BPF1) 1612*b* and the second UL BPF (UL BPF2) 1612*c*. Alternatively, or in addition, the third common port 1612*h* can be coupled to the matching network 1612*i*. The matching network 1612*i* can be coupled to and impedance matched with the inputs/outputs of the second set of filters 1612*p* in the multi-filter package 1612*a*, such as the first DL BPF (DL BPF1) 1612*d* and the second DL BPF (DL BPF2) 1612*e*. In this example, the first common port 1612*f* and the third common port 1612*h* may not be coupled to matching networks. Accordingly, the first common port 1612*f* may be impedance matched directly to the inputs/outputs of the UL BPF1 1612*b*, UL BPF2 1612*c*, DL BPF1 1612*d*, and DL BPF2 1612*e*. In addition, the third common port 1612*h* may be impedance matched directly to the inputs/outputs of the DL BPF1 1612*d* and DL BPF2 1612*e*.

Figure 16E:
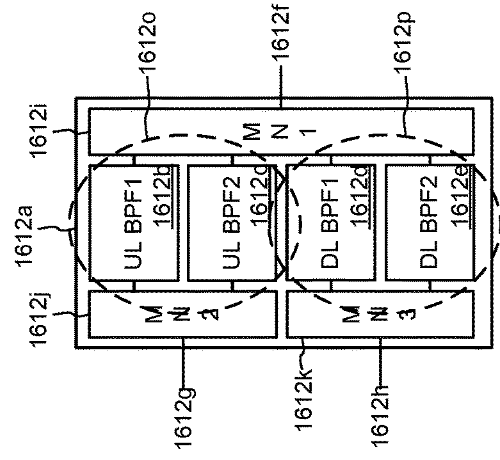

In one example, as shown in FIG. 16*e*, the first common port 1612*f* can be coupled to a first matching network 1612*i*, the second common port 1612*g* can be coupled to a second matching network 1612*j*, and the third common port 1612*h* can be coupled to a third matching network 1612*k*. The first matching network 1612*i* can be coupled to and impedance matched with the inputs/outputs of the first set of filters 1612*o* in the multi-filter package 1612*a*, such as the first UL BPF (UL BPF1) 1612*b* and the second UL BPF (UL BPF2) 1612*c*, as well as the second set of filters 1612*p* in the multi-filter package 1612*a*, such as the first DL BPF (DL BPF1) 1612*d* and the second DL BPF (DL BPF2) 1612*e*. The second matching network 1612*j* can be coupled to and impedance matched with the inputs/outputs of the first set of filters 1612*o* in the multi-filter package 1612*a*. The third matching network 1612*k* can be coupled to and impedance matched with the inputs/outputs of the second set of filters 1612*p* in the multi-filter package 1612*a*.

In one example, each filter in the multi-filter package 1612*a* can have an input that is impedance matched to one or more of a first, second, or third common port of the multi-filter package 1612*a* and/or each filter in the multi-filter package 1612*a* can have an output that is impedance matched to another of the first, second, or third common port in the multi-filter package 1612*a*.

In one configuration, as shown in FIGS. 16*b* to 16*e*, multi-filter package(s) 1612*a* can include a first impedance-matched filter set (e.g., the first set of filters 16120), and a second impedance-matched filter set (e.g., the second set of filters 1612*p*). The first common port 1612*f* can be coupled to the first and the second impedance-matched filter sets, the second common port 1612*g* can be coupled to the first impedance-matched filter set, and the third common port 1612*h* can be coupled to the second impedance-matched filter set. In one example, the multi-filter package 1612*a* can include two or more impedance-matched uplink bandpass filters, with each uplink bandpass filter configured to pass one or more uplink bands, respectively, and two or more impedance-matched downlink bandpass filters, with each bandpass filter configured to pass one or more downlink bands, respectively. Accordingly, the multi-filter package 1612*a* can be configured to separately filter each of the bands of a signal with two or more downlink bands and two or more uplink bands.

In another example, an UL path can comprise one or more of a low-noise amplifier 1614, an UL dual-common port multi-bandpass filter 1616, a variable attenuator 1618, a power amplifier (PA) 1620, or a low-pass filter (LPF) 1622. The low-noise amplifier 1614 can be an UL low-noise amplifier, the variable attenuator 1618 can be an UL variable attenuator, the power amplifier 1620 can be an UL power amplifier, and the low-pass filter 1622 can be an UL low-pass filter or low-order filtering. In another example, the power amplifier 1620 can comprise a variable gain power amplifier, a fixed-gain power amplifier, or a gain block. In another example, the LPF 1622 can be configured to be coupled between the power amplifier 1620 and an UL outside antenna port 1604 or UL node antenna port 1604 to filter harmonics emitted by the power amplifier 1620. While a low pass filter is described in this example, it is not intended to be limiting. A low-order filter can be used to filter the harmonics. The low order filter can include one or more high pass filter poles and one or more low pass filter poles. The low-order filter can be configured to have low loss since it is located after the power amplifier 1620. In another example, the power amplifier 1620 can be configured to be coupled directly to the UL outside antenna port 1604 without filtering between the power amplifier 1620 and the UL outside antenna port 1604.

In another example, the UL dual-common port multi-bandpass filter 1616 can include a first bandpass filter for a first frequency (e.g., B1) a second band-pass filter for a second frequency (e.g., B2), and additional bandpass filters for additional bands, if desired. The UL dual-common port multi-bandpass filter 1616 can comprise a plurality of filters located in a single package. Each filter in the single package can be designed and configured to operate with other filters in the package. For example, each filter can be impedance matched with the other filters in the package to enable the filters to properly function within the same package. Each filter can be configured to provide a bandpass for a selected band that is non-frequency adjacent with the bandpass bands of other filters in the single package. The UL dual-common port multi-bandpass filter 1616 can be configured to pass two or more of 3GPP FDD frequency bands 2, 4, 5, 12, 13, 17, 25, 26, or 71. In another example, the UL dual-common port multi-bandpass filter 1616 can be configured to pass two or more of 3GPP FDD frequency bands 1-28, 30, 31, 65, 66, 68, 70-74, or 85. In another example, the UL dual-common port multi-bandpass filter 1616 can be configured to pass two or more selected channels within a 3GPP FDD band. In another example, the UL dual-common port multi-bandpass filter 1616 can be configured to pass two or more selected frequency ranges within a 3GPP FDD band.

FIGS. 16*f* to 16*i* illustrate examples of dual-common port multi-filter packages. One or more multi-filter package(s) 1616*a* can be included in a repeater (i.e. signal booster or bidirectional amplifier). The multi-filter package 1616*a* can be communicatively coupled to a first interface port of the repeater. The first interface port can communicate one or more signals that include multiple bands. Each signal may communicate a single band, or multiple bands.

As shown in FIG. 16*f*, the multi-filter package 1616*a* can include a first common port 1616*b* and a second common port 1616*c*. The first common port 1616*b* can be coupled to the first interface port and an input to two or more filters in the multi-filter package 1616*a*, such as a first BPF (BPF1) 1616*d* and a second BPF (BPF2) 1616*e* in the multi-filter package 1616*e*. The first BPF (BPF1) 1616*d* and the second BPF (BPF2) 1616*e* can be configured to filter one or more bands in one or more signals. The second common port 1616*c* can be coupled to a second interface port of the repeater, where the second interface can communicate the one or more signals, as well as to an output of the two or more filters in the multi-filter package 1616*a*.

In one example, as shown in FIG. 16*f*, the multi-filter package 1616*a* can include a first signal trace 1616*h* and a second signal trace 1616*i*. The first signal trace 1616*h* can be coupled between the first common port 1616*b*, and then divide to couple to the input of the two or more filters in the multi-filter package 1616*a*. Furthermore, the second signal trace 1616*i* can be coupled between the second common port 1616*c*, and then divide to couple to the output of the two or more filters in the multi-filter package 1616*a*.

In one example, a length of the first signal trace 1616*h* from the first common port 1616*b* to the input to each of the two or more filters in the multi-filter package 1616*a* can have a substantially equal length (e.g., less than 5 mm in length with a difference in length of less than +/−0.25 mm). In another example, a length of the second signal trace 1616*i* from the second common port 1616*c* to the output of each of the two or more filters in the multi-filter package 1616*a* can have a substantially equal length (e.g., less than 5 mm in length with a difference of less than +/−0.25 mm). In yet another example, a length of each of the first signal trace 1616*h* and the second signal trace 1616*i* can be less than 2 millimeters (mm) in length.

In one example, the multi-filter package 1616*a* can be associated with at least one of a high band frequency or a low band frequency.

In one example, as shown in FIG. 16*f*, the multi-filter package 1616*a* can include two or more impedance-matched uplink bandpass filters for two or more uplink bands, respectively. Alternatively, the multi-filter package 1616*a* can include two or more impedance-matched downlink bandpass filters for two or more downlink bands, respectively. The impedance-matched filters can each have an input 1616*h* that is impedance matched to the first common port 1616*b*, and an output 1616*i* that is impedance matched to the second common port 1616*c*.

In one example, as shown in FIG. 16*g*, the multi-filter package 1616*a* can include a matching network 1616*f*. The matching network 1616*f* can be coupled to an input of the two or more filters in the multi-filter package 1616*a*, such as the first BPF (BPF1) 1616*d* and the second BPF (BPF2) 1616*e* in the multi-filter package 1616*a*. The matching network 1616*f* can be configured to impedance match the input of each of the two or more filters in the multi-filter package 1616*a* to the first common port 1616*b*.

In one example, as shown in FIG. 16*h*, the multi-filter package 1616*a* can include a matching network 1616*f*. The matching network 1616*f* can be coupled to the output of the two or more filters in the multi-filter package 1616*a*, such as the first BPF (BPF1) 1616*d* and the second BPF (BPF2) 1616*e* in the multi-filter package 1616*a*. The matching network 1616*f* can be operable to impedance match the two or more filters in the multi-filter package 1616*a*.

In one example, each filter in the multi-filter package 1616*a* (e.g., the first BPF (BPF1) 1616*d* and the second BPF (BPF2) 1616*e*) can have an input that is impedance matched to inputs of other filters in the multi-filter package 1616*a* and/or each filter in the multi-filter package 1616*a* can have an output that is impedance matched to outputs of other filters in the multi-filter package 1616*a*.

Figure 16J:
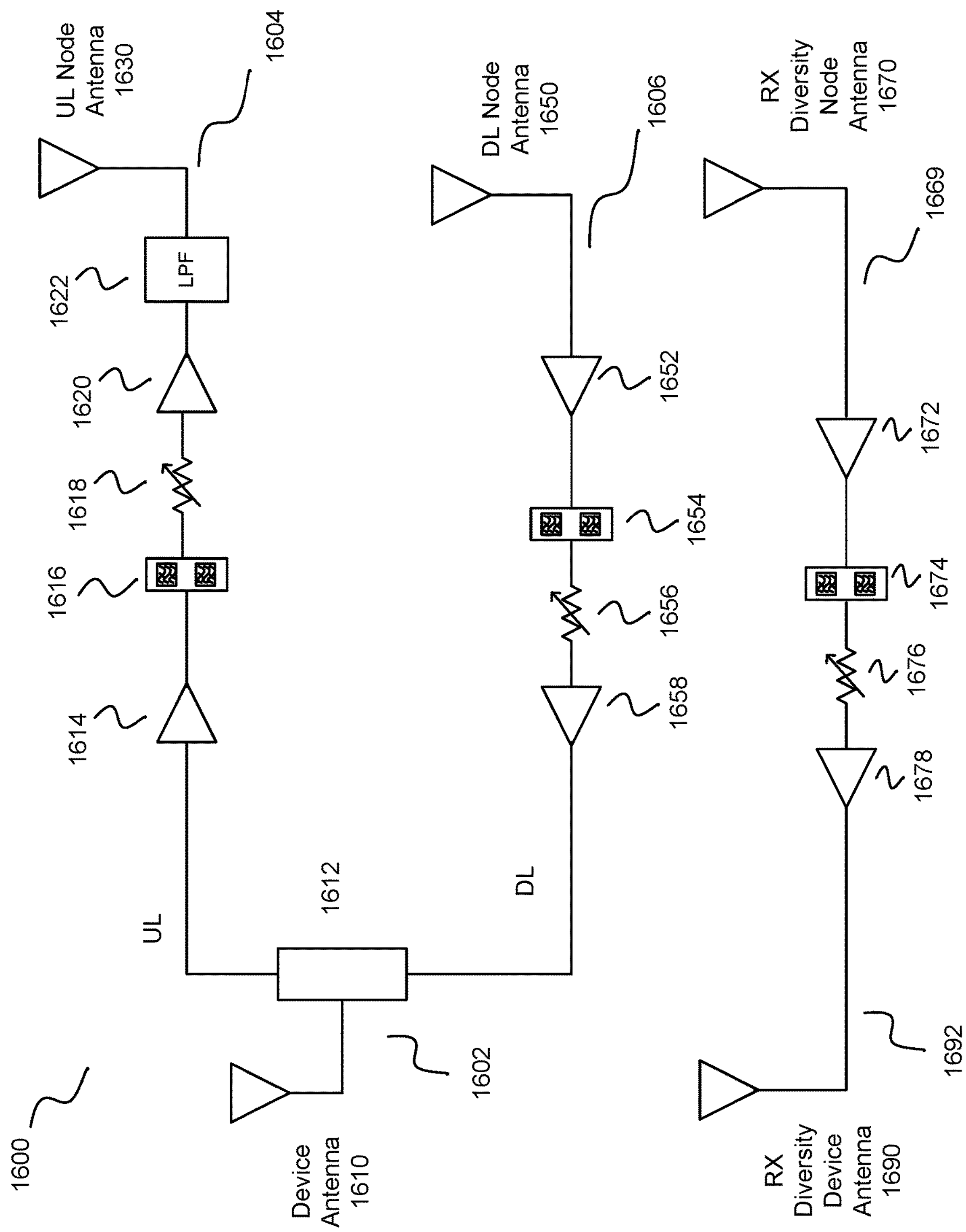
FIG. 16*j* illustrates a multiband repeater with a receive diversity antenna port in accordance with an example.
Figure 16K:
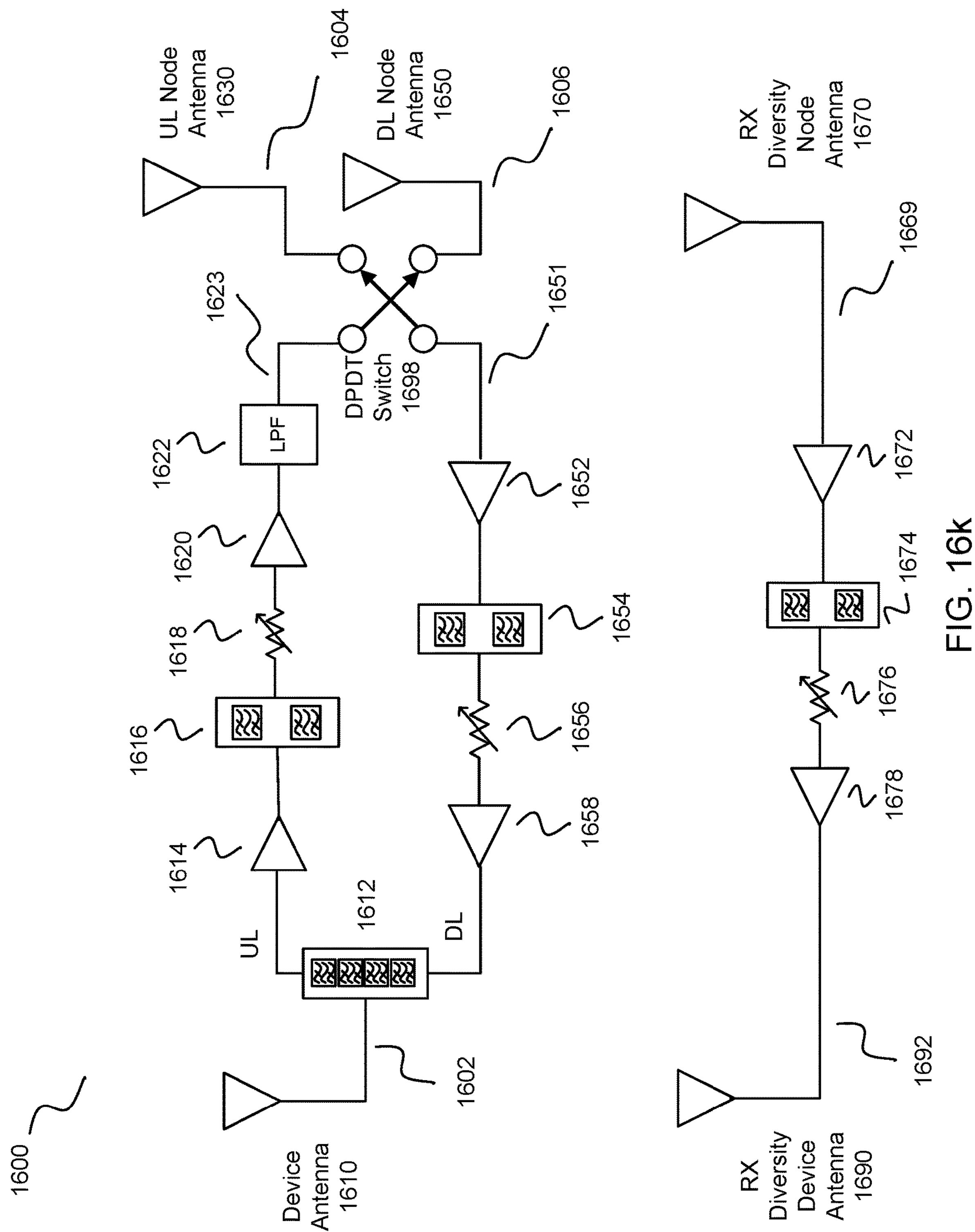
FIG. 16*k* illustrates a multiband repeater with a receive diversity antenna port in accordance with an example.
Figure 16I:
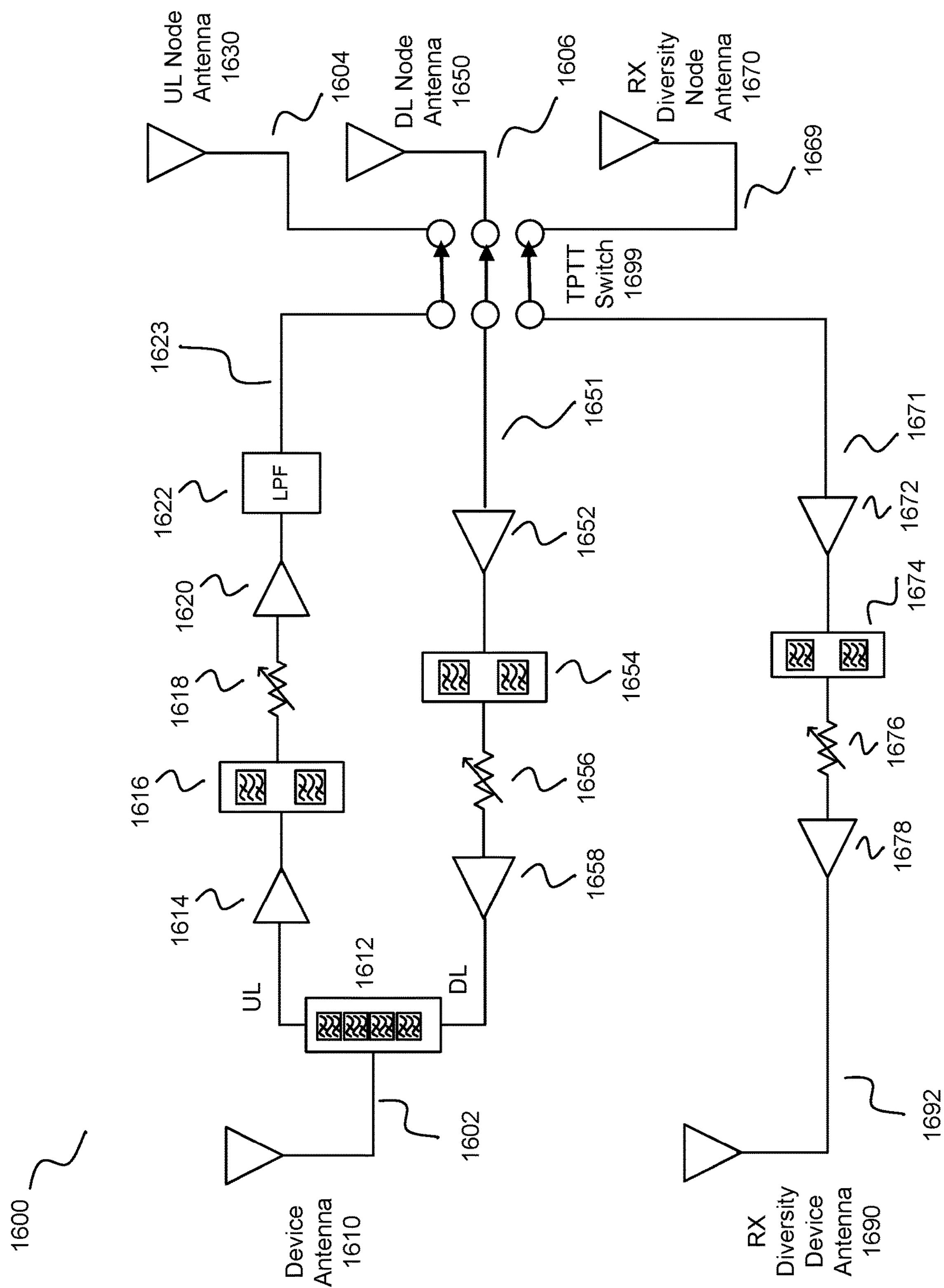

In one example, as shown in FIG. 16*i*, the multi-filter package 1616*a* can include a first matching network 1616*f* and a second matching network 1616*g*. The first matching network 1616*f* can be coupled to the input of the two or more filters in the multi-filter package 1616*a*, such as the first BPF (BPF1) 1616*d* and the second BPF (BPF2) 1616*e* in the multi-filter package 1616*a*, and the second matching network 1616*g* can be coupled to the output of the two or more filters in the multi-filter package 1616*a*. Each of the matching networks can impedance match the input/output to the associated common port.

In one configuration, as shown in FIGS. 16*f* to 16*i*, multi-filter package(s) 1616*a* can include an impedance-matched filter set (e.g., the first BPF (BPF1) 1616*d* and the second BPF (BPF2) 1616*e*) with the first common port 1616*b* and the second common port 1616*c*.

In one example, the impedance-matched filter set can refer to a set of two or more filters in the multi-filter package 1616*a*, wherein each filter in the set can have filter input that is impedance matched with a common port and a filter output that is impedance matched with a separate common port. The impedance matching can be accomplished at the filter, or using an impedance matching network within the multi-filter package 1616*a* that is coupled to the set of two or more filters, to enable a single common input and a single common output for the impedance-matched filter set. Accordingly, the multi-filter package 1616*a* can be configured to separately filter each of the bands of a signal with two or more downlink bands or two or more uplink bands.

In one example, the uplink bands can be combined using the dual-common port multi-bandpass filters. Rather than using a separate UL amplifier and filter chain for each band, channel, or frequency range, a single amplifier chain can be used with the dual-common port multi-bandpass filters capable of filtering the multiple bands, channels, or frequency ranges. This line-sharing technique simplifies the architecture, the number of components, and the layout of the repeater. In addition, line-sharing due to the combined filters can allow for additional component sharing, such as RF amplifiers (gain blocks), RF attenuators, RF detectors, and the like. With fewer components, the repeater can have a higher overall reliability and a lower overall cost.

In another example, after traveling on the UL path, the UL signal on the UL path can be amplified and filtered in accordance with the type of amplifiers and dual-common port multi-bandpass filters included on the UL path. The signal from the UL path can be directed to an UL node antenna port 1604. The UL signal can be directed from the UL node antenna port 1604 to an integrated UL node antenna 1630 or an UL outside antenna 1630. The UL node antenna 1630 can be an omnidirectional antenna or a directional antenna. The UL outside antenna 1630 can communicate the amplified and/or filtered UL signal to a base station.

In another example, an integrated DL node antenna port 1606 or DL outside antenna port 1606 can be configured to be coupled to an integrated DL node antenna 1650 or a DL outside antenna 1650. The integrated DL node antenna 1650 can be an omnidirectional antenna or directional antenna. The integrated DL node antenna 1650 can receive a DL signal from a base station. The DL outside antenna port 1606 can be configured to be coupled to an input of a low-noise amplifier 1652.

In another example, the DL path can comprise one or more of a low-noise amplifier 1652, a DL dual-common port multi-bandpass filter 1654, a variable attenuator 1656, or a power amplifier (PA) 1658. The low-noise amplifier 1652 can be a DL low-noise amplifier, the variable attenuator 1656 can be a DL variable attenuator, and the power amplifier 1658 can be a DL power amplifier. In another example, the power amplifier 1658 can comprise a variable gain power amplifier, a fixed-gain power amplifier, or a gain block. In another example, the low-noise amplifier 1652 can be configured to be coupled to a DL outside antenna port 1606 without filtering between the low-noise amplifier 1652 and the DL outside antenna port 1606.

In another example, the DL dual-common port multi-bandpass filter 1654 can include a first bandpass filter for a first frequency (e.g., B1) a second band-pass filter for a second frequency (e.g., B2). The DL dual-common port multi-bandpass filter 1654 can comprise a plurality of filters located in a single package. Each filter in the single package can be designed and configured to operate with other filters in the package. For example, each filter can be impedance matched with the other filters in the package to enable the filters to properly function within the same package. Each filter can be configured to provide a bandpass for a selected band that is non-frequency adjacent with the bandpass bands of other filters in the single package. The DL dual-common port multi-bandpass filter 1654 can be configured to pass two or more of 3GPP FDD frequency bands 2, 4, 5, 12, 13, 17, 25, 26, or 71. In another example, the DL dual-common port multi-bandpass filter 1654 can be configured to pass two or more of 3GPP FDD frequency bands 1-28, 30, 31, 65, 66, 68, 70-74, or 85. In another example, the DL dual-common port multi-bandpass filter 1654 can be configured to pass two or more selected channels within a 3GPP FDD band. In another example, the DL dual-common port multi-bandpass filter 1654 can be configured to pass two or more selected frequency ranges within a 3GPP FDD band.

In one example, the downlink bands can be combined using the dual-common port multi-bandpass filters. Rather than using a separate DL amplifier and filter chain for each band, channel, or frequency range, a single amplifier chain can be used with the dual-common port multi-bandpass filters capable of filtering the multiple bands, channels, or frequency ranges. This line-sharing technique simplifies the architecture, the number of components, and the layout of the repeater. In addition, line-sharing due to the combined filters can allow for additional component sharing, such as RF amplifiers (gain blocks), RF attenuators, RF detectors, and the like. With fewer components, the repeater can have a higher overall reliability and a lower overall cost.

In another example, after traveling on the DL path, the DL signal on the DL path can be amplified and filtered in accordance with the type of amplifiers and dual-common port multi-bandpass filters included on the DL path. The signal from the DL path can be directed to the multi-common port multi-filter package 1612. From the multi-common port multi-filter package 1612, the DL signal can be directed to an integrated device antenna port 1602 or a bi-directional inside antenna port 1602.

In another example, a receive diversity DL outside antenna port 1669 or receive diversity DL node antenna port 1669 or receive diversity DL donor antenna port 1669 can be configured to be coupled to a receive diversity DL outside antenna 1670 or receive diversity DL node antenna 1670 or receive diversity DL donor antenna 1670. The receive diversity DL node antenna 1670 can be an omnidirectional antenna or directional antenna. The receive diversity DL node antenna 1670 can receive a DL signal from a base station. The receive diversity DL outside antenna port 1669 can be configured to be coupled to an input of a low-noise amplifier 1672.

In another example, the receive diversity DL path can comprise one or more of a low-noise amplifier 1672, a DL dual-common port multi-bandpass filter 1674, a variable attenuator 1676, or a power amplifier (PA) 1678. The low-noise amplifier 1672 can be a DL low-noise amplifier, the variable attenuator 1676 can be a DL variable attenuator, and the power amplifier 1678 can be a DL power amplifier. In another example, the power amplifier 1678 can comprise a variable gain power amplifier, a fixed-gain power amplifier, or a gain block. In another example, the low-noise amplifier 1672 can be configured to be coupled directly to a receive diversity DL outside antenna port 1669 without filtering between the low-noise amplifier 1672 and the receive diversity DL outside antenna port 1669.

In another example, the DL dual-common port multi-bandpass filter 1674 can include a first bandpass filter for a first frequency (e.g., B1) a second band-pass filter for a second frequency (e.g., B2). The DL dual-common port multi-bandpass filter 1674 can comprise a plurality of filters located in a single package. Each filter in the single package can be designed and configured to operate with other filters in the package. For example, each filter can be impedance matched with the other filters in the package to enable the filters to properly function within the same package. Each filter can be configured to provide a bandpass for a selected band that is non-frequency adjacent with the bandpass bands of other filters in the single package. The DL dual-common port multi-bandpass filter 1674 can be configured to pass two or more of 3GPP FDD frequency bands 2, 4, 5, 12, 13, 17, 25, 26, or 71. In another example, the DL dual-common port multi-bandpass filter 1674 can be configured to pass two or more of 3GPP FDD frequency bands 1-28, 30, 31, 65, 66, 68, 70-74, or 85. In another example, the DL dual-common port multi-bandpass filter 1674 can be configured to pass two or more selected channels within a 3GPP FDD band. In another example, the DL dual-common port multi-bandpass filter 1674 can be configured to pass two or more selected frequency ranges within a 3GPP FDD band.

In another example, after traveling on the receive diversity DL path, the receive diversity signal on the receive diversity DL path can be amplified and filtered in accordance with the type of amplifiers and dual-common port multi-bandpass filters included on the receive diversity DL path. The signal from the receive diversity DL path can be directed to a receive diversity device antenna port 1692 or a receive diversity downlink inside antenna port 1692. In another example, in an alternative, the receive diversity signal can travel on a bypass path coupled between the receive diversity DL inside antenna port 1692 and the receive diversity DL outside antenna port 1669, wherein the bypass path does not amplify or filter the receive diversity signal. The receive diversity device antenna port 1692 or a receive diversity downlink inside antenna port 1692 can be configured to be coupled to a receive diversity device antenna 1690 or a receive diversity downlink inside antenna 1690. The receive diversity device antenna 1690 can communicate the amplified and/or filtered or bypassed receive diversity DL signal to a UE.

In another example, as illustrated in FIG. 16*j*, the integrated device antenna 1610 can receive an UL signal from a UE. The bi-directional inside antenna port 1602 can be configured to be coupled to a splitter 1613. The splitter 1613 can be a diplexer, a multiplexer, or a multi-common port multi-filter package. The splitter 1613 can direct a signal into an UL path or from a DL path. In one example, the splitter 1613 can be used to separate the UL and DL paths.

In another example, as illustrated in FIG. 16*k*, a repeater can comprise a double-pole double-throw (DPDT) switch 1698. The output 1623 of the UL path can be configured to be coupled to the DPDT switch 1698. The DPDT switch 1698 can be configured to be coupled to an UL node antenna port 1604. The DL node antenna port 1606 can be configured to be coupled to the DPDT switch 1698. The DPDT switch 1698 can be configured to be coupled to an input 1651 of the DL path.

In another example, the DPDT switch 1698 can be configured to: allow the UL node antenna port 1604 to be coupled to the input 1651 of the DL path, and allow the DL node antenna port 1606 to be coupled to the output 1623 of the UL path. The UL node antenna port 1604 and the DL node antenna port can be switched based on whether the repeater is UL-limited or DL-limited. A repeater can be UL-limited when there is a low level of power from the repeater to the base station. A repeater can be DL-limited when there is a low level of power from the base station to the repeater.

In one example, switching from the UL node antenna port 1604 to the DL node antenna port 1606 can allow the uplink amplification and filtering path to use the DL node antenna port 1606 when the repeater is UL-limited. In one example, switching from the DL node antenna port 1506 to the UL node antenna port 1604 can allow the downlink amplification and filtering path to use the UL node antenna port 1604 when the repeater is DL-limited. In one example, this kind of switching can increase the level of power from the repeater to the base station (when the repeater is UL-limited) and increase the level of power from the base station to the repeater (when the repeater is DL-limited) by using spatial diversity or polarization diversity.

In another example, as illustrated in FIG. 16*l*, a repeater can comprise a triple-pole triple-throw (TPTT) switch 1699. The output 1623 of the UL path can be configured to be coupled to the TPTT switch 1699. The TPTT switch 1699 can be configured to be coupled to an UL node antenna port 1604. The DL node antenna port 1606 can be configured to be coupled to the TPTT switch 1699. The TPTT switch 1699 can be configured to be coupled to an input 1651 of the DL path. The receive diversity node antenna port 1669 can be configured to be coupled to the TPTT switch 1699. The TPTT switch 1699 can be configured to be coupled to an input 1671 of the receive diversity DL path.

In another example, the TPTT switch 1699 can be configured to: allow the UL node antenna port 1604 to be coupled to the input 1651 of the DL path; allow the UL node antenna port 1604 to be coupled to the input 1671 of the receive diversity DL path. In another example, the TPTT switch 1699 can be configured to: allow the DL node antenna port 1606 to be coupled to the output 1623 of the UL path; allow the DL node antenna port 1606 to be coupled to the input 1671 of the receive diversity DL path. In another example, the TPTT switch 1699 can be configured to: allow the receive diversity node antenna port 1669 to be coupled to the input 1651 of the DL path; allow the receive diversity node antenna port 1669 to be coupled to the output 1623 of the UL path.

In one example, the UL node antenna port 1604, the DL node antenna port, and the receive diversity node antenna port 1669 can be switched based on whether the repeater is UL-limited or DL-limited. A repeater can be UL-limited when there is a low level of power from the repeater to the base station. A repeater can be DL-limited when there is a low level of power from the base station to the repeater. In one example, this kind of antenna port switching can increase the level of power from the repeater to the base station (when the repeater is UL-limited) and increase the level of power from the base station to the repeater (when the repeater is DL-limited) by using spatial diversity or polarization diversity.

Figure 17:
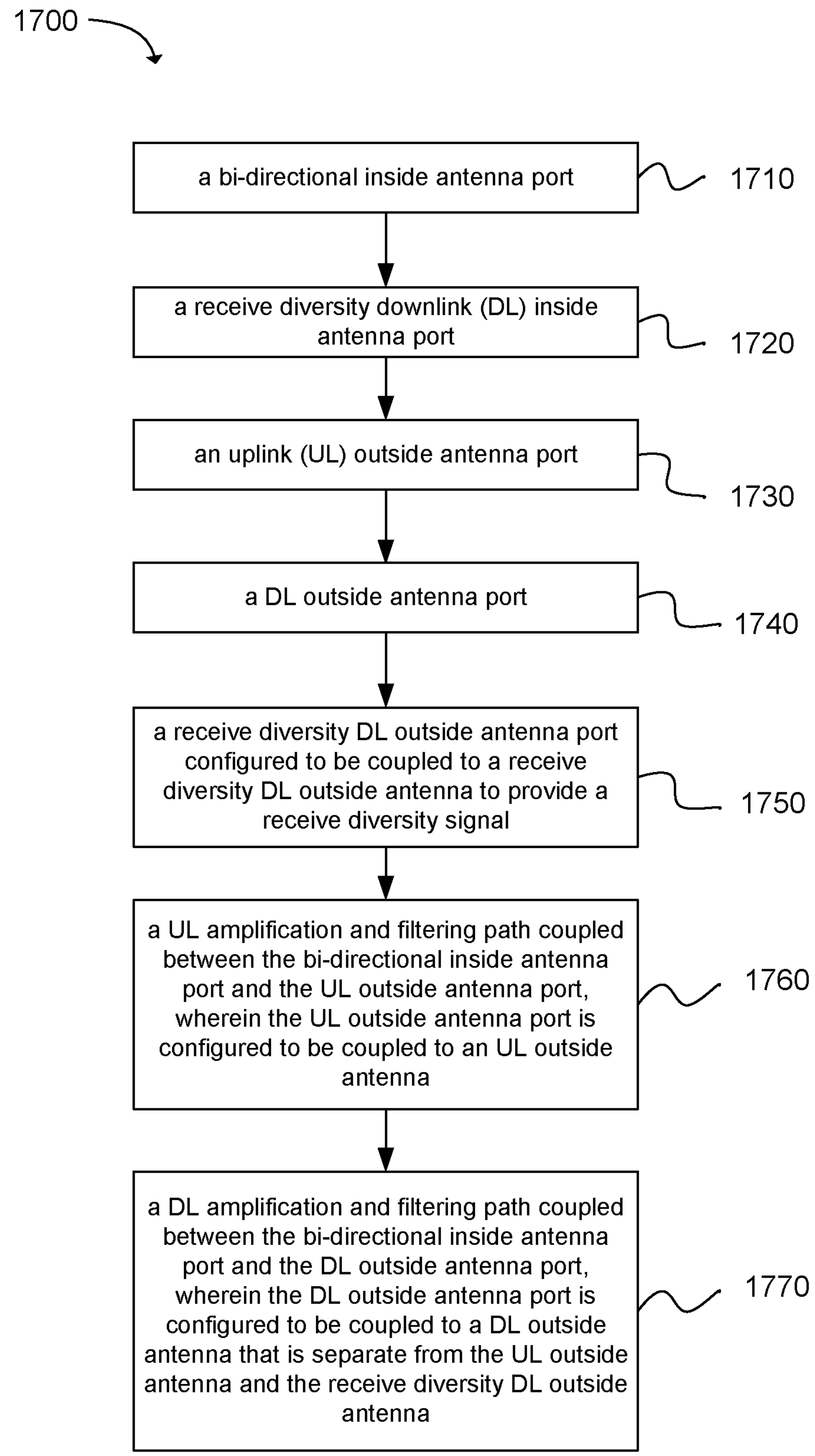
FIG. 17 depicts a repeater in accordance with an example.

Another example provides an apparatus 1700 of a repeater, as shown in the flow chart in FIG. 17. The apparatus can comprise a bi-directional inside antenna port, as shown in block 1710. The apparatus can further comprise a receive diversity downlink (DL) inside antenna port, as shown in block 1720. The apparatus can further comprise an uplink (UL) outside antenna port, as shown in block 1730. The apparatus can further comprise a DL outside antenna port, as shown in block 1740. The apparatus can further comprise a receive diversity DL outside antenna port configured to be coupled to a receive diversity DL outside antenna to provide a receive diversity signal, as shown in block 1750. The apparatus can further comprise a UL amplification and filtering path coupled between the bi-directional inside antenna port and the UL outside antenna port, wherein the UL outside antenna port is configured to be coupled to an UL outside antenna, as shown in block 1760. The apparatus can further comprise a DL amplification and filtering path coupled between the bi-directional inside antenna port and the DL outside antenna port, wherein the DL outside antenna port is configured to be coupled to a DL outside antenna that is separate from the UL outside antenna and the receive diversity DL outside antenna, as shown in block 1770.

Figure 18:
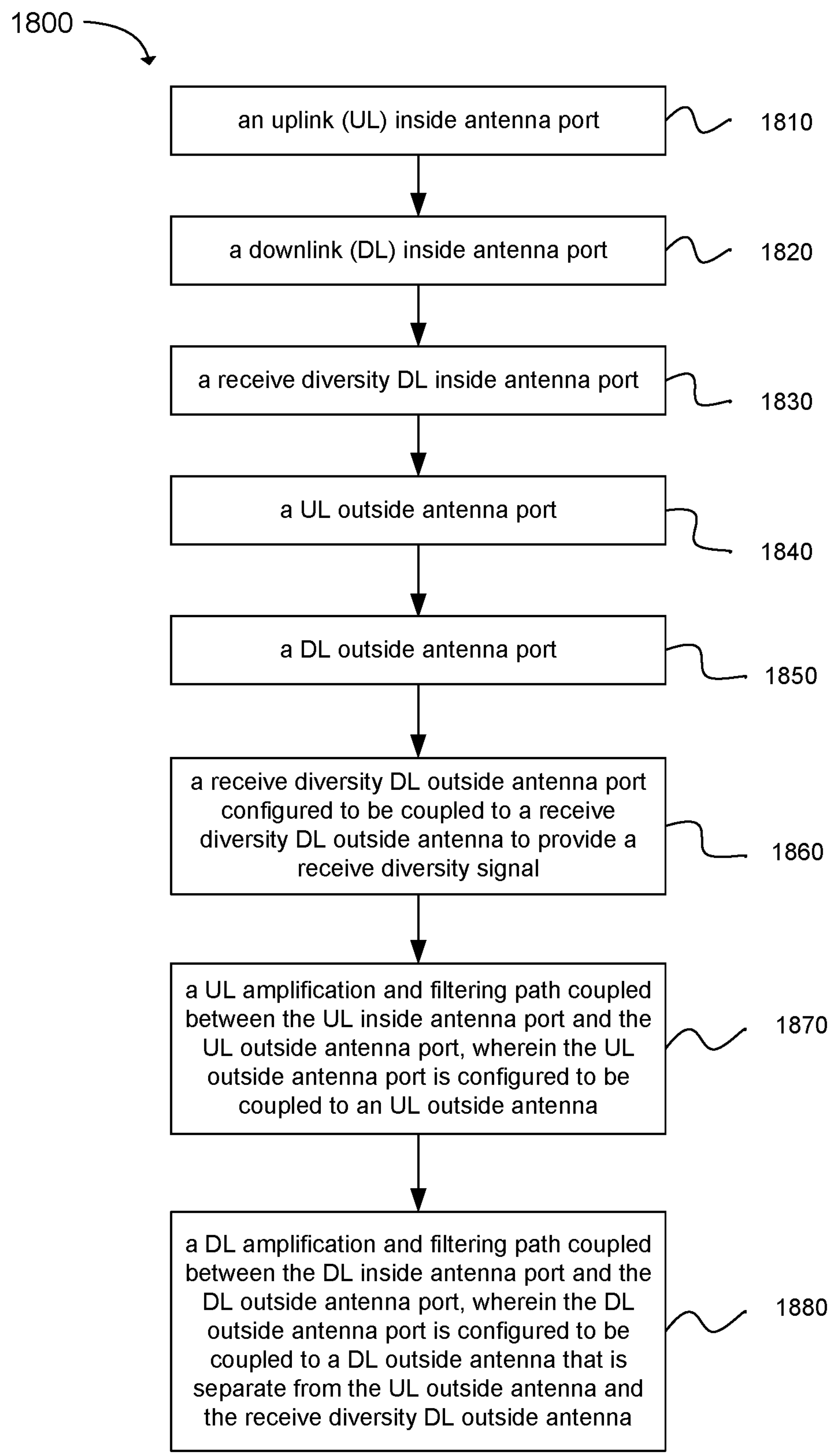
FIG. 18 depicts a repeater in accordance with an example.

Another example provides an apparatus 1800 of a repeater, as shown in the flow chart in FIG. 18. The apparatus can comprise an uplink (UL) inside antenna port, as shown in block 1810. The apparatus can further comprise a downlink (DL) inside antenna port, as shown in block 1820. The apparatus can further comprise a receive diversity DL inside antenna port, as shown in block 1830. The apparatus can further comprise a UL outside antenna port, as shown in block 1840. The apparatus can further comprise a DL outside antenna port, as shown in block 1850. The apparatus can further comprise a receive diversity DL outside antenna port configured to be coupled to a receive diversity DL outside antenna to provide a receive diversity signal, as shown in block 1860. The apparatus can further comprise a UL amplification and filtering path coupled between the UL inside antenna port and the UL outside antenna port, wherein the UL outside antenna port is configured to be coupled to an UL outside antenna, as shown in block 1870. The apparatus can further comprise a DL amplification and filtering path coupled between the DL inside antenna port and the DL outside antenna port, wherein the DL outside antenna port is configured to be coupled to a DL outside antenna that is separate from the UL outside antenna and the receive diversity DL outside antenna, as shown in block 1880.

Figure 19:
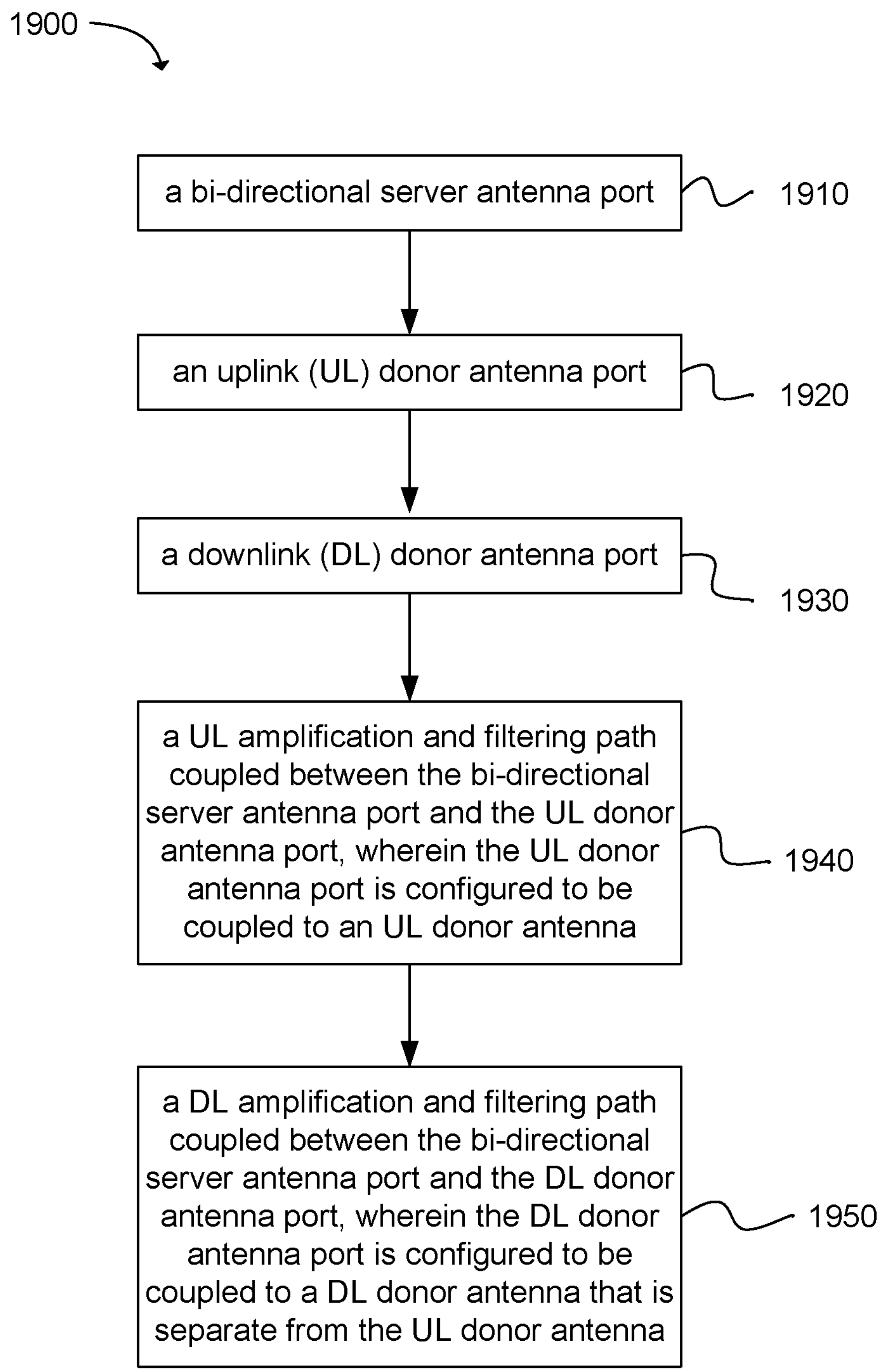
FIG. 19 depicts a repeater in accordance with an example.

Another example provides an apparatus 1900 of a repeater, as shown in the flow chart in FIG. 19. The apparatus can comprise a bi-directional server antenna port, as shown in block 1910. The apparatus can further comprise an uplink (UL) donor antenna port, as shown in block 1920. The apparatus can further comprise a downlink (DL) donor antenna port, as shown in block 1930. The apparatus can further comprise a UL amplification and filtering path coupled between the bi-directional server antenna port and the UL donor antenna port, wherein the UL donor antenna port is configured to be coupled to an UL donor antenna, as shown in block 1940. The apparatus can further comprise a DL amplification and filtering path coupled between the bi-directional server antenna port and the DL donor antenna port, wherein the DL donor antenna port is configured to be coupled to a DL donor antenna that is separate from the UL donor antenna, as shown in block 1950.

Figure 20:
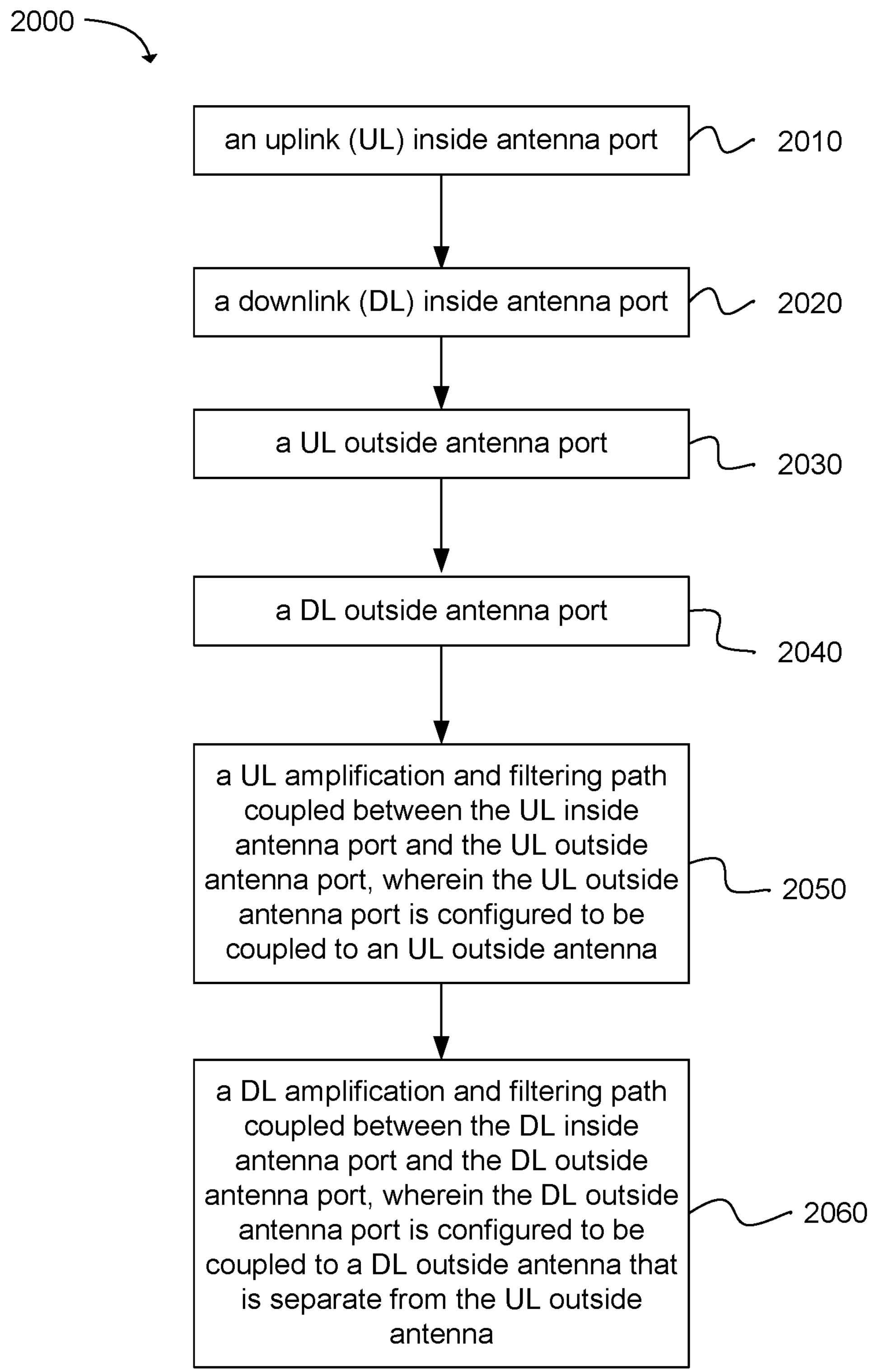
FIG. 20 depicts a repeater in accordance with an example.

Another example provides an apparatus 2000 of a repeater, as shown in the flow chart in FIG. 20. The apparatus can comprise an uplink (UL) inside antenna port, as shown in block 2010. The apparatus can further comprise a downlink (DL) inside antenna port, as shown in block 2020. The apparatus can further comprise a UL outside antenna port, as shown in block 2030. The apparatus can further comprise a DL outside antenna port, as shown in block 2040. The apparatus can further comprise a UL amplification and filtering path coupled between the UL inside antenna port and the UL outside antenna port, wherein the UL outside antenna port is configured to be coupled to an UL outside antenna, as shown in block 2050. The apparatus can further comprise a DL amplification and filtering path coupled between the DL inside antenna port and the DL outside antenna port, wherein the DL outside antenna port is configured to be coupled to a DL outside antenna that is separate from the UL outside antenna, as shown in block 2060.

Figure 21:
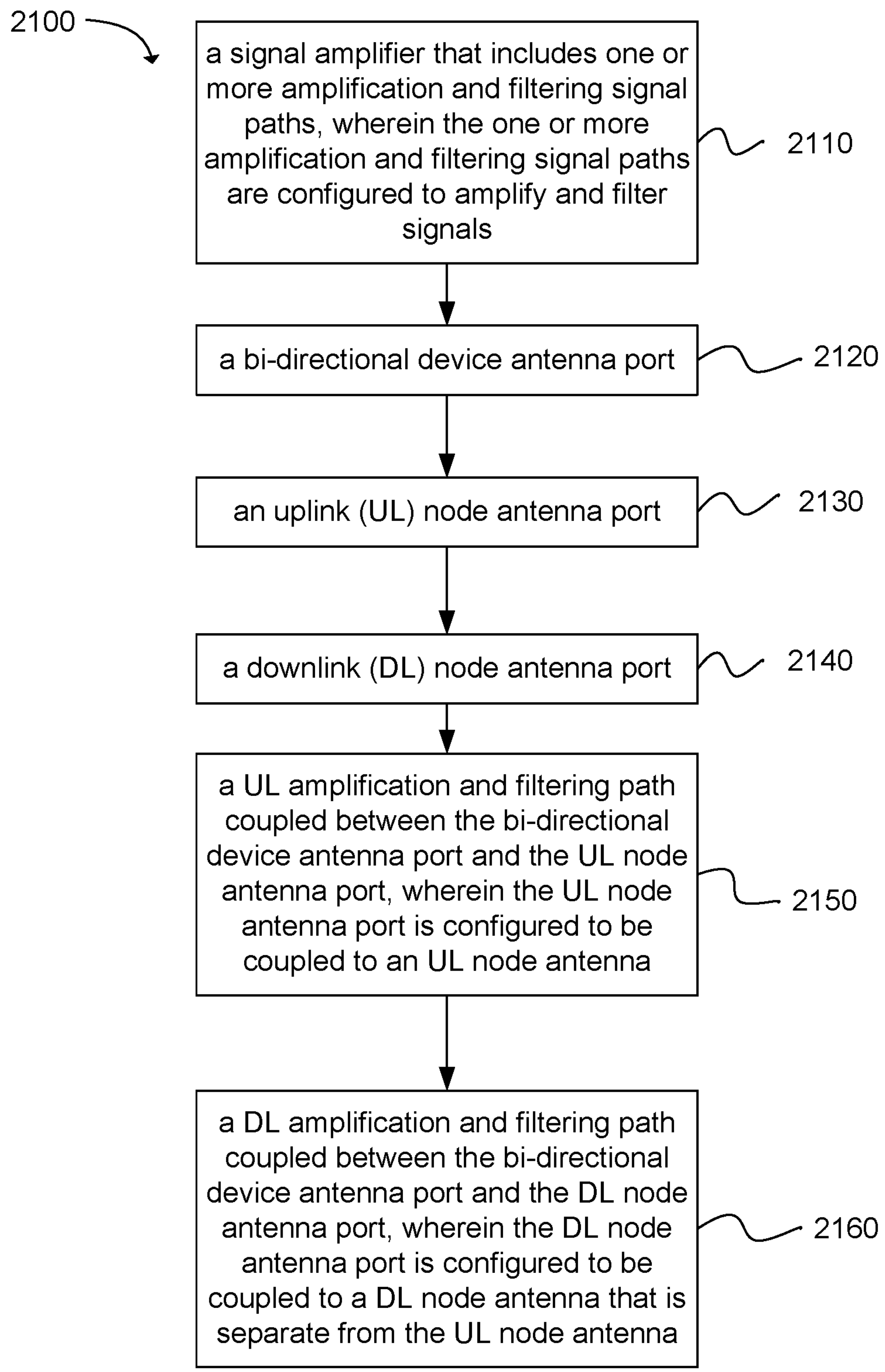
FIG. 21 depicts a signal booster in accordance with an example.

Another example provides an apparatus 2100 of a signal booster, as shown in the flow chart in FIG. 21. The apparatus can comprise a signal amplifier that includes one or more amplification and filtering signal paths, wherein the one or more amplification and filtering signal paths are configured to amplify and filter signals, as shown in block 2110. The apparatus can further comprise a bi-directional device antenna port, as shown in block 2120. The apparatus can further comprise an uplink (UL) node antenna port, as shown in block 2130. The apparatus can further comprise a downlink (DL) node antenna port, as shown in block 2140. The apparatus can further comprise a UL amplification and filtering path coupled between the bi-directional device antenna port and the UL node antenna port, wherein the UL node antenna port is configured to be coupled to an UL node antenna, as shown in block 2150. The apparatus can further comprise a DL amplification and filtering path coupled between the bi-directional device antenna port and the DL node antenna port, wherein the DL node antenna port is configured to be coupled to a DL node antenna that is separate from the UL node antenna, as shown in block 2160.

Figure 22:
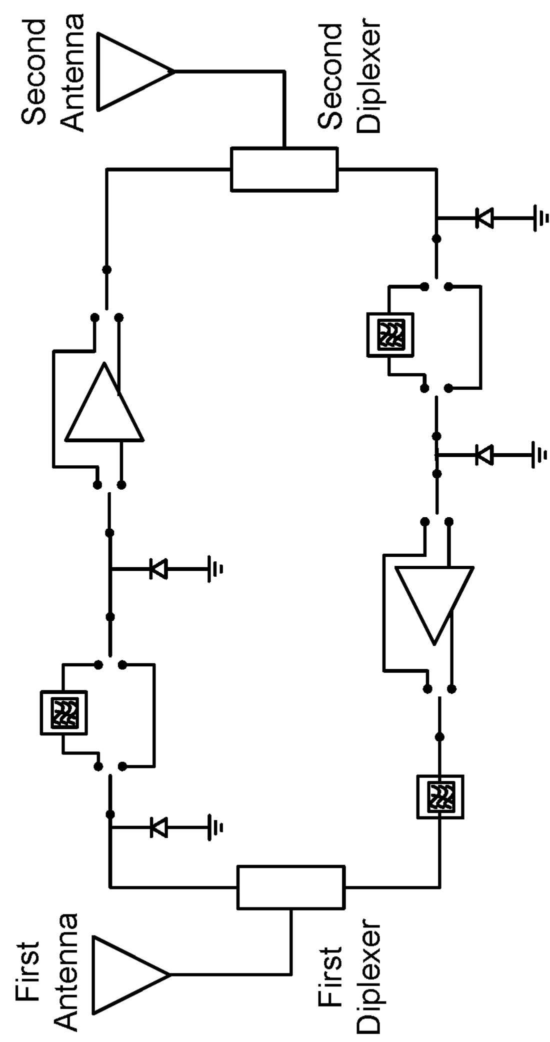
FIG. 22 illustrates a repeater having a bypassable amplifier and a switchable band pass filter in accordance with an example.

FIG. 22 illustrates an example of a repeater (or signal booster). The repeater can be a Federal Communications Commission (FCC)-compatible consumer repeater or signal booster. The repeater can include a first antenna (or a device antenna) configured to communicate signals with a wireless device. The repeater can include a second antenna (or a node antenna) configured to communicate signals with a base station. The repeater can include one or more signal paths configured to carry signals. Further, in this example, the repeater can be configured to amplify signals in up to six bands.

In this example, the repeater can include one downlink signal path and one uplink signal path. The uplink signal path can be communicatively coupled between a first diplexer and a second diplexer. The first diplexer can be communicatively coupled to the first antenna and the second diplexer can be communicatively coupled to the second antenna. The downlink signal path can be communicatively coupled between the first diplexer and the second diplexer. The uplink signal path and the downlink signal path can each include one or more detectors, one or more bandpass filters, one or more switchable bandpass filters, one or more amplifiers and/or one or more bypassable amplifiers.

With respect to the downlink signal path, the repeater can include one or more detectors configured to detect a power level of a downlink signal. The repeater can include a bypassable amplifier communicatively coupled to the downlink signal path. The repeater can include a switchable band pass filter communicatively coupled to the downlink signal path. Further, the repeater can include an amplifier bypass path communicatively coupled to the downlink signal path. The downlink signal can be configured to be directed to the amplifier bypass path to bypass the bypassable amplifier based on the power level of the downlink signal in relation to a defined power level threshold. Further, the repeater can include a band pass filter bypass path communicatively coupled to the downlink signal path. The downlink signal can be configured to be directed to the band pass filter bypass path to bypass the switchable band pass filter based on the power level of the downlink signal in relation to the defined power level threshold.

With respect to the uplink signal path, the repeater can include one or more detectors configured to detect a power level of an uplink signal. The repeater can include a bypassable amplifier communicatively coupled to the uplink signal path. The repeater can include a switchable band pass filter communicatively coupled to the uplink signal path. Further, the repeater can include an amplifier bypass path communicatively coupled to the uplink signal path. The uplink signal can be configured to be directed to the amplifier bypass path to bypass the bypassable amplifier based on the power level of the uplink signal in relation to a defined power level threshold. Further, the repeater can include a band pass filter bypass path communicatively coupled to the uplink signal path. The uplink signal can be configured to be directed to the band pass filter bypass path to bypass the switchable band pass filter based on the power level of the uplink signal in relation to the defined power level threshold.

In one example, the switchable band pass filter can correspond to a high frequency band or a low frequency band. The high frequency band can be band 4 (B4) or band 25 (B25). The low frequency band can be band 5 (B5), band 12 (B12) or band 13 (B13). In other words, the downlink signal path or the uplink signal path can correspond to B4, B25, B5, B12 or B13.

In one example, the switchable band pass filter can be bypassed when the power level of the signal is less than the defined power level threshold. In another example, the switchable band pass filter is not bypassed when the power level of the signal is greater than the defined power level threshold. In yet another example, the switchable band pass filter can be configured to be bypassed prior to a first stage of the downlink path in a weak signal area to reduce a noise figure. Further, the signal can bypass the bypassable amplifier to conserve energy based on the power level of the signal in relation to the defined power level threshold.

EXAMPLES

The following examples pertain to specific technology embodiments and point out specific features, elements, or actions that can be used or otherwise combined in achieving such embodiments.

Example 1 includes a wireless device signal amplifier sleeve, comprising: a housing that encloses at least a portion of a wireless device; a cellular signal amplifier integrated with the wireless device signal amplifier sleeve, wherein the cellular signal amplifier is configured to amplify signals for the wireless device; and a battery integrated with the wireless device signal amplifier sleeve, wherein the battery is configured to provide power to the cellular signal amplifier and the wireless device.

Example 2 includes the wireless device signal amplifier sleeve of Example 1, further comprising an integrated device antenna coupled to the cellular signal amplifier, wherein the integrated device antenna is configured to transmit signals from the cellular signal amplifier to the wireless device, wherein the signals are detected at the wireless device via a wireless device antenna.

Example 3 includes the wireless device signal amplifier sleeve of any of Examples 1 to 2, wherein a spacing between the integrated device antenna and the wireless device antenna within the wireless device signal amplifier sleeve is increased to achieve an increased coupling loss.

Example 4 includes the wireless device signal amplifier sleeve of any of Examples 1 to 3, wherein a primary antenna of the wireless device is coupled to the wireless device antenna within the wireless device signal amplifier sleeve at a predetermined distance to enable simultaneous uplink and downlink signal transmission at the wireless device, wherein the primary antenna of the wireless device is blocked by the wireless device to enable communications using a second antenna of the wireless device, wherein the second antenna of the wireless device is configured to communicate with a base station when a node antenna within the wireless device signal amplifier sleeve communicates with the base station.

Example 5 includes the wireless device signal amplifier sleeve of any of Examples 1 to 4, further comprising wireless charging circuitry operable to wirelessly charge the battery when the wireless device signal amplifier sleeve is placed in proximity to a wireless charging dock.

Example 6 includes the wireless device signal amplifier sleeve of any of Examples 1 to 5, wherein a portion of the wireless device is wrapped in at least one of a radio frequency (RF) absorbent material or a reflective material to reduce a specific absorption rate (SAR) level caused by the cellular signal amplifier integrated with the wireless device signal amplifier sleeve.

Example 7 includes the wireless device signal amplifier sleeve of any of Examples 1 to 6, further comprising a node antenna that enables the wireless device signal amplifier sleeve to communicate with one or more wireless device signal amplifier sleeves using one or more of Bluetooth v4.0, Bluetooth Low Energy, Bluetooth v4.1, Bluetooth v4.2, Ultra High Frequency (UHF), Very High Frequency (VHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, and a TV White Space Band (TVWS).

Example 8 includes the wireless device signal amplifier sleeve of any of Examples 1 to 7, further comprising: a cellular signal filter coupled to the cellular signal amplifier and configured to filter signals for a base station; a satellite signal filter coupled to the cellular signal amplifier and configured to filter signals for a satellite; and a node antenna disposed within the sleeve, communicatively coupled to the cellular signal amplifier and configured to communicate with the satellite and the base station.

Example 9 includes the wireless device signal amplifier sleeve of any of Examples 1 to 8, wherein the cellular signal amplifier is further configured to: receive a downlink signal from a base station; direct the downlink signal to a selected signal path for filtering and amplification of the downlink signal, wherein the signal path is selected based on a band associated with the downlink signal; and transmit an amplified downlink signal to the wireless device.

Example 10 includes the wireless device signal amplifier sleeve of any of Examples 1 to 9, wherein the cellular signal amplifier is further configured to: receive an uplink signal from the wireless device; direct the uplink signal to a selected signal path for filtering and amplification of the uplink signal, wherein the signal path is selected based on a band associated with the uplink signal; and transmit an amplified uplink signal to a base station.

Example 11 includes the wireless device signal amplifier sleeve of any of Examples 1 to 10, wherein the cellular wireless device is removable from the wireless device signal amplifier sleeve.

Example 12 includes the wireless device signal amplifier sleeve of any of Examples 1 to 11, wherein the cellular signal amplifier is a Federal Communications Commission (FCC)-compatible consumer signal booster.

Example 13 includes the wireless device signal amplifier sleeve of any of Examples 1 to 12, wherein the housing is sized and shaped to enclose at least the portion of the wireless device.

Example 14 includes the wireless device signal amplifier sleeve of any of Examples 1 to 13, wherein the cellular signal amplifier is configured to boost signals in up to six bands.

Example 15 includes a wireless device signal amplifier sleeve, comprising: a housing that encloses at least a portion of a wireless device, wherein the wireless device includes a primary antenna and a secondary antenna; a cellular signal amplifier integrated with the wireless device signal amplifier sleeve, wherein the cellular signal amplifier is configured to amplify signals to or from a base station for the wireless device; an integrated device antenna coupled to the cellular signal amplifier, wherein the integrated device antenna is coupled to the primary antenna of the wireless device at a selected distance, wherein the secondary antenna of the wireless device enables the wireless device to directly communicate with the base station; and an integrated node antenna coupled to the cellular signal amplifier, wherein the integrated node antenna is configured to transmit signals from the cellular signal amplifier to a base station.

Example 16 includes the wireless device signal amplifier sleeve of Example 15, further comprising a battery integrated with the wireless device signal amplifier sleeve, wherein the battery is configured to provide power to the cellular signal amplifier and the wireless device.

Example 17 includes the wireless device signal amplifier sleeve of any of Examples 15 to 16, wherein the integrated device antenna is coupled to the primary antenna of the wireless device at the selected distance to achieve a desired coupling factor.

Example 18 includes the wireless device signal amplifier sleeve of any of Examples 15 to 17, wherein communication between the primary antenna of the wireless device and the integrated device antenna coupled to the cellular signal amplifier is operable to occur simultaneously as communication between the secondary antenna of the wireless device and the base station.

Example 19 includes a wireless device signal amplifier sleeve, comprising: a housing that encloses at least a portion of a wireless device; a cellular signal amplifier integrated with the wireless device signal amplifier sleeve, wherein the cellular signal amplifier is configured to amplify signals for the wireless device; an integrated device antenna coupled to the cellular signal amplifier, wherein the integrated device antenna is configured to transmit signals from the cellular signal amplifier to the wireless device; an integrated node antenna coupled to the cellular signal amplifier, wherein the integrated node antenna is configured to transmit signals from the cellular signal amplifier to a base station; and a battery integrated with the wireless device signal amplifier sleeve, wherein the battery is configured to provide power to the cellular signal amplifier and the wireless device.

Example 20 includes the wireless device signal amplifier sleeve of Example 19, further comprising wireless charging circuitry operable to wirelessly charge the battery when the wireless device signal amplifier sleeve is placed in proximity to a wireless charging dock.

Example 21 includes the wireless device signal amplifier sleeve of any of Examples 19 to 20, wherein the cellular wireless device is removable from the wireless device signal amplifier sleeve.

Example 22 includes the wireless device signal amplifier sleeve of any of Examples 19 to 21, wherein a spacing between the integrated device antenna and the wireless device antenna within the wireless device signal amplifier sleeve is increased to achieve an increased coupling loss.

Example 23 includes a signal repeater, comprising: a first antenna configured to communicate signals with a wireless device; a second antenna configured to communicate signals with a base station; one or more amplification and filtering signal paths configured to be positioned between the first antenna and the second antenna, wherein the amplification and filtering signal paths are configured to amplify and filter signals for communication to the base station via the first antenna or for communication to the wireless device via the second antenna; and a bypass signal path configured to be positioned between the first antenna and the second antenna, wherein the bypass signal path does not amplify and filter signals traveling through the bypass signal path, wherein signals are directed to one of the amplification and filtering signal paths or the bypass signal path.

Example 24 includes the signal repeater of Example 23, wherein the first antenna includes an integrated device antenna and the second antenna includes an integrated node antenna.

Example 25 includes the signal repeater of any of Examples 23 to 24, wherein the signals are directed to one of the amplification and filtering signal paths or the bypass signal path depending on a power level of the signals in relation to a defined power level threshold.

Example 26 includes the signal repeater of any of Examples 23 to 25, further comprising one or more detectors configured to detect the power levels of the signals.

Example 27 includes the signal repeater of any of Examples 23 to 26, further comprising one or more directional couplers used to form the amplification and filtering signal paths and the bypass signal path.

Example 28 includes the signal repeater of any of Examples 23 to 27, wherein: signals are directed to one of the amplification and filtering signal paths when power levels of the signals are below the defined power level threshold; and signals are directed to the bypass signal path when power levels of the signals are above the defined power level threshold.

Example 29 includes the signal repeater of any of Examples 23 to 28, wherein the amplification and filtering signal paths includes a high band amplification and filtering signal path operable to direct signals within high frequency bands.

Example 30 includes the signal repeater of any of Examples 23 to 29, wherein the amplification and filtering signal paths includes a low band amplification and filtering signal path operable to direct signals within low frequency bands.

Example 31 includes the signal repeater of any of Examples 23 to 30, wherein the first antenna includes an integrated uplink (UL) node antenna or an integrated downlink (DL) node antenna.

Example 32 includes the signal repeater of any of Examples 23 to 31, wherein the amplification and filtering signal paths are configured to boost signals in up to six bands.

Example 33 includes the signal repeater of any of Examples 23 to 32, wherein the signal repeater is insertable in a wireless device signal amplifier sleeve along with the wireless device.

Example 34 includes a signal repeater, comprising: a first antenna configured to communicate signals with a wireless device; a second antenna configured to communicate signals with a base station; and a signal amplifier configured to amplify and filter signals for communication to the base station via the first antenna or for communication to the wireless device via the second antenna, wherein the first antenna is configured to be coupled to the second antenna to form a bypass signal path that bypasses the signal amplifier.

Example 35 includes the signal repeater of Example 34, further comprising one or more detectors configured to detect the power levels of the signals.

Example 36 includes the signal repeater of any of Examples 34 to 35, wherein signals are directed to the bypass signal path when the power levels of the signals are above a defined power level threshold.

Example 37 includes the signal repeater of any of Examples 34 to 36, wherein signals are not directed to the bypass signal path when the power levels of the signals are below a defined power level threshold.

Example 38 includes the signal repeater of any of Examples 34 to 37, further comprising one or more directional couplers used to form the bypass signal path that bypasses the signal amplifier.

Example 39 includes the signal repeater of any of Examples 34 to 38, wherein the first antenna includes an integrated uplink (UL) node antenna or an integrated downlink (DL) node antenna.

Example 40 includes the signal repeater of any of Examples 34 to 39, wherein the signal amplifier includes one or more downlink (DL) amplification and filtering signal paths and one or more uplink (UL) amplification and filtering signal paths.

Example 41 includes the signal repeater of any of Examples 34 to 40, wherein the signal amplifier includes one or more amplifiers and one or more band pass filters, wherein the band pass filters correspond to high frequency bands or low frequency bands.

Example 42 includes a signal repeater, comprising: a network hardware device configured to communicate signals with a wireless device; an amplified node antenna configured to communicate signals with a base station; a passive node antenna configured to communicate signals with the base station; one or more amplification and filtering signal paths configured to be positioned between the network hardware device and the amplified node antenna, wherein the amplification and filtering signal paths are configured to amplify and filter signals for communication to the base station via the amplified node antenna or for communication to the wireless device via the network hardware device; and a bypass signal path configured to be positioned between the network hardware device and the passive node antenna, wherein the bypass signal path does not amplify and filter signals traveling through the bypass signal path.

Example 43 includes the signal repeater of Example 42, further comprising one or more detectors configured to detect power levels of signals from the network hardware device, wherein the signals are provided to one of the amplification and filtering signal paths when the power levels of the signals are below a defined power level threshold or the signals are provided to bypass signal path when the power levels of the signals are above the defined power level threshold.

Example 44 includes the signal repeater of any of Examples 42 to 43, further comprising one or more directional couplers used to form the amplification and filtering signal paths and the bypass signal path.

Example 45 includes the signal repeater of any of Examples 42 to 44, wherein the signal repeater is insertable in a wireless device signal amplifier sleeve along with the wireless device.

Example 46 includes the signal repeater of any of Examples 42 to 45, wherein the network hardware device includes a modem.

Example 47 includes a signal booster, comprising: a signal amplifier that includes one or more amplification and filtering signal paths, wherein the amplification and filtering signal paths are configured to amplify and filter signals; and one or more detectors configured to detect power levels of the signals, wherein the one or more amplification and filtering signal paths include one or more bypassable amplifiers, wherein the signals bypass the amplifiers to conserve energy based on the power levels of the signals in relation to a defined power level threshold, and the signals do not bypass the amplifiers based on the power levels of the signals in relation to the defined power level threshold.

Example 48 includes the signal booster of Example 47, further comprising: an integrated device antenna configured to communicate signals with a wireless device; and an integrated node antenna configured to communicate signals with a base station.

Example 49 includes the signal booster of any of Examples 47 to 48, wherein the integrated node antenna includes an integrated uplink (UL) node antenna or an integrated downlink (DL) node antenna.

Example 50 includes the signal booster of any of Examples 47 to 49, wherein the one or more amplification and filtering signal paths include one or more downlink (DL) amplification and filtering signal paths and one or more uplink (UL) amplification and filtering signal paths.

Example 51 includes the signal booster of any of Examples 47 to 50, wherein the signal booster is insertable in a wireless device signal amplifier sleeve along with the wireless device.

Example 52 includes the signal booster of any of Examples 47 to 51, wherein the signal booster is a Federal Communications Commission (FCC)-compatible consumer signal booster.

Example 53 includes the signal booster of any of Examples 47 to 52, wherein the signal amplifier is configured to boost signals in up to six bands.

Example 54 includes a signal booster, comprising: a signal amplifier that includes one or more amplification and filtering signal paths, wherein the amplification and filtering signal paths are configured to amplify and filter signals; and one or more detectors configured to detect power levels of the signals, wherein the one or more amplification and filtering signal paths include one or more switchable band pass filters, wherein the band pass filters are switched in based on the power levels of the signals in relation to a defined power level threshold, the band pass filters are switched out based on the power levels of the signals in relation to the defined power level threshold.

Example 55 includes the signal booster of Example 54, further comprising: an integrated device antenna configured to communicate signals with a wireless device; and an integrated node antenna configured to communicate signals with a base station.

Example 56 includes the signal booster of any of Examples 54 to 55, wherein the band pass filters are switched out to reduce a noise figure of the signal booster and extend a coverage area of the signal booster.

Example 57 includes the signal booster of any of Examples 54 to 56, wherein the switchable band pass filters correspond to high frequency bands or low frequency bands, wherein the high frequency bands include band 4 (B4) and band 25 (B25), and the low frequency bands include band 5 (B5), band 12 (B12) and band 13 (B13).

Example 58 includes the signal booster of any of Examples 54 to 57, wherein the switchable band pass filters are first band pass filters in a defined stage of the amplification and filtering signal paths.

Example 59 includes the signal booster of any of Examples 54 to 58, wherein the signal booster is insertable in a wireless device signal amplifier sleeve along with the wireless device.

Example 60 includes the signal booster of any of Examples 54 to 59, wherein the signal booster is a Federal Communications Commission (FCC)-compatible consumer signal booster.

Example 61 includes a signal booster, comprising: a signal amplifier configured to amplify and filter signals for a wireless device; and one or more detectors configured to detect power levels of the signals, wherein the signal amplifier includes at least one of: one or more bypassable amplifiers or one or more switchable band pass filters that are configurable depending on detected power levels of the signals.

Example 62 includes the signal booster of Example 61, wherein: the signals bypass the amplifiers to conserve energy based on the power levels of the signals in relation to a defined power level threshold; or the signals do not bypass the amplifiers based on the power levels in relation to the defined power level threshold.

Example 63 includes the signal booster of any of Examples 61 to 62, wherein: the band pass filters are switched in based on the power levels of the signals in relation to a defined power level threshold; or the band pass filters are switched out based on the power levels of the signals in relation to the defined power level threshold.

Example 64 includes the signal booster of any of Examples 61 to 63, wherein the signal amplifier is further configured to: receive a downlink signal from a base station; direct the downlink signal to a selected signal path for filtering and amplification of the downlink signal, wherein the signal path is selected based on a band associated with the downlink signal; and transmit an amplified downlink signal to the wireless device.

Example 65 includes the signal booster of any of Examples 61 to 64, wherein the signal amplifier is further configured to: receive an uplink signal from the wireless device; direct the uplink signal to a selected signal path for filtering and amplification of the uplink signal, wherein the signal path is selected based on a band associated with the uplink signal; and transmit an amplified uplink signal to a base station.

Example 66 includes the signal booster of any of Examples 61 to 65, wherein the signal booster is a cellular signal booster.

Example 67 includes a repeater, comprising: a bi-directional inside antenna port; a receive diversity downlink (DL) inside antenna port; an uplink (UL) outside antenna port; a DL outside antenna port; a receive diversity DL outside antenna port configured to be coupled to a receive diversity DL outside antenna to provide a receive diversity signal; a UL amplification and filtering path coupled between the bi-directional inside antenna port and the UL outside antenna port, wherein the UL outside antenna port is configured to be coupled to an UL outside antenna; and a DL amplification and filtering path coupled between the bi-directional inside antenna port and the DL outside antenna port, wherein the DL outside antenna port is configured to be coupled to a DL outside antenna that is separate from both the UL outside antenna and the receive diversity DL outside antenna.

Example 68 includes the repeater of Example 67, wherein the receive diversity DL outside antenna port is coupled to a receive diversity DL amplification and filtering path coupled between the receive diversity DL inside antenna port and the receive diversity DL outside antenna port.

Example 69 includes the repeater of Example 68, further comprising: a receive diversity DL multiband filter on the receive diversity DL amplification and filtering path, wherein the receive diversity DL multiband filter is configured to filter signals on two or more non-spectrally adjacent bands.

Example 70 includes the repeater of Example 69, wherein the receive diversity DL multiband filter comprises a plurality of bandpass filters in a single package, wherein the plurality of bandpass filters are impedance matched to enable operation in the single package.

Example 71 includes the repeater of Example 70, wherein the receive diversity DL multiband filter is a dual-common port multi-bandpass filter.

Example 72 includes the repeater of Example 67, wherein the UL outside antenna port, the DL outside antenna port, or the receive diversity DL outside antenna port are configured to be coupled to one or more of an omnidirectional antenna or a directional antenna.

Example 73 includes the repeater of Example 67, wherein the UL outside antenna port is connected to a power amplifier without filtering between the power amplifier and the UL outside antenna port.

Example 74 includes the repeater of Example 67, wherein the UL outside antenna port is coupled to a power amplifier with low-order filtering coupled between the UL outside antenna port and the power amplifier to filter harmonics emitted by the power amplifier.

Example 75 includes the repeater of Example 67, wherein: the DL outside antenna port is connected to a low-noise amplifier without filtering between the low-noise amplifier and the DL outside antenna port; or the DL outside antenna port is coupled to a low-noise amplifier with a switchable filter between the low-noise amplifier and the DL outside antenna port.

Example 76 includes the repeater of Example 67, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 77 includes the repeater of Example 67, wherein the repeater is configured to amplify signals in up to six bands, wherein each band comprises a separate amplification and filtering path.

Example 78 includes the repeater of Example 77, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 79 includes the repeater of Example 67, wherein the repeater is a Federal Communications Commission (FCC)-compatible consumer signal booster.

Example 80 includes the repeater of Example 67, wherein one or more of the UL amplification and filtering path, the DL amplification and filtering path, or a receive diversity DL amplification and filtering path is configured to switch between one or more of: the UL outside antenna port; the DL outside antenna port; or the receive diversity DL outside antenna port.

Example 81 includes the repeater of Example 67, further comprising one or more of: an UL multiband filter on the UL amplification and filtering path, wherein the UL multiband filter is configured to filter signals on two or more non-spectrally adjacent bands; or a DL multiband filter on the DL amplification and filtering path, wherein the DL multiband filter is configured to filter signals on two or more non-spectrally adjacent bands.

Example 82 includes the repeater of Example 81, wherein the UL multiband filter or the DL multiband filter comprises a plurality of bandpass filters in a single package, wherein the plurality of bandpass filters are impedance matched to enable operation in the single package.

Example 83 includes the repeater of Example 82, wherein the UL multiband filter or the DL multiband filter is a dual-common port multi-bandpass filter.

Example 84 includes the repeater of Example 67, further comprising a multiplexer configured to: couple the UL amplification and filtering path to the bi-directional inside antenna port; and couple the DL amplification and filtering path to the bi-directional inside antenna port.

Example 85 includes the repeater of Example 84, wherein the multiplexer can be a diplexer, a duplexer, a multiplexer, a circulator, or a multi-common port multi-filter package.

Example 86 includes a repeater, comprising: an uplink (UL) inside antenna port; a downlink (DL) inside antenna port; a receive diversity DL inside antenna port; a UL outside antenna port; a DL outside antenna port; a receive diversity DL outside antenna port configured to be coupled to a receive diversity DL outside antenna to provide a receive diversity signal; a UL amplification and filtering path coupled between the UL inside antenna port and the UL outside antenna port, wherein the UL outside antenna port is configured to be coupled to an UL outside antenna; and a DL amplification and filtering path coupled between the DL inside antenna port and the DL outside antenna port, wherein the DL outside antenna port is configured to be coupled to a DL outside antenna that is separate from both the UL outside antenna and the receive diversity DL outside antenna.

Example 87 includes the repeater of Example 86, wherein the receive diversity DL outside antenna port is coupled to a receive diversity DL amplification and filtering path coupled between the receive diversity DL inside antenna port and the receive diversity DL outside antenna port.

Example 88 includes the repeater of Example 87, further comprising one or more of: a receive diversity DL multiband filter on the receive diversity DL amplification and filtering path, wherein the receive diversity DL multiband filter is configured to filter signals on two or more non-spectrally adjacent bands.

Example 89 includes the repeater of Example 88, wherein the receive diversity DL multiband filter comprises a plurality of bandpass filters in a single package, wherein the plurality of bandpass filters are impedance matched to enable operation in the single package.

Example 90 includes the repeater of Example 89, wherein the receive diversity DL multiband filter is a dual-common port multi-bandpass filter.

Example 91 includes the repeater of Example 86, wherein the UL outside antenna port, the DL outside antenna port, or the receive diversity DL outside antenna port are configured to be coupled to one or more of an omnidirectional antenna or a directional antenna.

Example 92 includes the repeater of Example 86, wherein the UL outside antenna port is connected to a power amplifier without filtering between the power amplifier and the UL outside antenna port.

Example 93 includes the repeater of Example 86, wherein the UL outside antenna port is coupled to a power amplifier with low-order filtering coupled between the UL outside antenna port and the power amplifier to filter harmonics emitted by the power amplifier.

Example 94 includes the repeater of Example 86, wherein: the DL outside antenna port is connected to a low-noise amplifier without filtering between the low-noise amplifier and the DL outside antenna port; or the DL outside antenna port is coupled to a low-noise amplifier with a switchable filter between the low-noise amplifier and the DL outside antenna port.

Example 95 includes the repeater of Example 86, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 96 includes the repeater of Example 86, wherein the repeater is configured to amplify signals in up to six bands, wherein each band comprises a separate amplification and filtering path.

Example 97 includes the repeater of Example 96, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 98 includes the repeater of Example 86, wherein the repeater is a Federal Communications Commission (FCC)-compatible consumer signal booster.

Example 99 includes the repeater of Example 86, wherein one or more of the UL amplification and filtering path, the DL amplification and filtering path, or a receive diversity DL amplification and filtering path is configured to switch between one or more of: the UL outside antenna port; the DL outside antenna port; or the receive diversity DL outside antenna port.

Example 100 includes the repeater of Example 86, further comprising one or more of: an UL multiband filter on the UL amplification and filtering path, wherein the UL multiband filter is configured to filter signals on two or more non-spectrally adjacent bands; or a DL multiband filter on the DL amplification and filtering path, wherein the DL multiband filter is configured to filter signals on two or more non-spectrally adjacent bands.

Example 101 includes the repeater of Example 100, wherein the UL multiband filter or the DL multiband filter comprises a plurality of bandpass filters in a single package, wherein the plurality of bandpass filters are impedance matched to enable operation in the single package.

Example 102 includes the repeater of Example 101, wherein the UL multiband filter or the DL multiband filter is a dual-common port multi-bandpass filter.

Example 103 includes a repeater, comprising: a bi-directional server antenna port; an uplink (UL) donor antenna port; a downlink (DL) donor antenna port; a UL amplification and filtering path coupled between the bi-directional server antenna port and the UL donor antenna port, wherein the UL donor antenna port is configured to be coupled to an UL donor antenna; and a DL amplification and filtering path coupled between the bi-directional server antenna port and the DL donor antenna port, wherein the DL donor antenna port is configured to be coupled to a DL donor antenna that is separate from the UL donor antenna.

Example 104 includes the repeater of Example 103, further comprising: a receive diversity DL server antenna port; and a receive diversity DL donor antenna port configured to be coupled to a receive diversity DL donor antenna to provide a receive diversity signal.

Example 105 includes the repeater of Example 104, further comprising: a receive diversity DL multiband filter on a receive diversity DL amplification and filtering path coupled between the receive diversity DL server antenna port and the receive diversity DL donor antenna port, wherein the receive diversity DL multiband filter is configured to filter signals on two or more non-spectrally adjacent bands.

Example 106 includes the repeater of Example 105, wherein the receive diversity DL multiband filter comprises a plurality of bandpass filters in a single package, wherein the plurality of bandpass filters are impedance matched to enable operation in the single package.

Example 107 includes the repeater of Example 106, wherein the receive diversity DL multiband filter is a dual-common port multi-bandpass filter.

Example 108 includes the repeater of Example 104, wherein one or more of the UL amplification and filtering path or the DL amplification and filtering path or a receive diversity DL amplification and filtering path coupled between the receive diversity DL server antenna port and the receive diversity DL donor antenna port is configured to switch between one or more of: the UL donor antenna port; the DL donor antenna port; or the receive diversity DL donor antenna port.

Example 109 includes the repeater of Example 104, wherein: the receive diversity DL donor antenna port is coupled to a receive diversity DL amplification and filtering path coupled between the receive diversity DL server antenna port and the receive diversity DL donor antenna port.

Example 110 includes the repeater of Example 104, wherein the UL donor antenna port, the DL donor antenna port, or the receive diversity DL donor antenna port are configured to be coupled to one or more of an omnidirectional antenna or a directional antenna.

Example 111 includes the repeater of Example 103, wherein the UL donor antenna port is connected to a power amplifier without filtering between the power amplifier and the UL donor antenna port.

Example 112 includes the repeater of Example 103, wherein the UL donor antenna port is coupled to a power amplifier with low-order filtering coupled between the UL donor antenna port and the power amplifier to filter harmonics emitted by the power amplifier.

Example 113 includes the repeater of Example 103, wherein: the DL donor antenna port is connected to a low-noise amplifier without filtering between the low-noise amplifier and the DL donor antenna port; or the DL donor antenna port is coupled to a low-noise amplifier with a switchable filter between the low-noise amplifier and the DL donor antenna port.

Example 114 includes the repeater of Example 103, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 115 includes the repeater of Example 103, wherein the repeater is configured to amplify signals in up to six bands, wherein each band comprises a separate amplification and filtering path.

Example 116 includes the repeater of Example 115, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 117 includes the repeater of Example 103, wherein the repeater is a Federal Communications Commission (FCC)-compatible consumer signal booster.

Example 118 includes the repeater of Example 103, wherein one or more of the UL amplification and filtering path or the DL amplification and filtering path is configured to switch between one or more of: the UL donor antenna port; or the DL donor antenna port.

Example 119 includes the repeater of Example 103, further comprising one or more of: an UL multiband filter on the UL amplification and filtering path, wherein the UL multiband filter is configured to filter signals on two or more non-spectrally adjacent bands; or a DL multiband filter on the DL amplification and filtering path, wherein the DL multiband filter is configured to filter signals on two or more non-spectrally adjacent bands.

Example 120 includes the repeater of Example 119, wherein the UL multiband filter or the DL multiband filter comprises a plurality of bandpass filters in a single package, wherein the plurality of bandpass filters are impedance matched to enable operation in the single package.

Example 121 includes the repeater of Example 120, wherein the UL multiband filter or the DL multiband filter is a dual-common port multi-bandpass filter.

Example 122 includes the repeater of Example 103, further comprising a multiplexer configured to: couple the UL amplification and filtering path to the bi-directional server antenna port; and couple the DL amplification and filtering path to the bi-directional server antenna port.

Example 123 includes the repeater of Example 122, wherein the multiplexer can be a diplexer, a duplexer, a multiplexer, a circulator, or a multi-common port multi-filter package.

Example 124 includes a repeater, comprising: an uplink (UL) inside antenna port; a downlink (DL) inside antenna port; a UL outside antenna port; a DL outside antenna port; a UL amplification and filtering path coupled between the UL inside antenna port and the UL outside antenna port, wherein the UL outside antenna port is configured to be coupled to an UL outside antenna; and a DL amplification and filtering path coupled between the DL inside antenna port and the DL outside antenna port, wherein the DL outside antenna port is configured to be coupled to a DL outside antenna that is separate from the UL outside antenna.

Example 125 includes the repeater of Example 124, further comprising: a receive diversity DL inside antenna port; and a receive diversity DL outside antenna port configured to be coupled to a receive diversity DL outside antenna to provide a receive diversity signal.

Example 126 includes the repeater of Example 125, wherein: the receive diversity DL outside antenna port is coupled to a receive diversity DL amplification and filtering path coupled between the receive diversity DL inside antenna port and the receive diversity DL outside antenna port.

Example 127 includes the repeater of Example 125, wherein the UL outside antenna port, the DL outside antenna port, or the receive diversity DL outside antenna port are configured to be coupled to one or more of an omnidirectional antenna or a directional antenna.

Example 128 includes the repeater of Example 124, wherein the UL outside antenna port is connected to a power amplifier without filtering between the power amplifier and the UL outside antenna port.

Example 129 includes the repeater of Example 124, wherein the UL outside antenna port is coupled to a power amplifier with low-order filtering coupled between the UL outside antenna port and the power amplifier to filter harmonics emitted by the power amplifier.

Example 130 includes the repeater of Example 124, wherein: the DL outside antenna port is connected to a low-noise amplifier without filtering between the low-noise amplifier and the DL outside antenna port; or the DL outside antenna port is coupled to a low-noise amplifier with a switchable filter between the low-noise amplifier and the DL outside antenna port.

Example 131 includes the repeater of Example 124, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 132 includes the repeater of Example 124, wherein the repeater is configured to amplify signals in up to six bands, wherein each band comprises a separate amplification and filtering path.

Example 133 includes the repeater of Example 132, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 134 includes the repeater of Example 124, wherein the repeater is a Federal Communications Commission (FCC)-compatible consumer signal booster.

Example 135 includes the repeater of Example 124, wherein one or more of the UL amplification and filtering path or the DL amplification and filtering path is configured to switch between one or more of: the UL outside antenna port; or the DL outside antenna port.

Example 136 includes a signal booster, comprising: a signal amplifier that includes one or more amplification and filtering signal paths, wherein the one or more amplification and filtering signal paths are configured to amplify and filter signals; a bi-directional device antenna port; an uplink (UL) node antenna port; a downlink (DL) node antenna port; a UL amplification and filtering path coupled between the bi-directional device antenna port and the UL node antenna port, wherein the UL node antenna port is configured to be coupled to an UL node antenna; and a DL amplification and filtering path coupled between the bi-directional device antenna port and the DL node antenna port, wherein the DL node antenna port is configured to be coupled to a DL node antenna that is separate from the UL node antenna.

Example 137 includes the signal booster of Example 136, further comprising: a receive diversity DL device antenna port; and a receive diversity DL node antenna port configured to be coupled to a receive diversity DL node antenna to provide a receive diversity signal.

Example 138 includes the signal booster of Example 137, wherein: the receive diversity DL node antenna port is coupled to a receive diversity DL amplification and filtering path coupled between the receive diversity DL device antenna port and the receive diversity DL node antenna port.

Example 139 includes the signal booster of Example 137, wherein the UL node antenna port, the DL node antenna port, or the receive diversity DL node antenna port are configured to be coupled to one or more of an omnidirectional antenna or a directional antenna.

Example 140 includes the signal booster of Example 136, wherein the UL node antenna port is connected to a power amplifier without filtering between the power amplifier and the UL node antenna port.

Example 141 includes the signal booster of Example 136, wherein the UL node antenna port is coupled to a power amplifier with low-order filtering coupled between the UL node antenna port and the power amplifier to filter harmonics emitted by the power amplifier.

Example 142 includes the signal booster of Example 136, wherein: the DL node antenna port is connected to a low-noise amplifier without filtering between the low-noise amplifier and the DL node antenna port; or the DL node antenna port is coupled to a low-noise amplifier with a switchable filter between the low-noise amplifier and the DL node antenna port.

Example 143 includes the signal booster of Example 136, further comprising one or more of: a low-noise amplifier on the UL amplification and filtering path; a low-noise amplifier on the DL amplification and filtering path; a power amplifier on the UL amplification and filtering path; a power amplifier on the DL amplification and filtering path; a variable attenuator on the UL amplification and filtering path; a variable attenuator on the DL amplification and filtering path; a band-pass filter on the UL amplification and filtering path; or a band-pass filter on the DL amplification and filtering path.

Example 144 includes the signal booster of Example 136, wherein the repeater is configured to amplify signals in up to six bands, wherein each band comprises a separate amplification and filtering path.

Example 145 includes the signal booster of Example 144, wherein the up to six bands are selected from one or more of: Third Generation Partnership Project (3GPP) Long Term Evolution (LTE) frequency bands 1 through 85, 3GPP 5G frequency bands 1 through 86, or 3GPP 5G frequency bands 257 through 261.

Example 146 includes the signal booster of Example 136, wherein the repeater is a Federal Communications Commission (FCC)-compatible consumer signal booster.

Example 147 includes the repeater of Example 136, wherein one or more of the UL amplification and filtering path or the DL amplification and filtering path is configured to switch between one or more of: the UL node antenna port; or the DL node antenna port.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A low-noise signal chain, comprising:
- a signal path configured to carry a signal;
- a detector configured to detect a power level of the signal;
- a bypassable amplifier communicatively coupled to the signal path;
- a switchable band pass filter communicatively coupled to the signal path;
- an amplifier bypass path communicatively coupled to the signal path, wherein the signal is configured to be directed to the amplifier bypass path to bypass the bypassable amplifier based on the power level of the signal in relation to a defined power level threshold; and
- a band pass filter bypass path communicatively coupled to the signal path, wherein the signal is configured to be directed to the band pass filter bypass path to bypass the switchable band pass filter based on the power level of the signal in relation to the defined power level threshold.

2. The low-noise signal chain of claim 1, wherein:
- the switchable band pass filter is bypassed when the power level of the signal is less than the defined power level threshold; or
- the switchable band pass filter is not bypassed when the power level of the signal is greater than the defined power level threshold.

3. The low-noise signal chain of claim 1, wherein the signal path is a downlink signal path, and wherein the switchable band pass filter is configured to be bypassed prior to a first stage of the downlink path in a weak signal area to reduce a noise figure.

4. The low-noise signal chain of claim 1, further comprising:

a device antenna configured to communicate signals with a wireless device; and a node antenna configured to communicate signals with a base station.

5. The low-noise signal chain of claim 1, wherein the signal path is a downlink signal path or an uplink signal path.

6. The low-noise signal chain of claim 1, further comprising a plurality of low-noise signal chains, wherein the plurality of low-noise signal chains are configured to amplify signals in up to six different bands.

7. The low-noise signal chain of claim 1, wherein the signal bypasses the bypassable amplifier to conserve energy based on the power level of the signal in relation to the defined power level threshold.

8. The low-noise signal chain of claim 1, wherein the switchable band pass filter corresponds to a high frequency band or a low frequency band, wherein the high frequency band is band 4 (B4) or band 25 (B25), and the low frequency band is band 5 (B5), band 12 (B12) or band 13 (B13).

9. The low-noise signal chain of claim 1, wherein the low-noise signal chain is included in a signal booster, and the signal booster is a Federal Communications Commission (FCC)-compatible consumer signal booster.

10. A low-noise signal chain, comprising:

a signal path configured to carry a signal;

a bypassable amplifier communicatively coupled to the signal path;

a switchable band pass filter communicatively coupled to the signal path;

an amplifier bypass path communicatively coupled to the signal path, wherein the signal is configured to be directed to the amplifier bypass path to bypass the bypassable amplifier based on a power level of the signal in relation to a defined power level threshold; and a band pass filter bypass path communicatively coupled to the signal path, wherein the signal is configured to be directed to the band pass filter bypass path to bypass the switchable band pass filter based on the power level of the signal in relation to the defined power level threshold.

11. The low-noise signal chain of claim 10, further comprising: a detector configured to detect the power level of the signal.

12. The low-noise signal chain of claim 10, wherein:

the switchable band pass filter is bypassed when the power level of the signal is less than the defined power level threshold; or the switchable band pass filter is not bypassed when the power level of the signal is greater than the defined power level threshold.

13. The low-noise signal chain of claim 10, wherein the signal path is a downlink signal path, and wherein the switchable band pass filter is configured to be bypassed prior to a first stage of the downlink path in a weak signal area to reduce a noise figure.

14. The low-noise signal chain of claim 10, further comprising:

a device antenna configured to communicate signals with a wireless device; and a node antenna configured to communicate signals with a base station.

15. The low-noise signal chain of claim 10, wherein the signal path is a downlink signal path or an uplink signal path.

16. The low-noise signal chain of claim 10, wherein the low-noise signal chain is included in a repeater, and the repeater is configured to amplify signals in up to six bands.

17. The low-noise signal chain of claim 10, wherein the signal bypasses the bypassable amplifier to conserve energy based on the power level of the signal in relation to the defined power level threshold.

18. The low-noise signal chain of claim 10, wherein the switchable band pass filter corresponds to a high frequency band or a low frequency band, wherein the high frequency band is band 4 (B4) or band 25 (B25), and the low frequency band is band 5 (B5), band 12 (B12) or band 13 (B13).

19. The low-noise signal chain of claim 10, wherein the low-noise signal chain is included in a repeater, and the repeater is a Federal Communications Commission (FCC)-compatible consumer repeater.

20. A method for directing signals in a low-noise signal chain, comprising:

directing a signal on a signal path of the low-noise signal chain, wherein the signal path is communicatively coupled to a bypassable amplifier and the signal path is communicatively coupled to a switchable band pass filter;

directing the signal to an amplifier bypass path communicatively coupled to the signal path, wherein the signal is configured to be directed to the amplifier bypass path to bypass the bypassable amplifier based on a power level of the signal in relation to a defined power level threshold; and directing the signal to a band pass filter bypass path communicatively coupled to the signal path, wherein the signal is configured to be directed to the band pass filter bypass path to bypass the switchable band pass filter based on the power level of the signal in relation to the defined power level threshold.

21. The method of claim 20, further comprising detecting the power level of the signal using a detector of the low-noise signal chain.

22. The method of claim 20, further comprising:

bypassing the switchable band pass filter when the power level of the signal is less than the defined power level threshold; or determining to not bypass the switchable band pass filter when the power level of the signal is greater than the defined power level threshold.

23. The method of claim 20, wherein the signal path is a downlink signal path, and wherein the method further comprises directing the signal to bypass the switchable band pass filter prior to a first stage of the downlink path in a weak signal area to reduce a noise figure.

24. The method of claim 20, wherein the signal path is a downlink signal path or an uplink signal path.

25. The method of claim 20, wherein the low-noise signal chain is included in a repeater that is configured to amplify signals in up to six bands.

26. The method of claim 20, wherein the switchable band pass filter corresponds to a high frequency band or a low frequency band, wherein the high frequency band is band 4 (B4) or band 25 (B25), and the low frequency band is band 5 (B5), band 12 (B12) or band 13 (B13).

27. The method of claim 20, wherein the low-noise signal chain is included in a repeater, and the repeater is a Federal Communications Commission (FCC)-compatible consumer repeater.

* * * * *